United States Patent [19]
Bennett

[11] 3,962,682
[45] June 8, 1976

[54] SPLIT LOW ORDER INTERNAL ADDRESS BUS FOR MICROPROCESSOR

[75] Inventor: Thomas H. Bennett, Scottsdale, Ariz.

[73] Assignee: Motorola, Inc., Chicago, Ill.

[22] Filed: Oct. 30, 1974

[21] Appl. No.: 519,136

[52] U.S. Cl. .............................................. 340/172.5
[51] Int. Cl.² ...................... G06F 3/00; G06F 13/00
[58] Field of Search ................................. 340/172.5

[56] References Cited
UNITED STATES PATENTS

| | | | |
|---|---|---|---|
| 3,061,192 | 10/1962 | Terzian | 340/172.5 |
| 3,309,679 | 3/1967 | Weisbecker | 340/172.5 |
| 3,372,382 | 3/1968 | Newman | 340/172.5 |
| 3,702,988 | 11/1972 | Haney | 340/172.5 |
| 3,748,649 | 7/1973 | McEowen | 340/172.5 |
| 3,757,306 | 9/1973 | Boone | 340/172.5 |

*Primary Examiner*—Gareth D. Shaw
*Assistant Examiner*—James D. Thomas
*Attorney, Agent, or Firm*—Harry M. Weiss; Charles R. Hoffman

[57] ABSTRACT

A program register is coupled between a data bus N bits wide and an address but N bits wide for storing the address of the current byte of a multi-byte instruction currently being executed. A counter is also coupled between the address bus and the data bus and is additionally coupled to a program register to allow loading of the counter contents into the program register independently of the status of the address bus. An auxiliary register is also coupled between the address bus and the data bus. The counter is updated every machine cycle during execution of the instruction, except for certain instructions during which the counter is inhibited to allow it to function as an auxiliary register, thereby storing the address of the next instruction. For certain instructions, the address bus is utilized for data transfers to or from the auxiliary register simultaneously with loading of the program register from the counter depending on the type of instruction being executed. The address bus is divided into two sections, each N bits wide, one for transferring higher order address bits and the other for independently transferring lower order address bits. This architecture permits execution of many instructions in fewer machine cycles than was previously possible.

22 Claims, 65 Drawing Figures

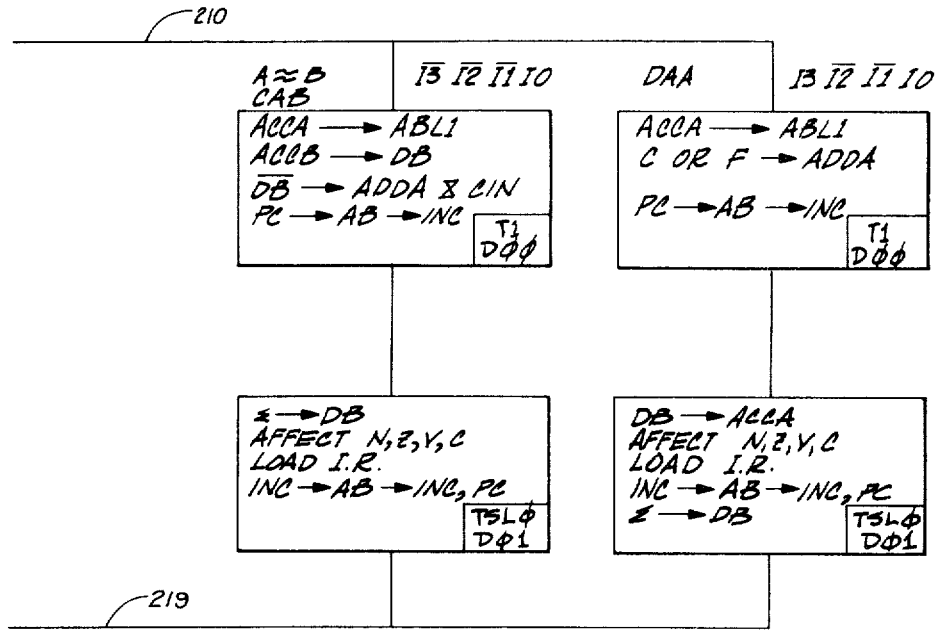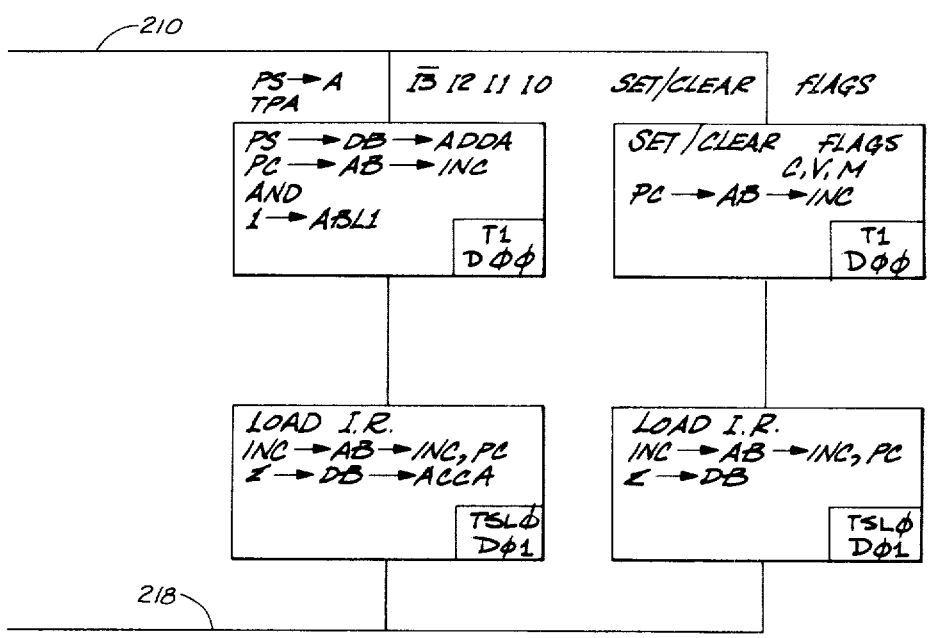
Fig. 2K

| GROUP | I | II | III | IV | V | VI |
|---|---|---|---|---|---|---|
| I3 I2 I1 I0 | I7 | $\overline{I7}$ I6 | $\overline{I7}$ $\overline{I6}$ I5 $\overline{I4}$ | $\overline{I7}$ $\overline{I6}$ $\overline{I5}$ I4 | $\overline{I7}$ $\overline{I6}$ I5 I4 | $\overline{I7}$ $\overline{I6}$ $\overline{I5}$ $\overline{I4}$ |
| 0 0 0 0 | SUB | NEG | BRA | SAB | TSX | |
| 0 0 0 1 | CMP | | | CAB | INS | |
| 0 0 1 0 | SBC | | C+Z=0 | | PUL A | NØP |
| 0 0 1 1 | | COM | C+Z=1 | | PUL B | |
| 0 1 0 0 | AND | LSR | C=0 | | DES | |
| 0 1 0 1 | BIT | | C=1 | | TXS | |
| 0 1 1 0 | LDA | ROR | Z=0 | TAB | PSH A | TAP |
| 0 1 1 1 | STA | ASR | Z=1 | TBA | PSH B | TPA |
| 1 0 0 0 | EOR | ASL | V=0 | | | INX |
| 1 0 0 1 | ADC | ROL | V=1 | DAA | RTS | DEX |
| 1 0 1 0 | ORA | DEC | N=0 | | | CLV |
| 1 0 1 1 | ADD | | N=1 | AAB | RTI | SEV |
| 1 1 0 0 | CPX | INC | N⊕V=0 | | | CLC |
| 1 1 0 1 | *JSR | TST | N⊕V=1 | | | SEC |
| 1 1 1 0 | LDX, LDS | JMP | Z+(N⊕V)=0 | | WAI | CLI |
| 1 1 1 1 | STS/STX | CLR | Z+(N⊕V)=1 | | SWI | SEI |
| | IMMEDIATE DIRECT INDEXED EXTENDED | ONE WORD INDEXED EXTENDED | RELATIVE | ONE WORD | ONE WORD | ONE WORD |

*JSR I5 I4 = BSA

| 7654 | GROUP I | |
|---|---|---|
| 1X00 | IMM | 11XX11X1 = IXR |
| 1X01 | DIR | 10XX11X1 = SP |
| 1X10 | IND | $\overline{I6}$ = ACCA } I3 I2 |
| 1X11 | EXT | I6 = ACCB } |

| 7654 | GROUP II |
|---|---|
| 0100 | ACCA |
| 0101 | ACCB |
| 0110 | IND |
| 0111 | EXT |

Fig. 2N

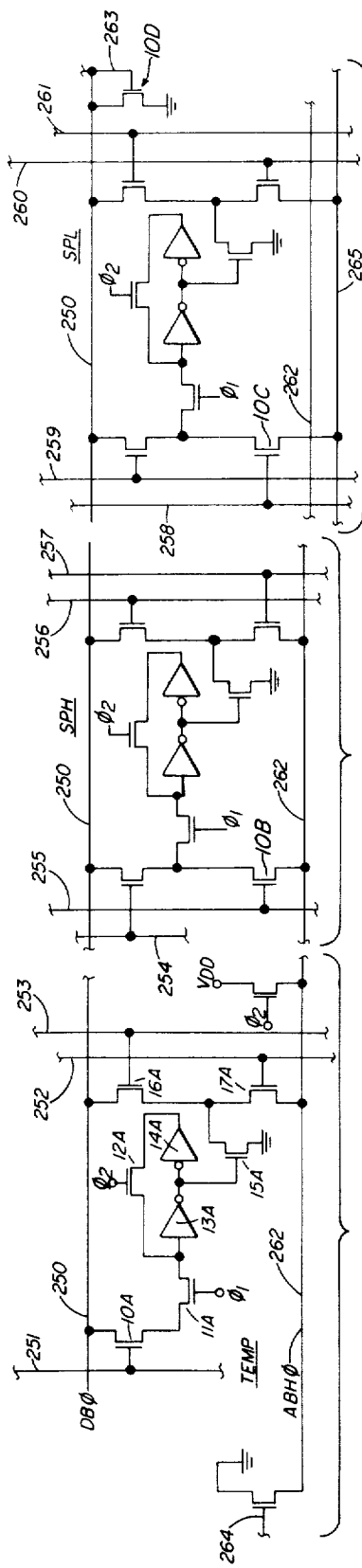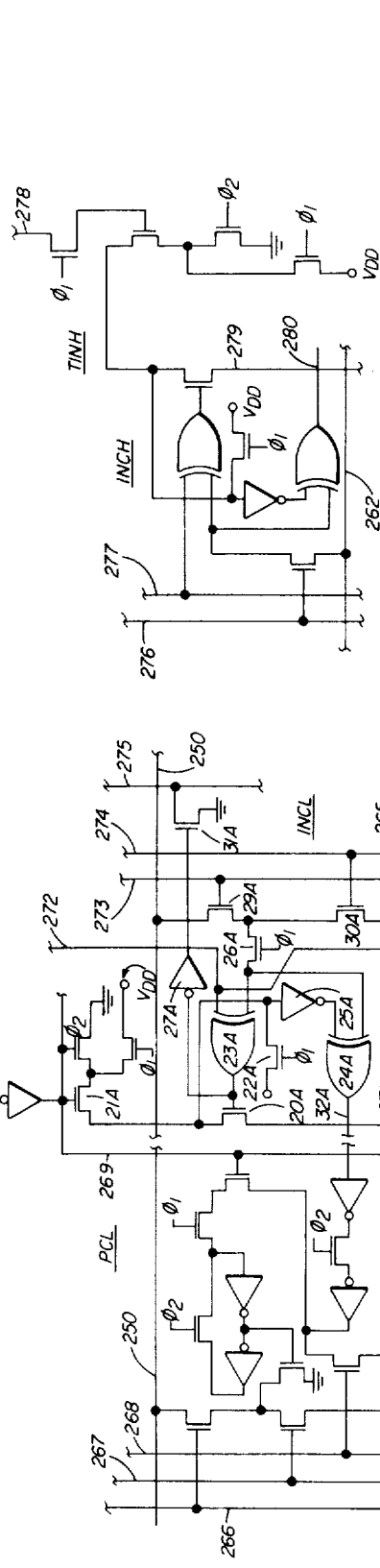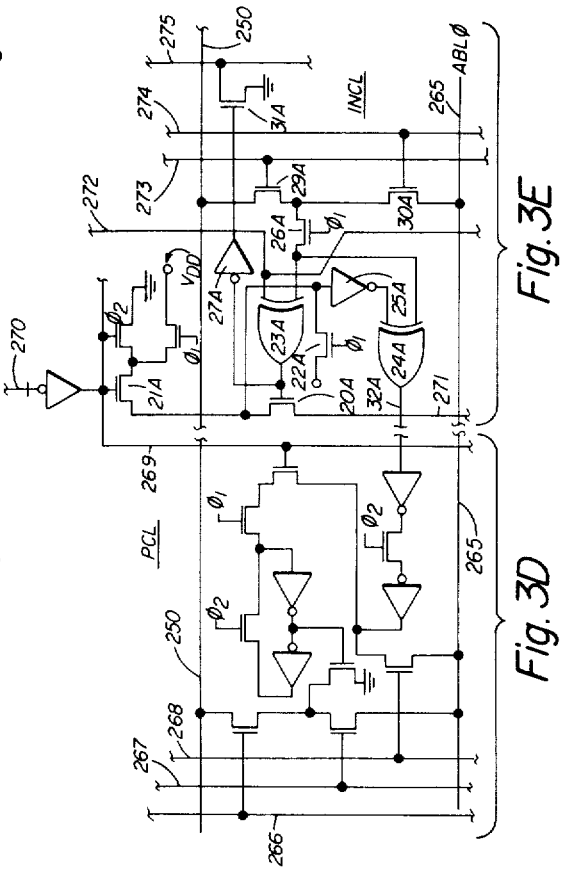

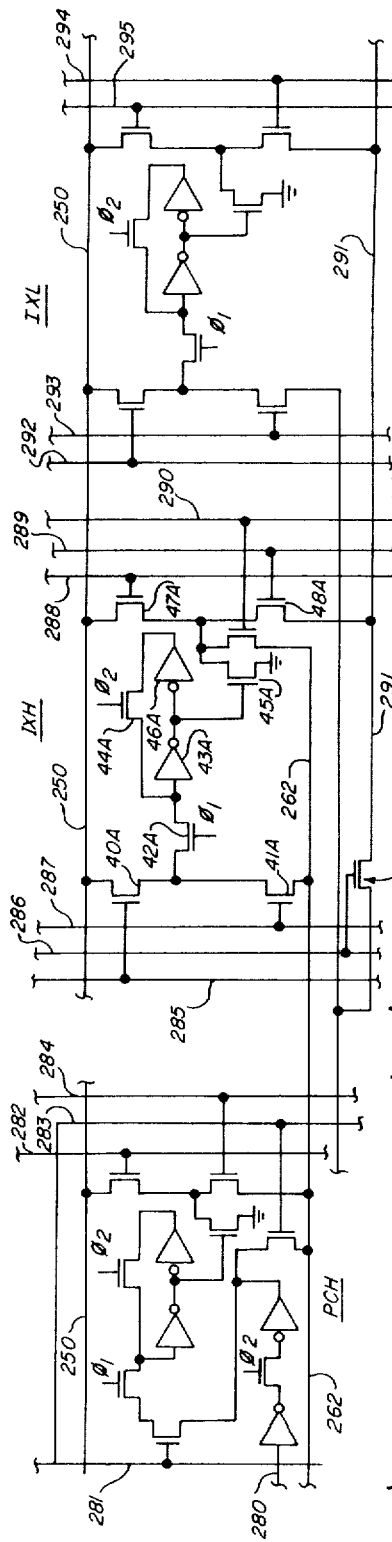
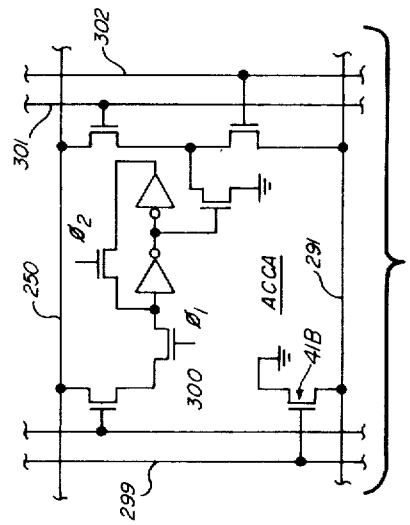
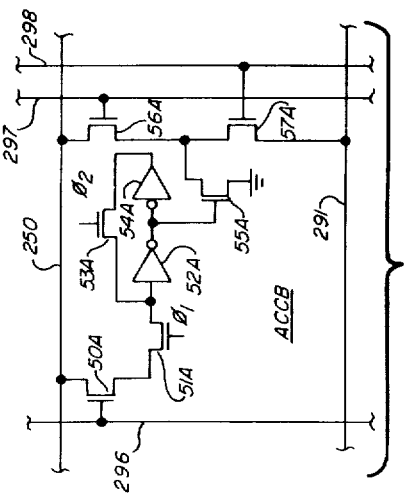
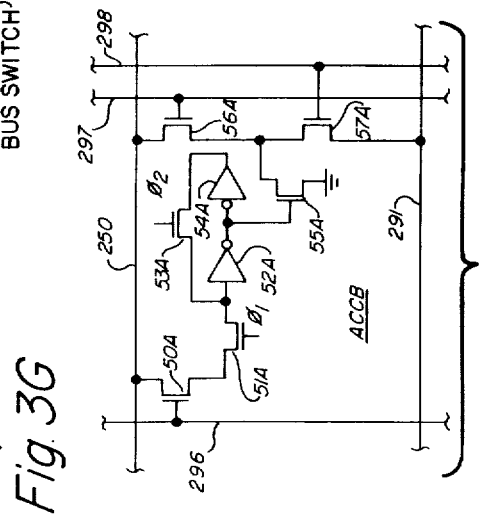

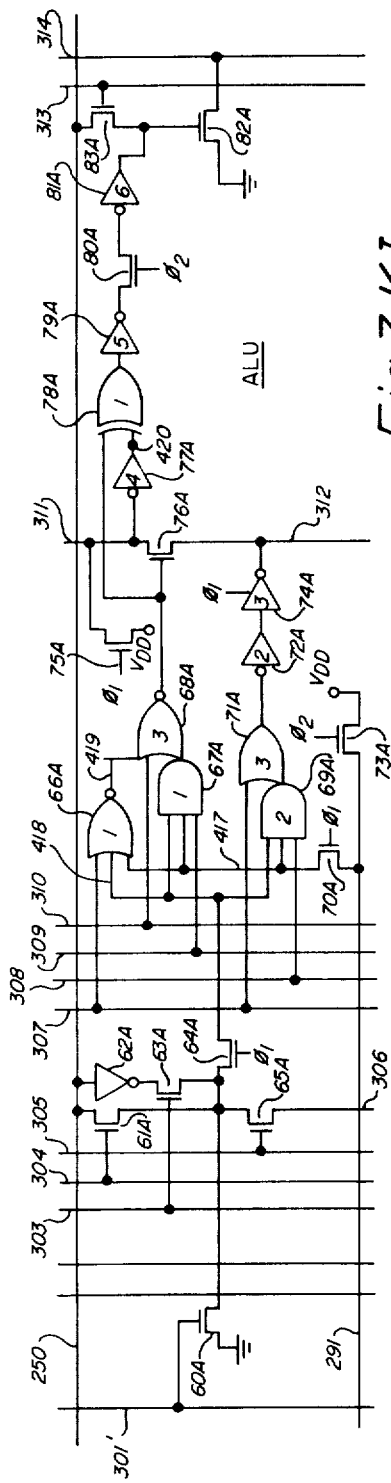
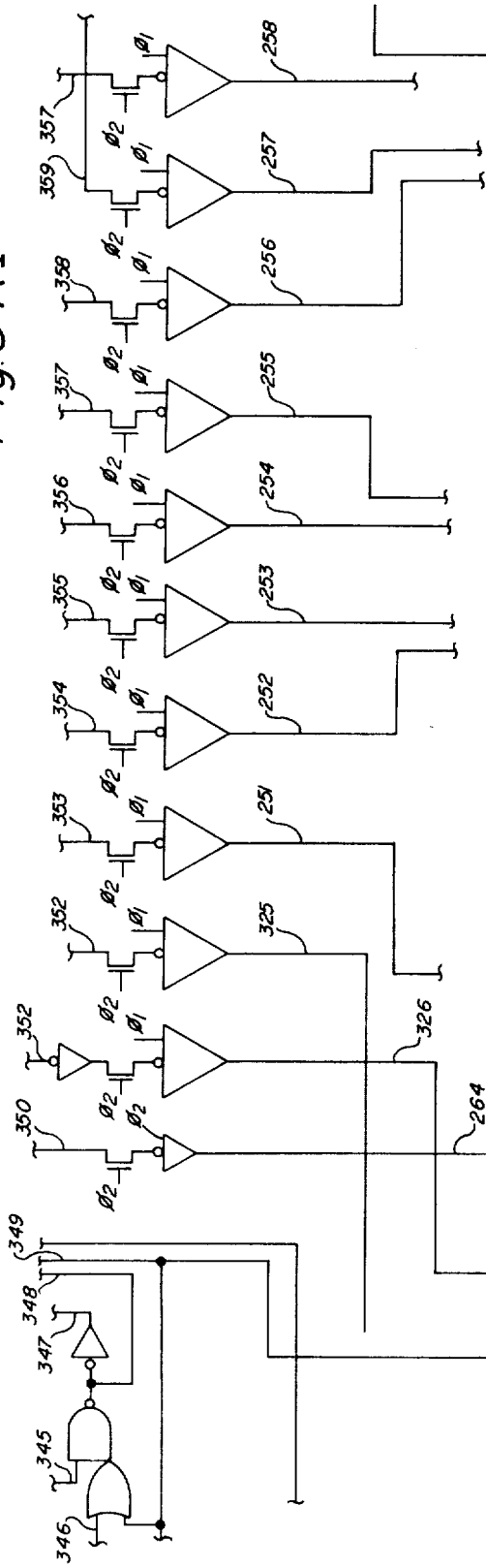
Fig.3KI
Fig.3S

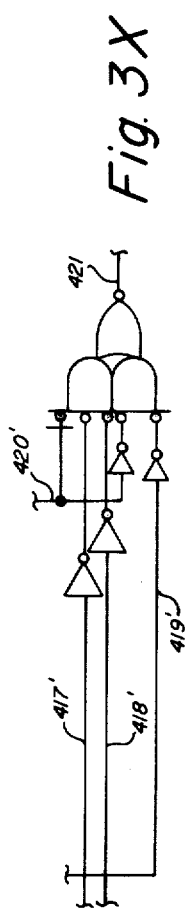
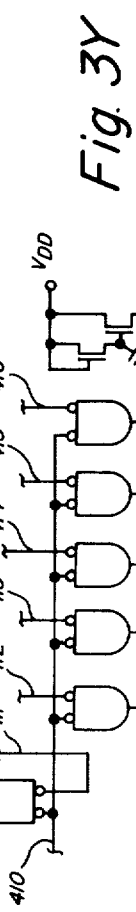
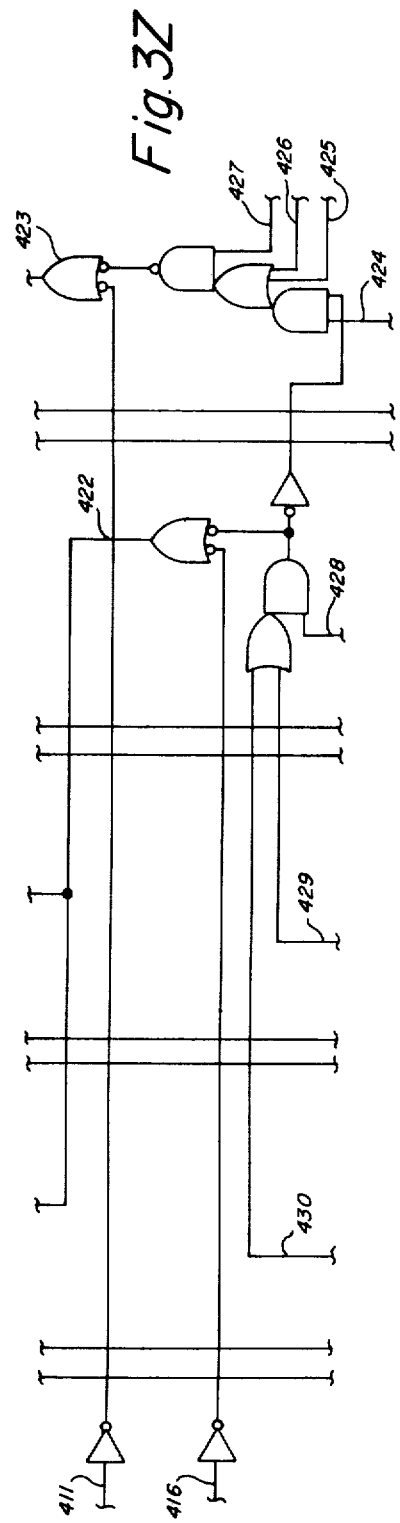

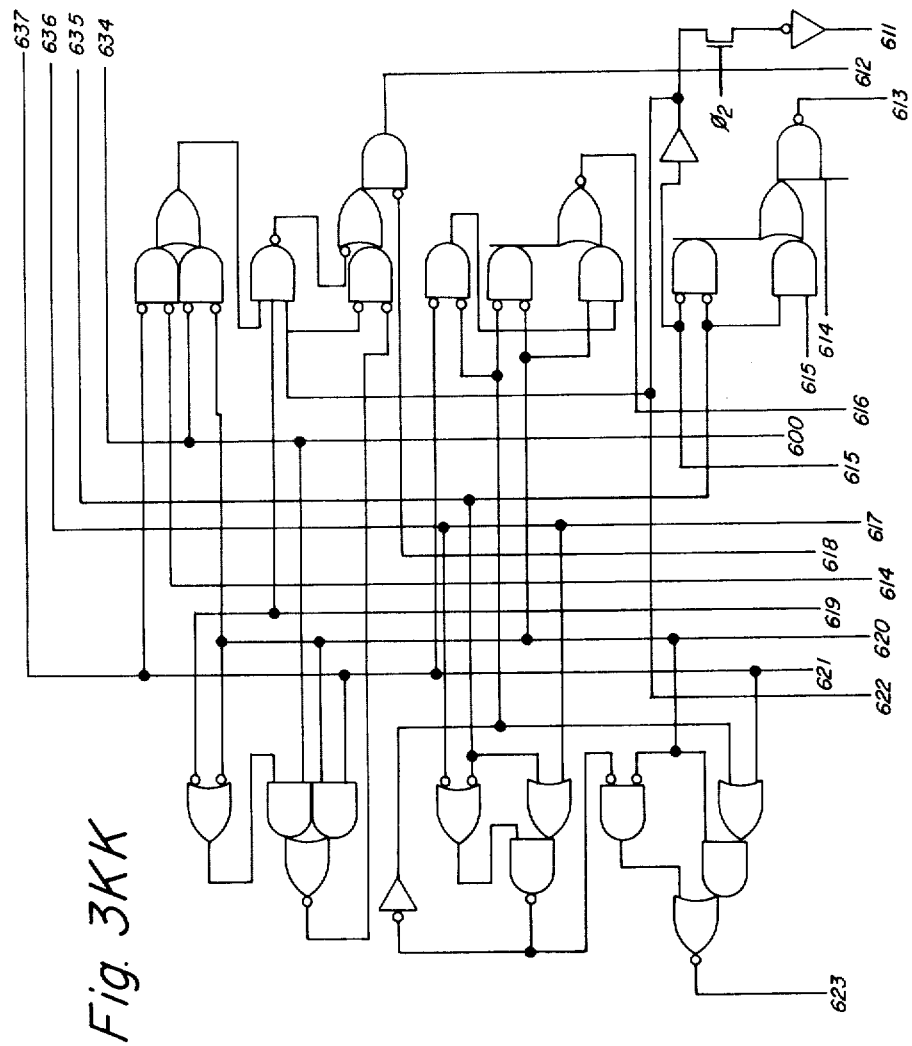
Fig. 3KK
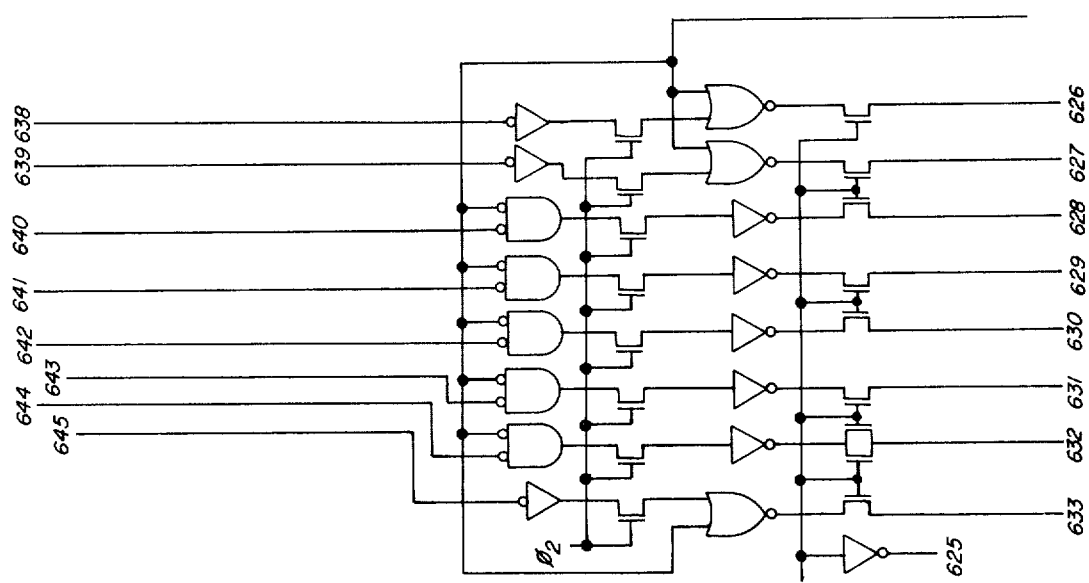

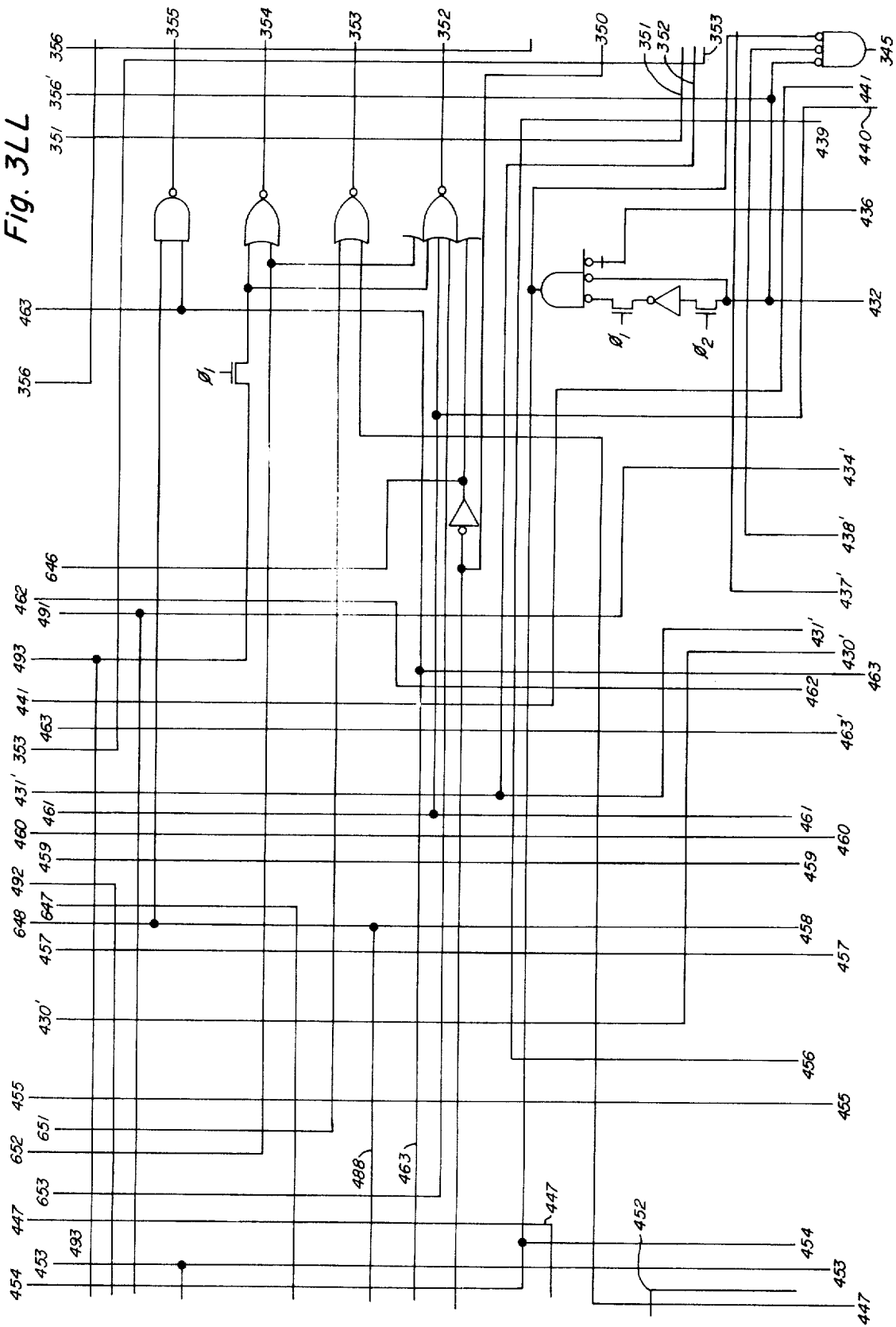

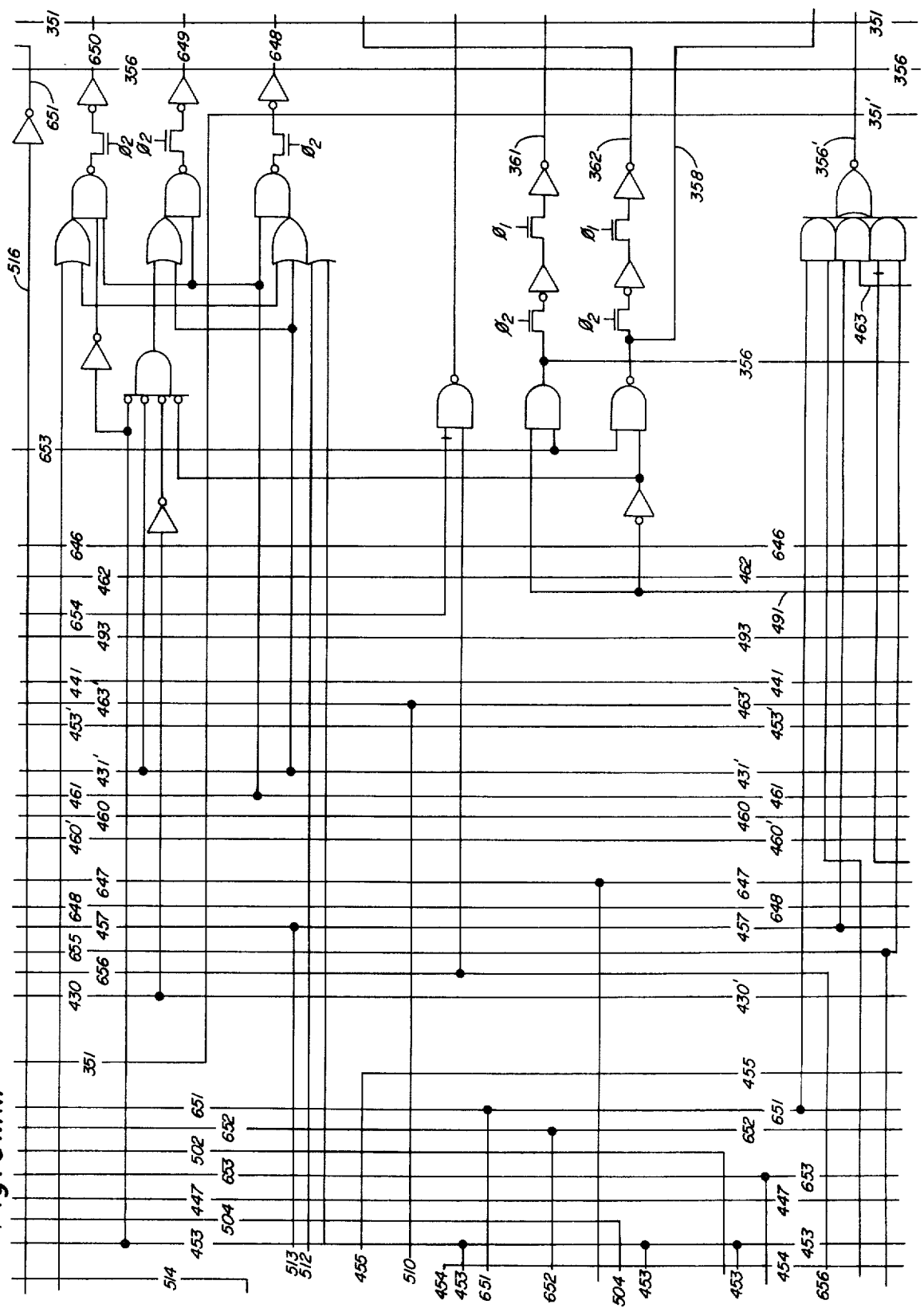

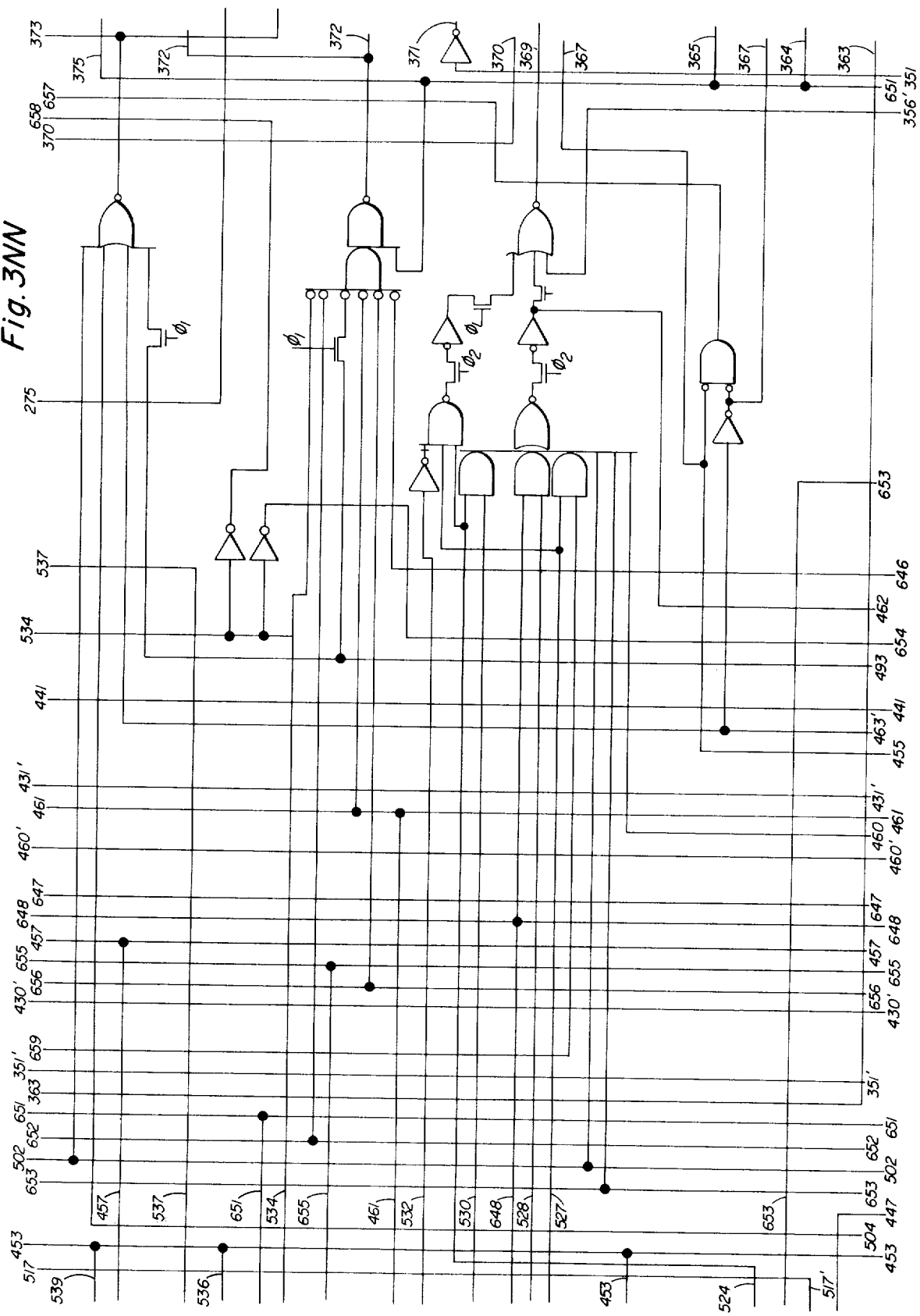

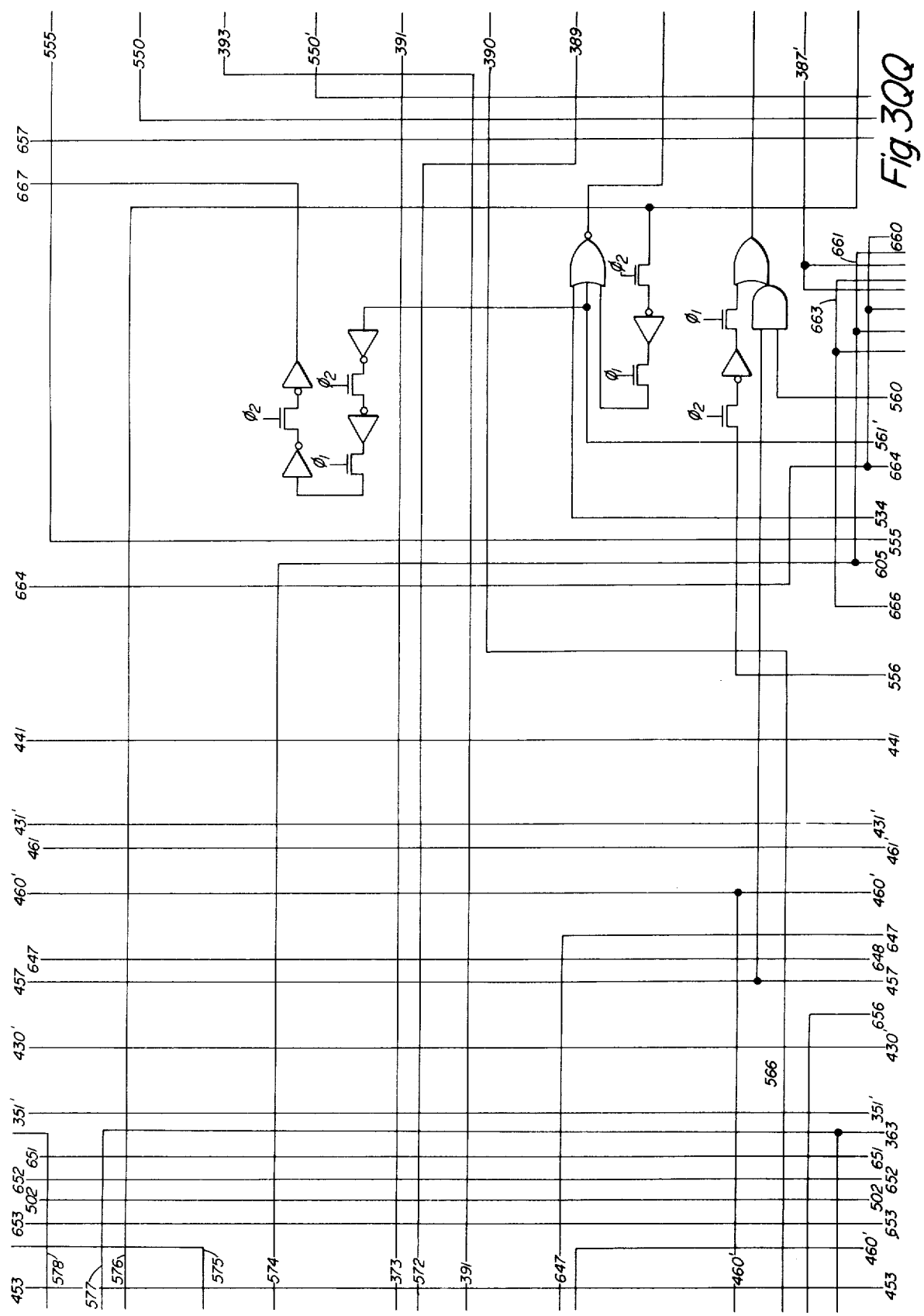

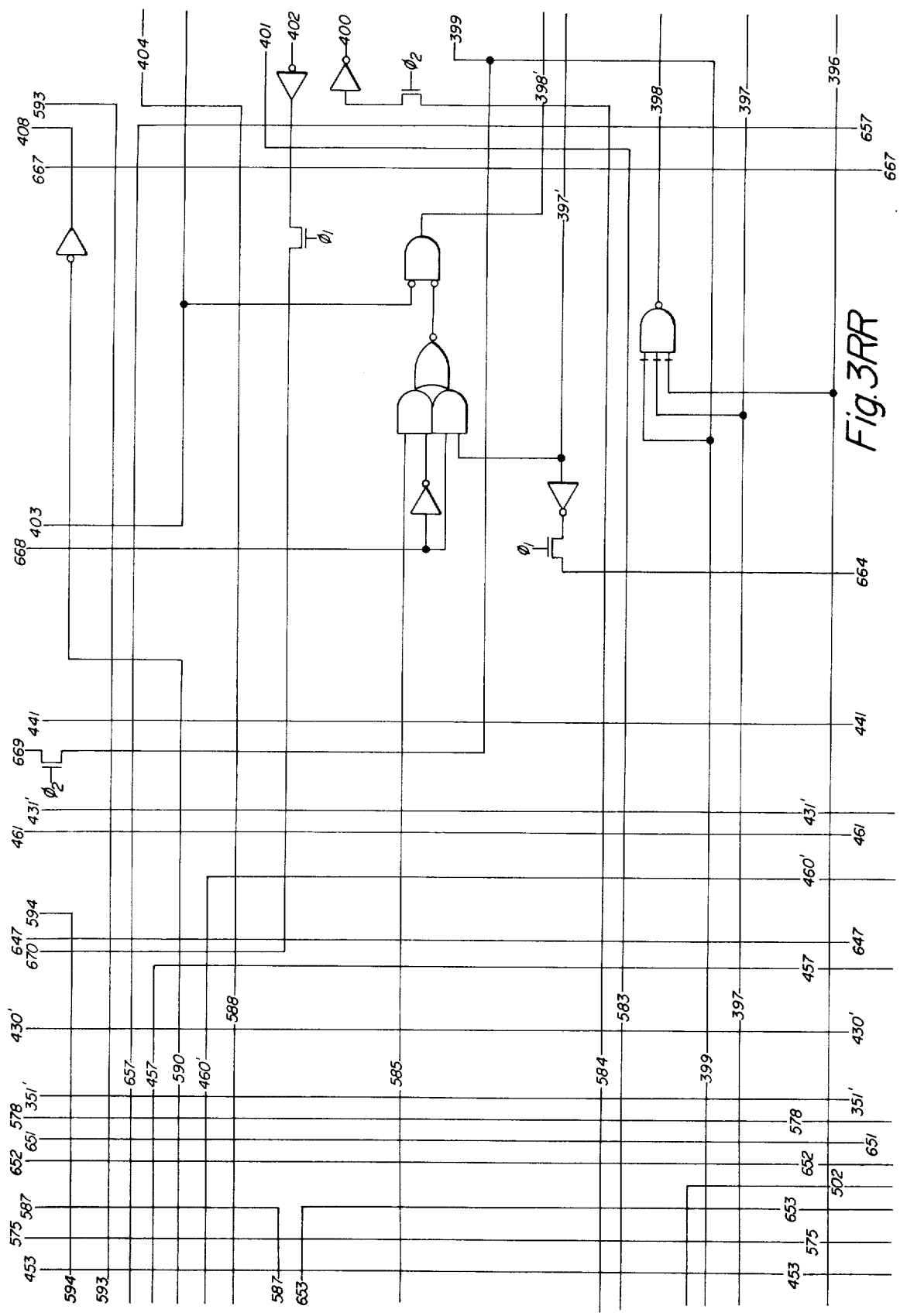

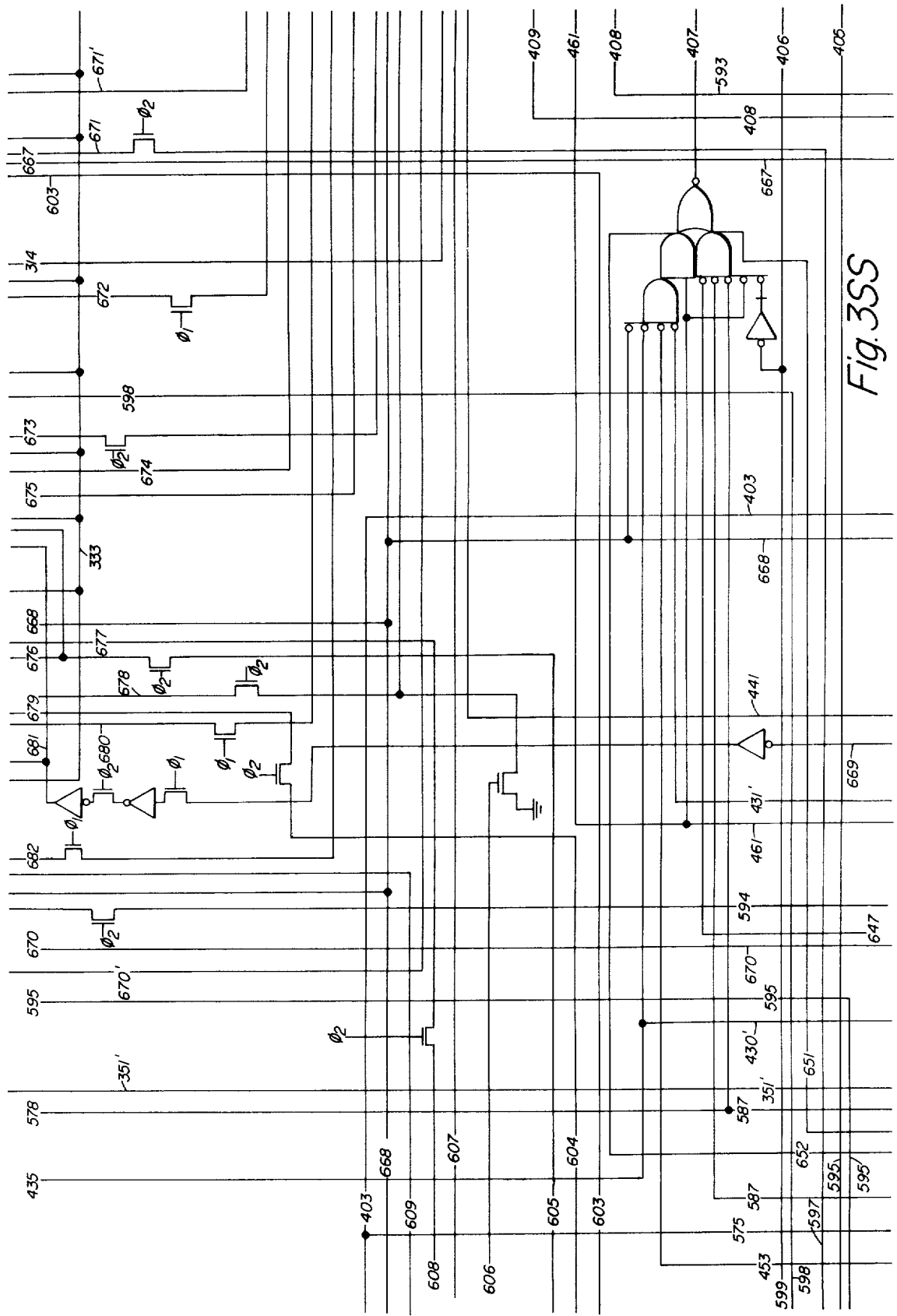

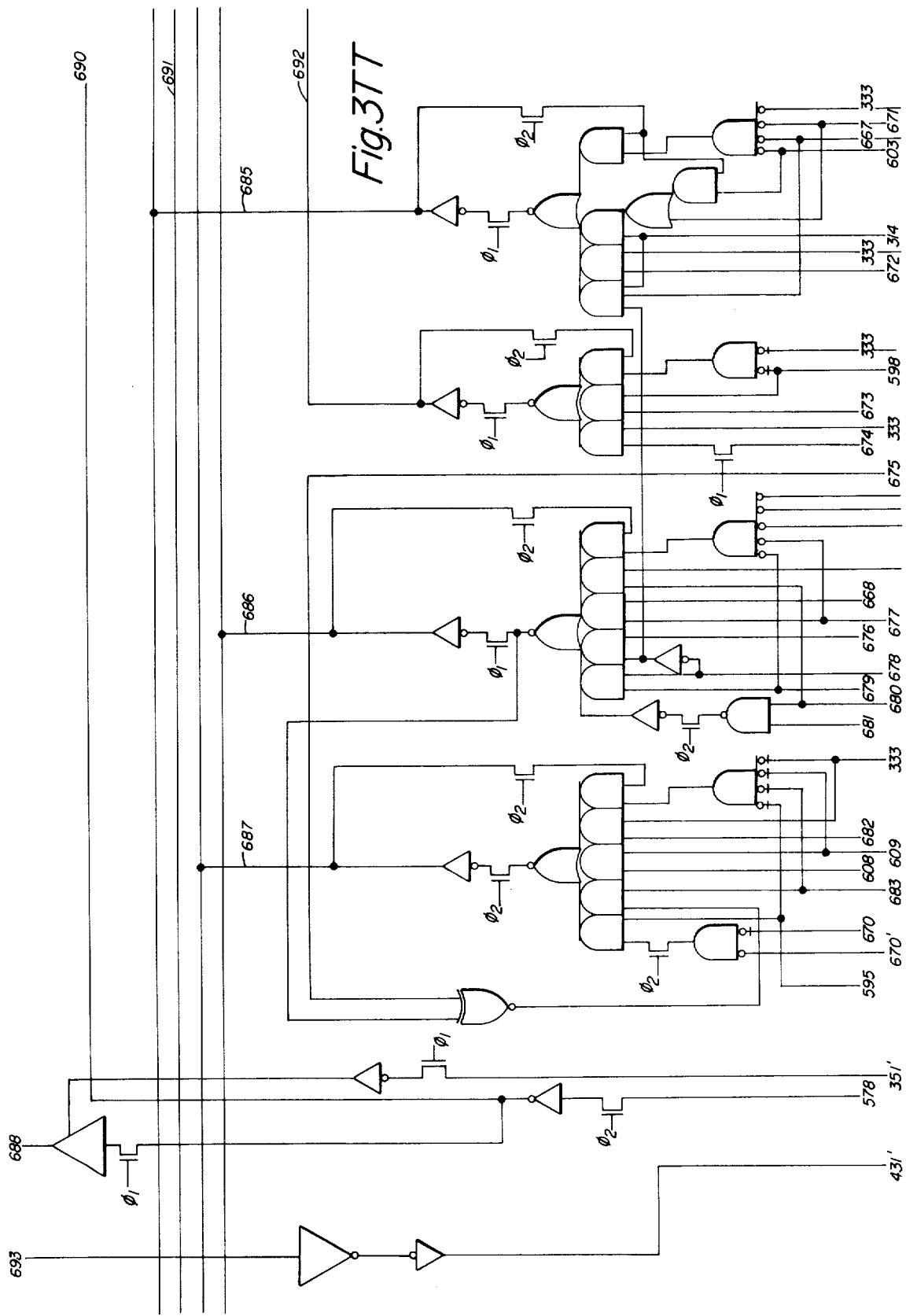

| TIME FRAME | DB | ABH | ABL | INCL | INCH | OBL | OBH | DBI | TEMP | IR | PC | ADDA | ABLI | FLAG |
|---|---|---|---|---|---|---|---|---|---|---|---|---|---|---|
| GP58 | 11--0 | 11--1 | | 11--0 | 11--1 | 11--0 | 11--1 | | | | | | | |
| Ø2 | | 11--1 | 11--1 | 11--1 | | | | D1 | | | | | | |
| R57 | D1 | | | | | | | | D1 | | | | | |
| Ø2 | | | | 00--0 | 00--0 | | | | | | | | | |
| R58 | D2 | D1 | | D2 | D1 | D2 | D1 | D2 | | | | | | |
| Ø2 | | | | D1 D2+1 | | | | IB 1 | | | | | | |
| TSLØ | | D1 D2+1 | D1 D2+1 | D1 D2+1 | D1 D2+1 | | | | | | | | | |
| Ø2 | | D1 D2+2 | D1 D2+2 | D1 D2+2 | D1 D2+2 | | | DB 2 | DB 2 | IB 1 | D1 D2+1 | | | |
| EXT0 | DB 2 | D1 D2+2 | | D1 D2+2 | D1 D2+3 | DB 3 | DB 2 | DB 3 | | | | | | |
| Ø2 | | | | | | | | LDA DATA | | | | | | |
| EXT 1 | DB 3 | DB 2 | | DB 3 | DB 2 | DB 3 | DB 2 | | | | D1 D2+3 | | | |
| Ø2 | | | | DB 2 DB 3+1 | DB 2 DB 3+1 | DB 2 DB3+2 | DB 2 DB3+2 | | | | | | | |
| D00 | | D1 D2+3 | D1 D2+3 | D1 D2+3 | | | | | | | | DB 3 | 11--1 | |
| Ø2 | | D1 D2+4 | D1 D2+4 | D1 D2+4 | D1 D2+4 | | | | | IB 2 | | | | |
| TSLØ | | | | | | | | | | | | | | N,Z V,C |

Fig.8

SPLIT LOW ORDER INTERNAL ADDRESS BUS FOR MICROPROCESSOR

RELATED APPLICATIONS

This invention is related to the following patent applications filed simultaneously herewith and assigned to the assignee of the present application: Ser. No. 519,150, by Bennett, et al, entitled MICROPROCESSOR ARCHITECTURE; Ser. No. 519,138, by Bennett, et al entitled INTERFACE ADAPTOR ARCHITECTURE; Ser. No. 519,149, by Bennett, et al, entitled MICROPROCESSOR SYSTEM; Ser. No. 519,131, by Bennett, et al entitled INTERFACE ADAPTOR HAVING CONTROL REGISTER; Ser. No. 519,132, by Bennett, et al entitled MICROPROCESSOR CHIP BUS CONTROL SYSTEM; Ser. No. 519,133, by Bennett, et al, entitled MICROPROCESSOR CHIP REGISTER-BUS STRUCTURE; Ser. No. 519,134, by Bennett, et al entitled MICROPROCESSOR CHIP CIRCUITRY; Ser. No. 519,135, by Bennett, et al entitled MICROPROCESSOR SYSTEM DATA BUS; Ser. No. 519,137, by Bennett, et al entitled INTERRUPT CIRCUITRY FOR MICROPROCESSOR CHIP; Ser. No. 519,139, by Bennett, et al entitled MULTIPLE INTERRUPT MICROPROCESSOR SYSTEM; Ser. No. 519,140, by Bennett, et al entitled INTERRUPT CIRCUITRY FOR MICROPROCESSOR CHIP; Ser. No. 519,141, by Mathys, et al entitled CONTROL REGISTER FOR INTERFACE ADAPTOR ADDRESS EXPANSION; Ser. No. 519,142, by Carlow, et al entitled DATA DIRECTION REGISTER FOR INTERFACE ADAPTOR CHIP; Ser. No. 519,143, by Carlow, et al entitled INTERRUPT STATUS REGISTER FOR INTERFACE ADAPTOR CHIP; Ser. No. 519,144, By Wiles entitled NON-MASKABLE INTERRUPT MICROPROCESSOR SYSTEM; Ser. No. 519,145, by Hepworth, et al entitled MASTER-SLAVE CONTROL REGISTER FOR INTERFACE ADAPTOR CHIP: Ser. No. 519,146, by Bennett, et al, entitled MICROPROCESSOR SYSTEM INCLUDING PLURALITY OF CONTROLLER CHIPS.

BACKGROUND OF THE INVENTION

A number of integrated circuit microprocessor chips have been implemented using advanced MOS LSI (metal oxide semiconductor large scale integrated circuit) manufacturing processes, including the P-channel and the faster, more sophisticated N-Channel technologies. The microprocessor chips are the heart of complete microcomputer systems which additionally typically include a number of power supplies, external RAM (random access memory) devices, ROM (read only memory) devices and a variety of buffer interface and peripheral control devices. A relatively small number of semiconductor chips are required to implement a complete microcomputer system. A simple but complete microcomputer using such microprocessor packages may be implemented on a small printed circuit card, requiring as few as four or five integrated circuit packages. Some control functions may be implemented with even fewer integrated circuit packages. Thereby, the power of computer data processing is made available at very low cost for use in a wide variety of industrial and communications equipment, such as in process and manufacturing control systems, computer peripheral and terminal hardware, parameter-control systems of all types from microcomputers in the automobile to the control systems for traffic and anywhere else that random logic computer control needs optimizing. The savings in design time and cost for the microcomputer systems designer is greatly reduced by the availability of such MOS LSI microprocessor and memory and peripheral units. Printed circuit board layouts are simplified. The complex interconnections required for large numbers of conventional integrated circuits are replaced by ROMs. The only interconnect wiring on printed circuit cards runs between the various address and data buses and input/output devices. The cost savings are not limited to direct component costs, but extends also to other related system hardware costs. Connectors can be decreased in number, cabling can be simplified, the card cage can be reduced in size, and so on. Associated indirect costs are also reduced, since assembly takes less time, documentation is simpler, and maintenance is easier. Equally important to cost savings and hardware systems is the ability of system engineers to build a proposed design quickly. No hard wire logic need by simulated, optimized or breadboarded. The logic design portion of the design cycle now becomes manipulation of the functional building blocks mentioned above, where the control sequence takes the form of writing a software program into an external ROM. Breadboarding consists merely of interconnecting a few LSI packages. Design changes are greatly simplified. The use of simulators allows verification of the design even before it is committed to hardware. Overall, as much as 90 percent may be cut from the design time of a microcomputer using the microprocessor and related chips. However, different microprocessors have different capabilities which offer different advantages to users having varying requirements. For instance, one microprocessor chip may be clearly advantageous to one user and a different microprocessing unit may be useful to a different user with different types of program requirements. The effectiveness of the particular microcomputer systems can usually be measured by its execution speed and by its external memory storage requirements for a representative class of practical bench mark programs. It is also clear that a microprocessor unit having shorter machine cycles requiring fewer machine cycles to execute a particular set of instructions will be generally advantageous to any user.

Ease of controlling the input/output data flow may also offer the user advantages in using a particular microprocessor unit. Now families of support circuits coupleable directly to a bidirectional data bus, which characterizes most of the known microprocessor chips, and the new microprocessor units (MPU's) are far more powerful, generally, than the earliest first generation MOS LSI microprocessor chips in that the instruction sets for the newer devices are much larger and more powerful (the most advanced microprocessor chips include about 70 instructions) and the instruction execution times are about an order of magnitude faster. Yet, further improvements in overall system performance may be based on improvements in chip architecture of the microprocessor chips and new systems architectures encompassing the MPU chips and associated peripheral circuit families.

SUMMARY OF THE INVENTION

It is an object of this invention to provide a low cost digital processor on a semiconductor chip utilizing MOS technology.

It is another object of this invention to provide a integrated circuit microprocessor on a single semiconductor chip having an architecture which increases the data rate on a bidirectional data bus.

It is another object of this invention to provide an MOS integrated circuit microprocessor on a chip dissipating a reduced amount of power and requiring only a single power supply.

Briefly described, a preferred embodiment of the invention is an integrated circuit processor unit on a semiconductor chip utilizing MOS technology. The microprocessor unit is internally arranged so that the internal address bus is split into two sections. Each of the internal sections drives separate external data bus driver circuitry. The program register means and the counter means and all other registers and counters coupled between the address bus and the data bus are also split, each having a first section coupled between the data bus and the first address bus section (called the address bus low) and a second section (called the address bus high) coupled between the data bus and the second address bus section. The first address bus section is further split by means of an address bus switch which controllably couples each conductor of the first address bus section to a corresponding conductor of a third address bus section. The third address bus section is coupled to an arithmetic logic unit. Additional logic circuitry is included on the chip to control the interrupt routine and generate the timing signals necessary to accomplish data transfer between the various counters and registers and the internal address bus and data bus and the arithmetic logic unit.

BRIEF DESCRIPTION OF THE DRAWINGS

FIG. 8 is a table useful in describing the operation of the microprocessor of FIG. 1 with reference to FIG. 2

DESCRIPTION OF THE INVENTION

Figure 1:
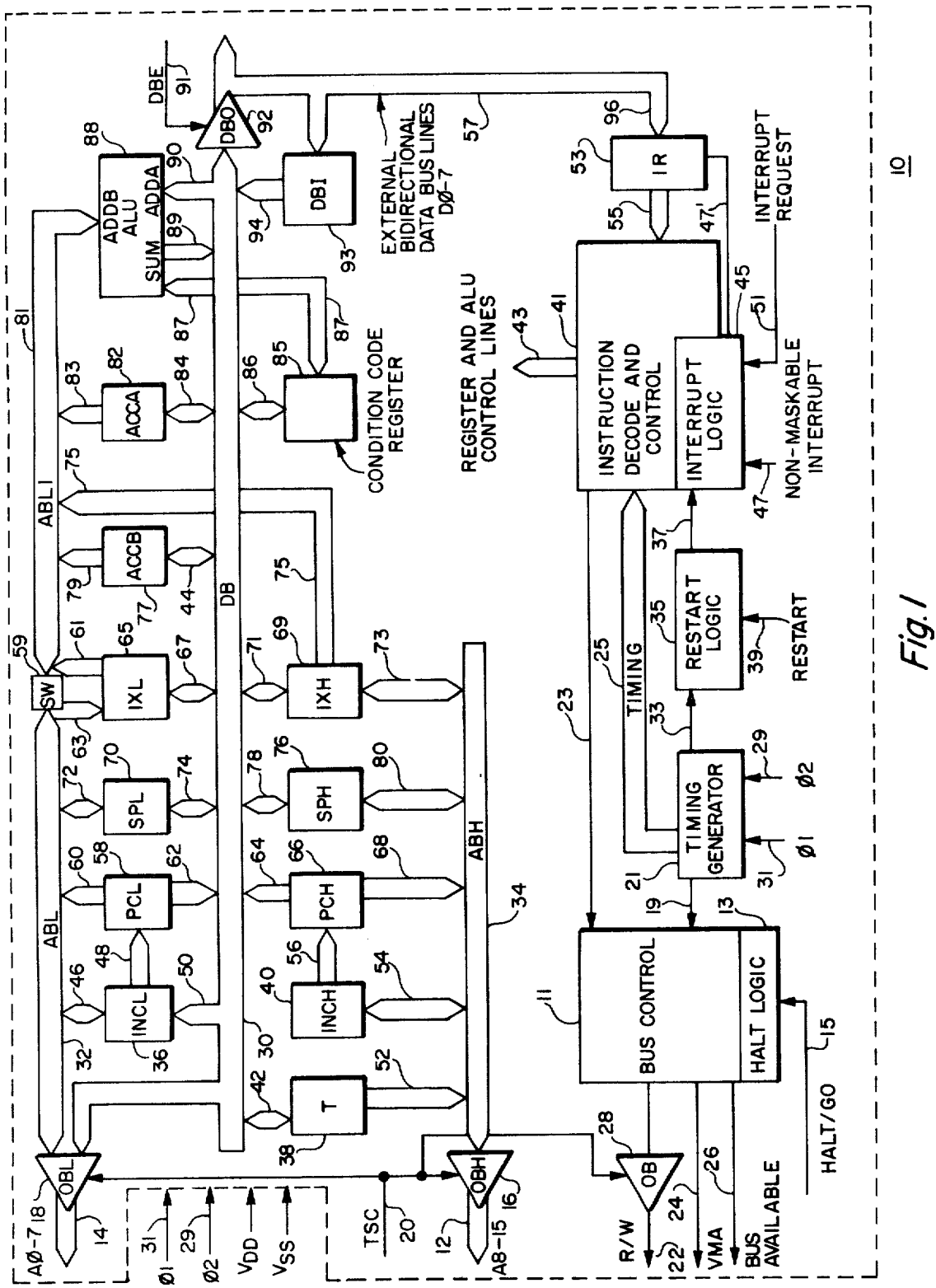
FIG. 1 is a partial block diagram of a preferred embodiment of the invention and includes the internal bus structure and programmable registers for a microprocessor chip.

The block diagram of FIG. 1 represents the architecture of microprocessor chip 10. Microprocessor chip 10 includes a number of control functional blocks including bus control circuitry 11, halt logic 13, timing generator 21, restart logic 35, instruction decode and control circuit 41, and interrupt logic circuitry 45. The microprocessor architecture depicted in FIG. 1 defines the fundamental relationships between the various counters, registers and arithmetic logic unit (ALU) and the internal address buses and data buses. It should be understood that the term "bus" as used herein means a plurality of separate conductors or a single conductor. The above mentioned control circuitry generates, with appropriate timing, control signals which control the transfer of data between the various registers and buses and the arithmetic logic unit.

Figure 3L:
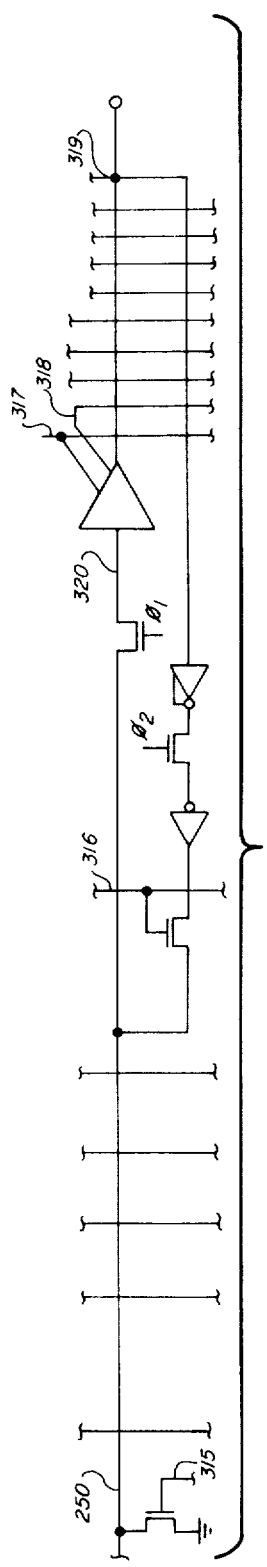
FIGS. 3A–3Z and 3AA–3TT constitute a circuit schematic for the microprocessor of FIG. 1. Each of the sections in FIGS. 3A–3TT is a section of the entire circuit schematic, and the various sections fit together to form the whole as indicated by reference numeral, each of which represents a line common to two or more of the individual sections.
Figure 3M:
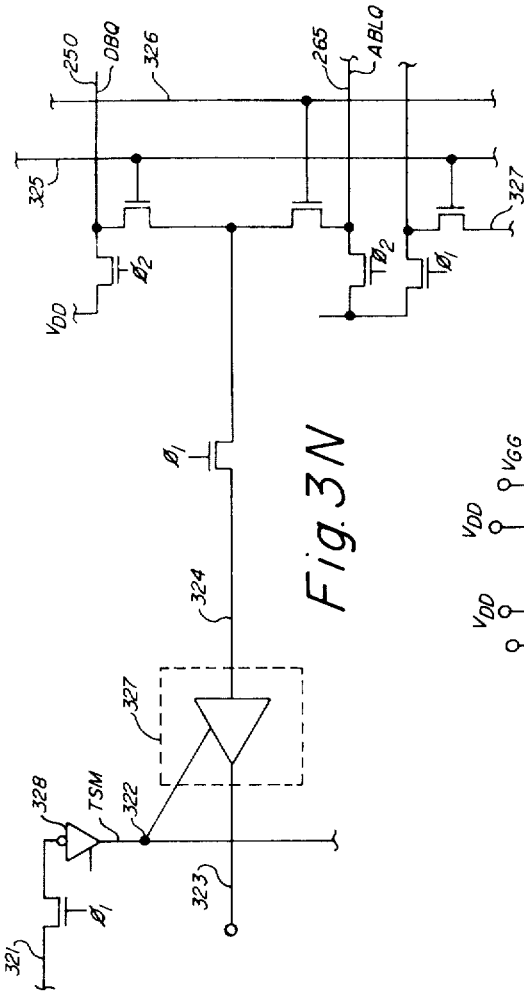
Figure 3N:
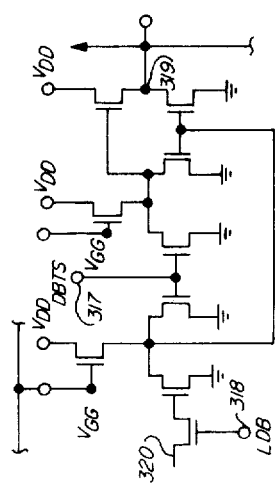
Figure 3P:
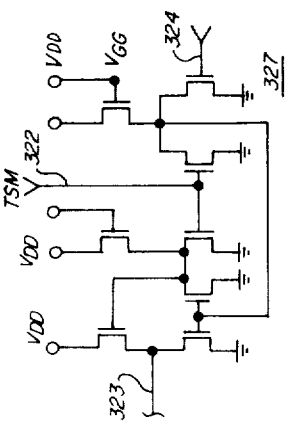
Figure 3Q:
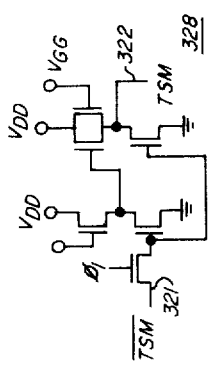
Figure 3R:
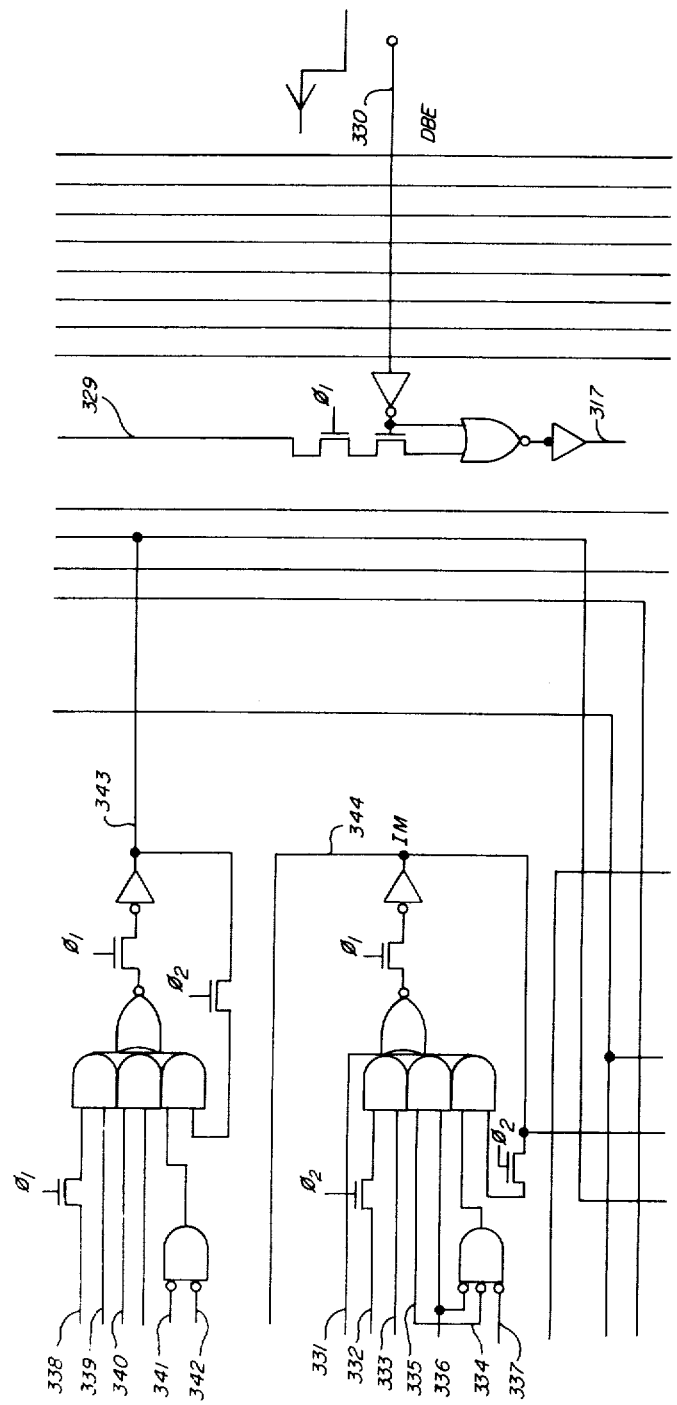
Figure 3T:
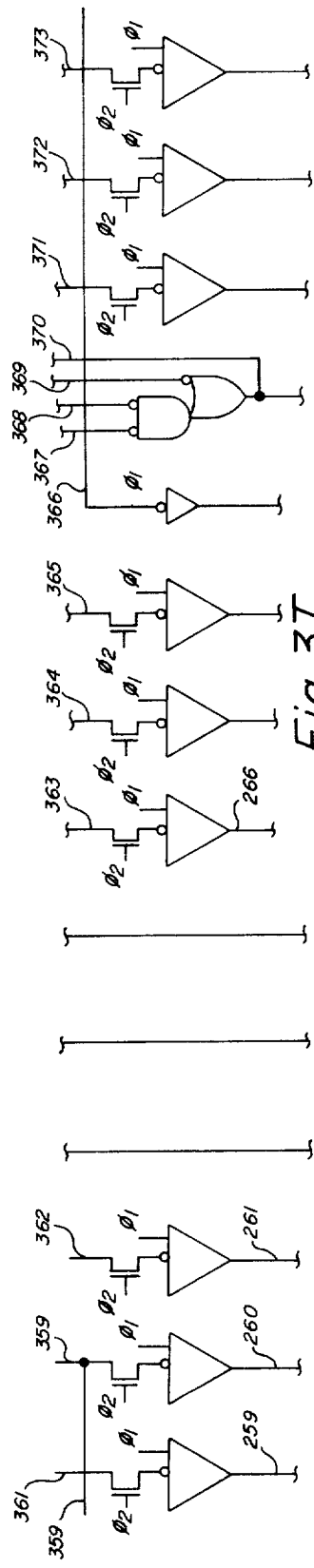
Figure 3U:
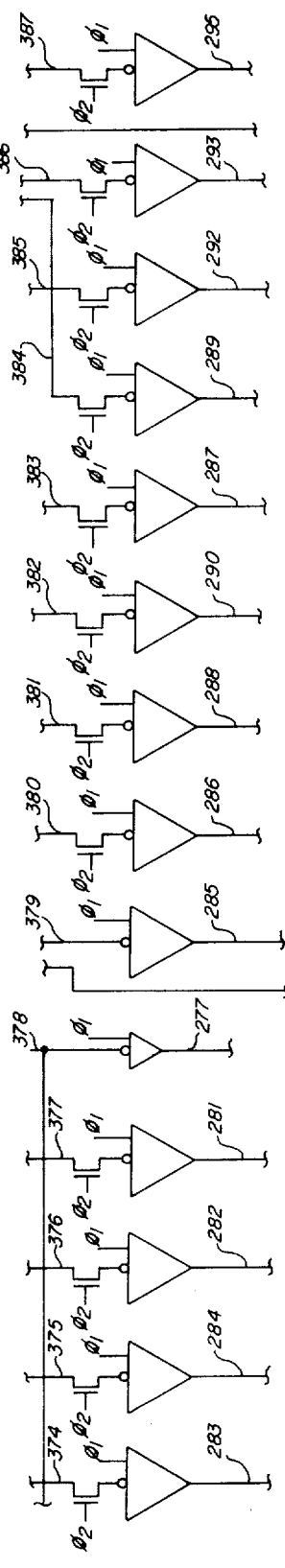
Figure 3V:
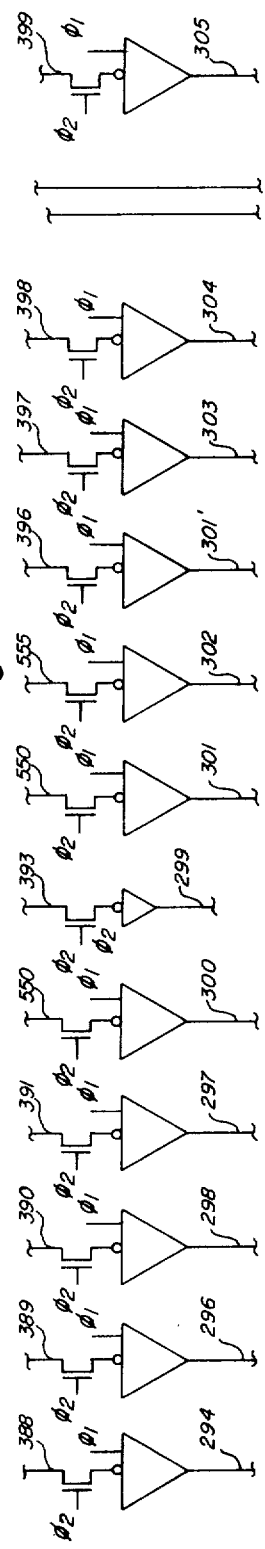
Figure 3W:
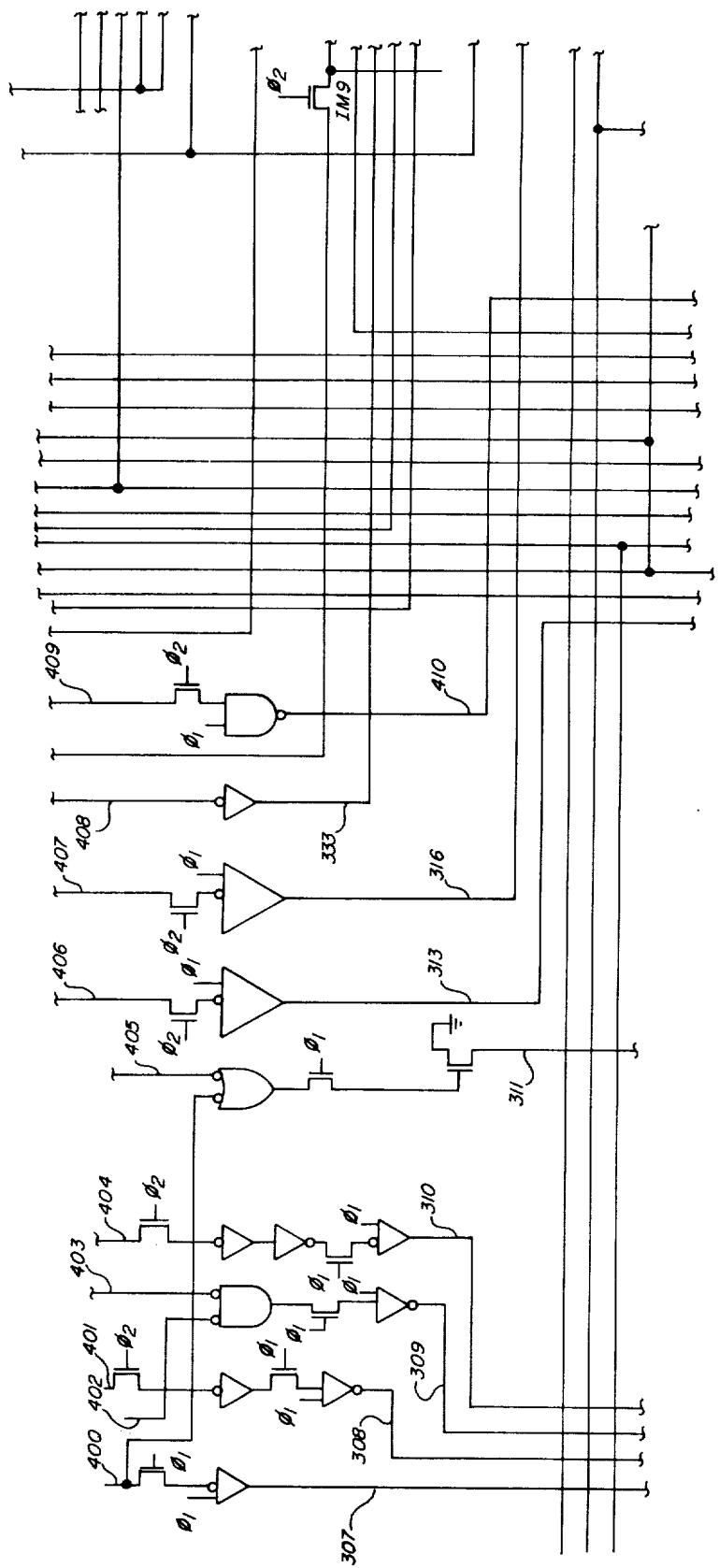
Figure 3A:
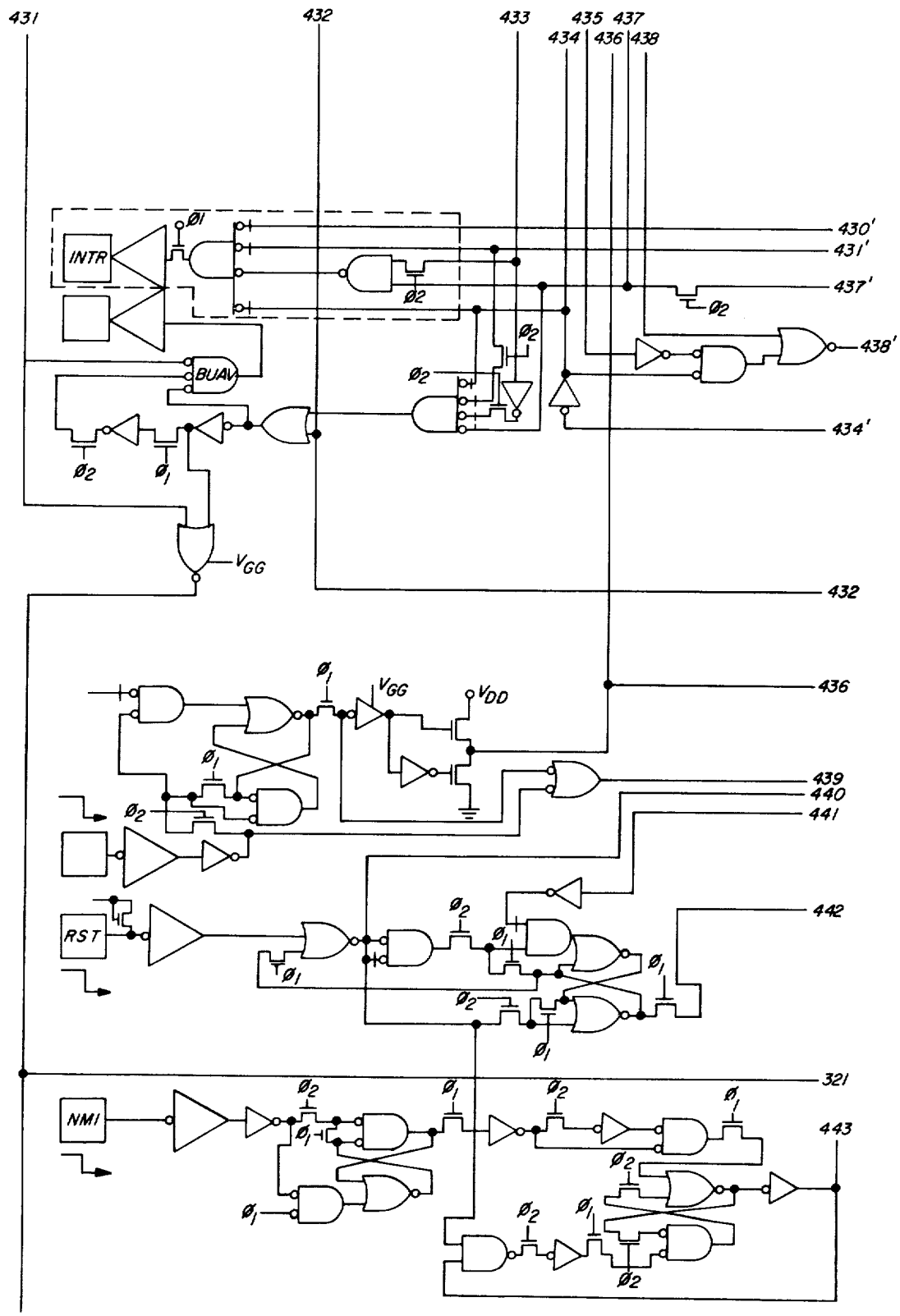
Figure 3B:
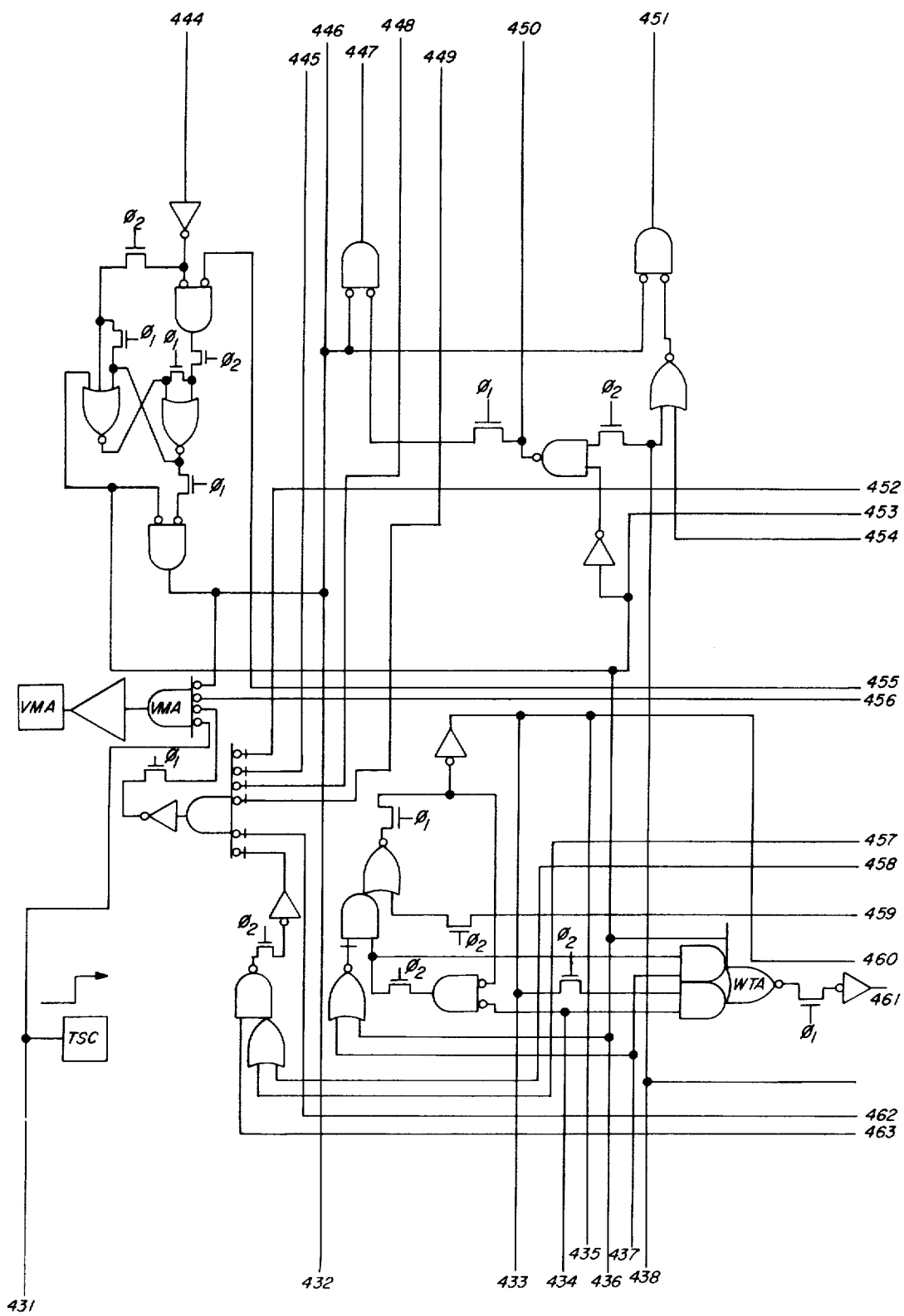
Figure 3C:
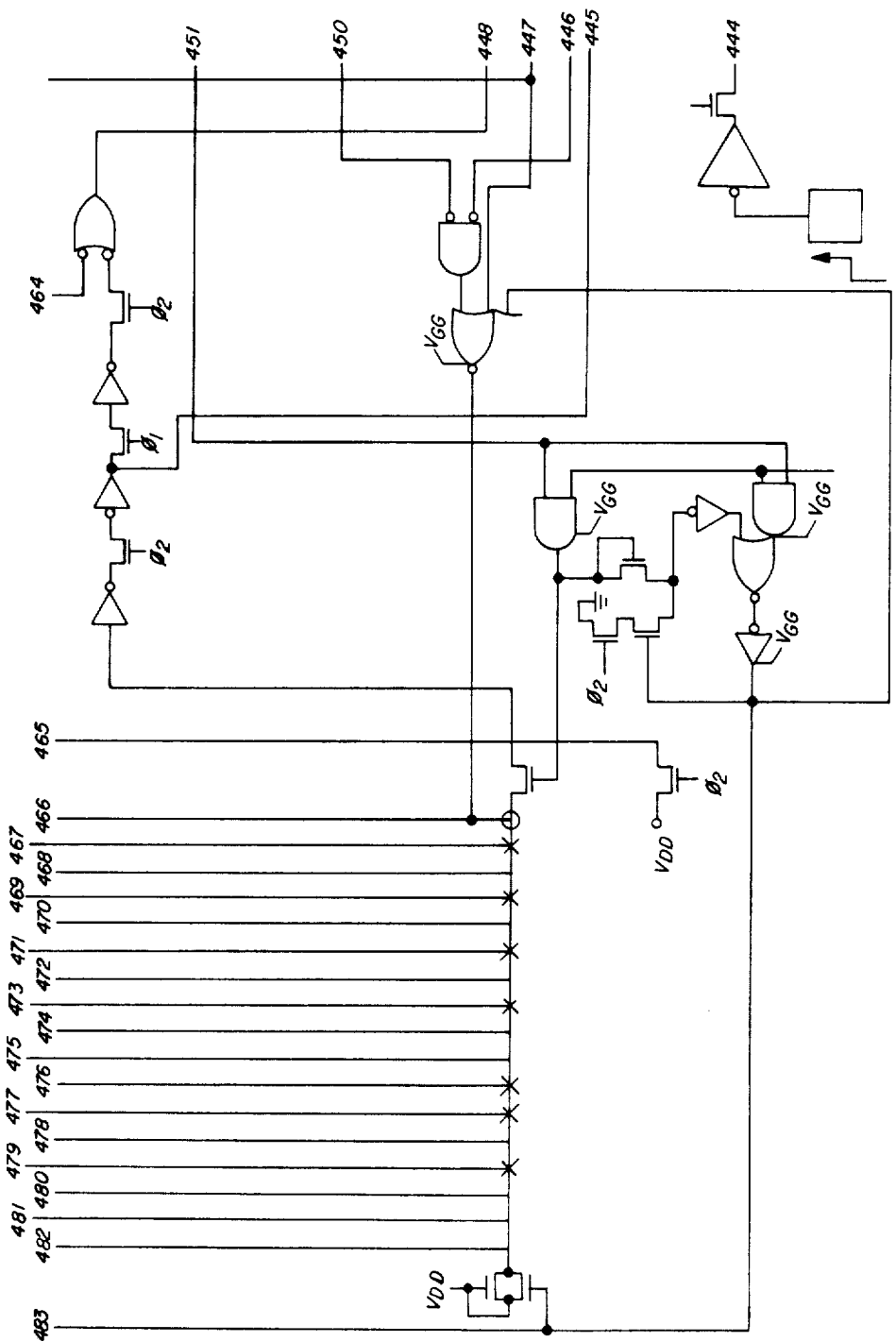
Figure 3D:
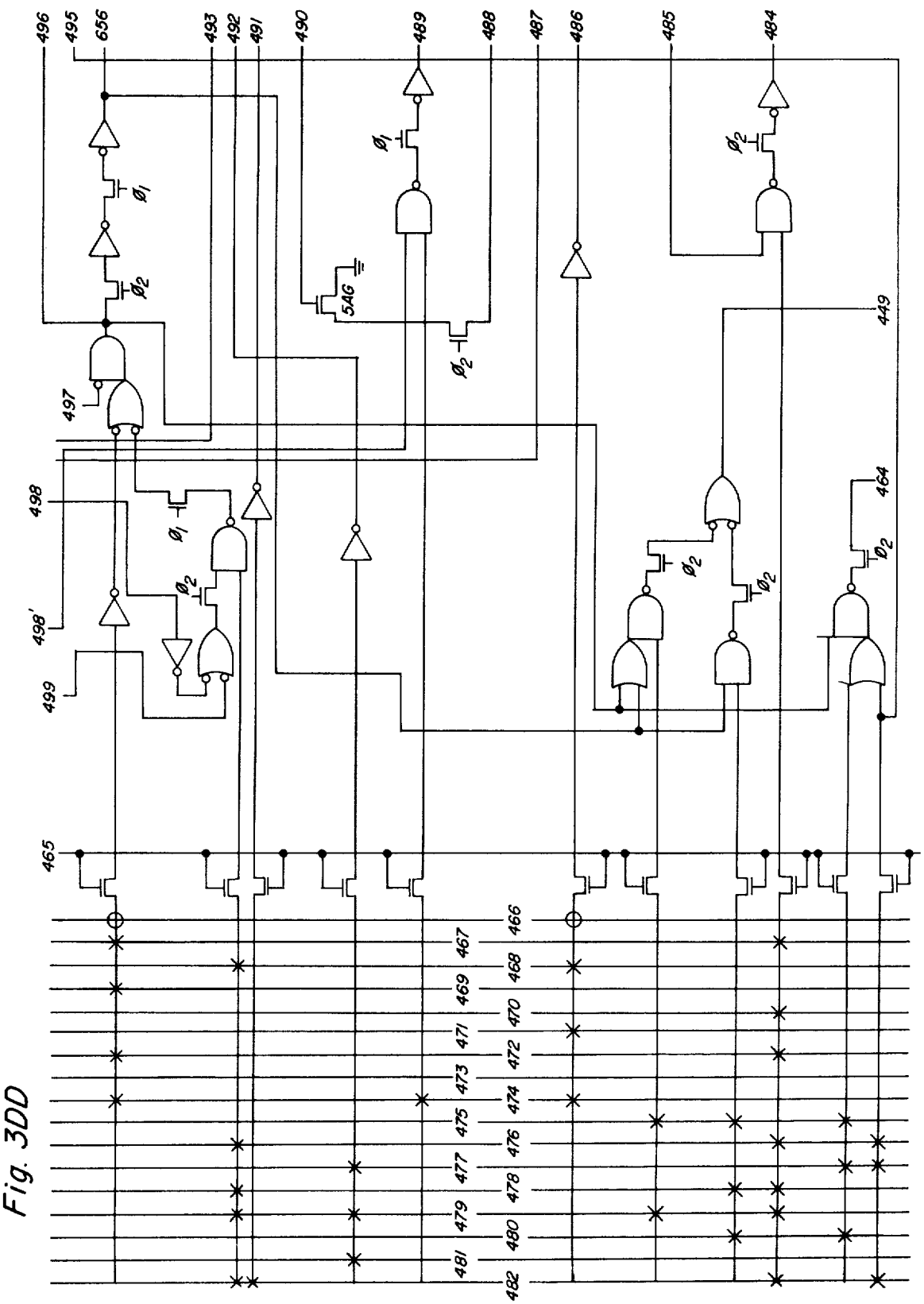
Figure 4:
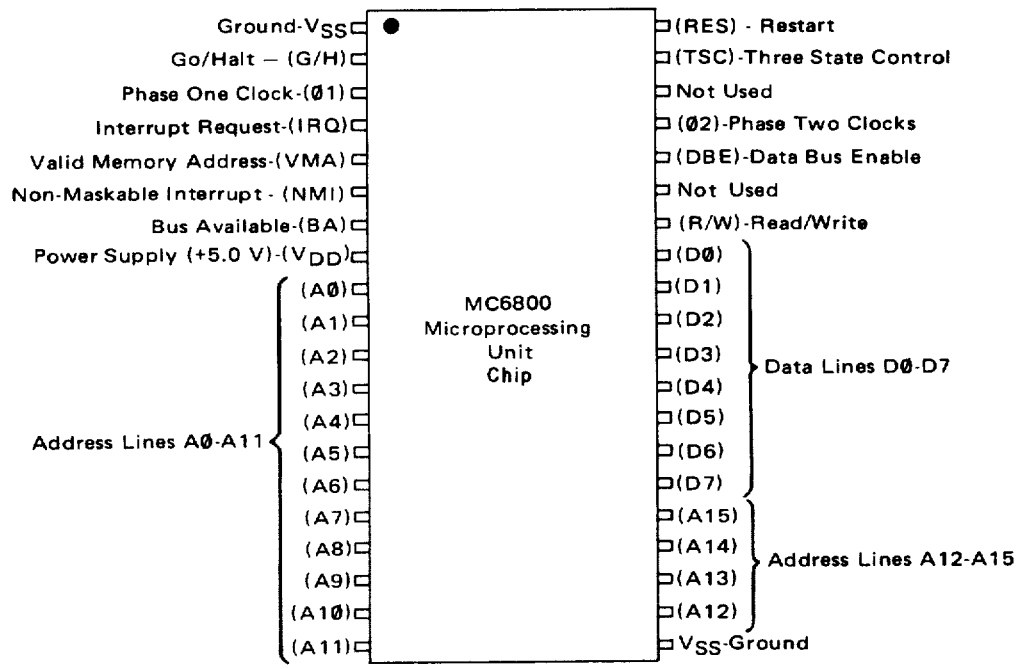
FIG. 4 is a diagram illustrating a dual-in-line semiconductor package for the microprocessor chip of FIGS. 1–3 indicating the input and output signal connections.
Figure 5:
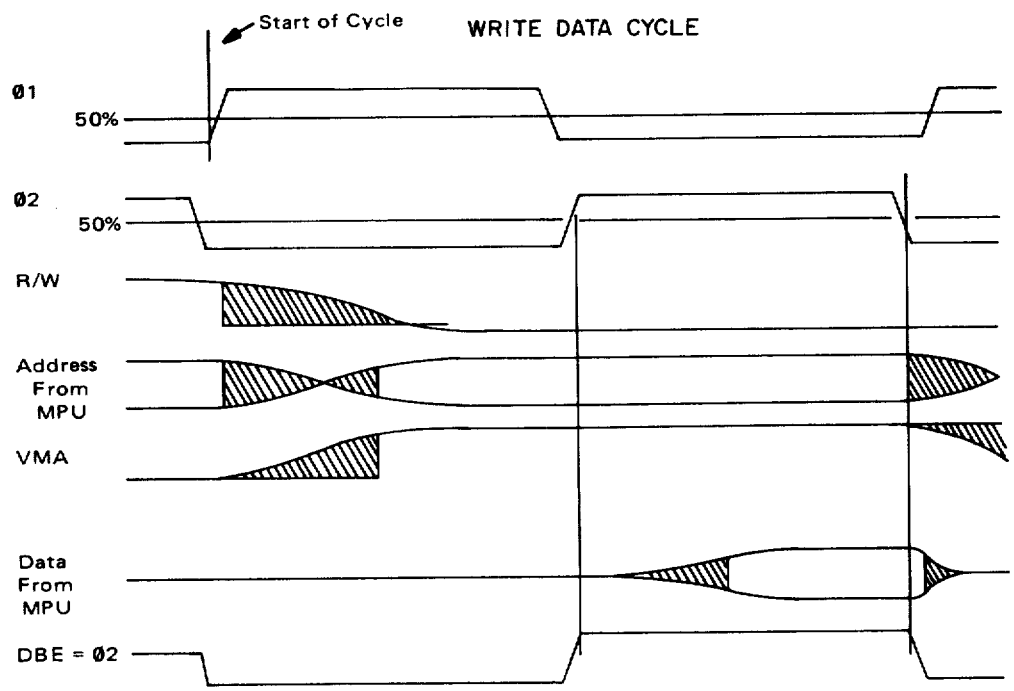
FIG. 5 is a timing diagram descriptive of a Write Memory cycle of the microprocessor of FIGS. 1–4.

Prior to describing the interconnections of FIG. 1 in detail, it is helpful to describe the various signals which are externally applied to or generated by microprocessor unit (MPU) chip 10 and also to describe the programmable registers and the addressing modes of chip 10. The external signals applied to or generated by microprocessor unit 10 are illustrated in FIG. 4, which indicates the external lead connections of the forty-pin package housing microprocessor chip 10. The dual-in-line forty-pin package is designated by reference numeral 510. The two clocks, $\phi 1$ and $\phi 2$ required by the system are non-overlapping clock signals as illustrated in the timing diagrams of FIGS. 5 and 6. For the circuit schematic of FIG. 3 for micro-processor 10, clock signals $\phi 1$ and $\phi 2$ operate at the $V_{DD}$ voltage level. The address bus includes 16 address lines A$\phi$– A15. The low order address lines A0 – A7 are designated by reference numeral 14 in FIG. 1, are driven by output buffers OBL, and are clearly designated in FIG. 4. The high order address lines A8 –A15 are designated by reference numeral 12 in FIG. 1, are driven by output buffers OBH, and are also clearly designated in FIG. 5. The bidirectional external data bus includes data lines D$\phi$– D7 driven by data output buffers OBH and sensed by data input registers DBI, and is used for transferring data to and from external memory and external peripheral devices controlled by the microprocessor chip 10.

The 16 address lines comprising the address bus are used for addressing external memory and peripheral control devices, to be described later. The Go/Halt (G/H) input, when in the high state, causes the machine to fetch the instruction addressed by the incrementer, (indicated by reference numerals 36 and 40 in FIG. 1) or the program counters (indicated in FIG. 1 by reference numerals 58 and 66), and to start execution. When G/H is low, all activity in the machine will be halted. In the halt mode the machine will stop at the end of an instruction, and the bus available signal (BA) will be at a logical 1 level, and the valid memory address signal (VMA) will be at a logical 0 level, and all other three-state lines will be in the three-state mode (this three-state mode is a very high output impedance mode, wherein all driver devices are in an off state), leaving the output electrically floating. See the timing diagram of FIG. 6. The three-state control (TSC) input signal 20 is indicated by reference numeral 20 in FIG. 1 and causes all of the address lines A$\phi$ – A15 and the Read/Write (R/W) line to go into the off or high impedance state. The VMA and BA signals 24 and 26 will be forced to a low level. However, the data bus DB 30 is not affected by TSC, but rather by data bus enable signal (DBE) 91. The fact that the address lines A$\phi$ – A15 are driven by three-state bus drivers permits the microprocessor unit 10 to be used in direct memory addressing (DMA) applications, as explained hereinafter.

The Read/Write output tells the peripherals and memory devices whether the microprocessor unit is in a Read (high) or Write (low) state. A normal stand-by state of this signal is the Read (high) level. TSC going high causes the R/W buffer into the off (high impedance) state. Also, when the machine is halted, the R/W buffer will be in the off state. The valid memory address (VMA) output indicates to memory and peripheral devices that there is a valid address on the address bus ABL, ABH. In normal system operations, VMA may be ANDed with $\phi 2$ or an address line to provide enable signals for external memory devices and peripheral interface devices. The data bus enable (DBE) input 91 is a three-state control signal for the microrocessor data bus and enables the data bus drivers DBO when in the high state. When it is desired for another device to control the data bus as in certain direct memory access applications, DBE should be held low. The interrupt request (IRQ) input 51 requests an interrupt sequence be generated within the microprocessor chip 10. The microrocessor chip waits until it completes the current instruction that is being executed before it recognizes the request. At that time, if the interrupt mask bit in the condition code register is not set the machine will begin an interrupt sequence in which the index register IXL, IXH (65, 59) the program counter (58, 66) the accumulators ACCA, 82, and ACCB, 77 and the condition code register 85 are stored away on an external RAM (random access memory) stack. Next, the microprocessor 10 will respond to the interrupt request by setting the interrupt mask bit high so that no further interrupt cycles may occur. At the end of the cycle, a 16-bit address will be loaded which points to a vectoring address which is located in memory locations N-6 and N-7. An address loaded at these locations causes the microprocessor 10 to branch to an interrupt routine in external memory.

The bus available (BA) signal 26 is normally in a low state. When activated, it goes to a high state indicating that the microprocessor 10 has stopped and that the address bus is available. This occurs if the Go/Halt line is in the Halt (low) state or the processor is in the wait state as a result of the execution of a wait instruction. At such time, all three-state output drivers will go to their off state and other outputs to their normal inactive level. The processor is removed from the WAIT state by the occurrance of a maskable or a non-maskable interrupt signal. The restart (RST) signal is used to start the microprocessor 10 from a power down condition resulting from a power failure or in the initial start up of the microprocessor. If a positive edge is detected on this input the microprocessor will be signaled to begin a restart sequence. This will restart the microprocessor. All the higher address lines are forced high. For the restart operation, the last two (N-1, N) locations in this area will be used to load the program that is addressed by the program counter.

A non-maskable interrupt (NMI) signal requests that a non-maskable-interrupt sequence be generated within the microprocessor. The interrupt mask bit in the condition code register has no effect on NMI. This sequence could be considered to be a high priority interrupt sequence. The index register, the program register, the accumulators, and the condition code register are stored away on the external memory stack. At the end of this cycle, a 16-bit address will be loaded that points to a vectoring address which is located in memory locations N-2 and N-3. An address loaded at these locations causes the microprocessor to branch to a non-maskable interrupt routine in memory.

The micro-processor chip 10 has four 16-bit registers and three 8-bit registers available for use by the programmer. This program counter PCL, PCH indicated by reference numerals 58 and 66, respectively, is a two byte register that points to the current program address. Its contents are updated after execution of an instruction. The incrementer INC which includes INCL and INCH, updates the current program address during the execution of a current instruction, by incrementing or decrementing its currents contents, and may load its contents into the program register independently of the address bus, and may function as an auxiliary register or as an up-down counter or incrementer/decrementer of other registers connected to the address bus or data bus. The stack pointer SPL, SPH, reference numerals 70 and 76, is a two-byte register that contains the address of the next available location in an external push-down/pop-up stack.

The index register IXL, IXH, is a two-byte register that is used to store a 16-bit memory address for the indexed mode of memory addressing. The microprocessor unit 10 contains two 8-bit accumulators ACCA and ACCB that are used to hold operands and results from an arithemtic logic unit (ALU). Condition code register 85 indicates the results of an arithmetic logic unit operation, including negative number, (N, O) Z (overflow) V, carry from bit-8 (C), halfcarry from bit 3 (H), and the interrupt mask bit (I). These bits of the condition code register are used as testable conditions for the conditional branch instructions. The microprocessor described with reference to FIGS. 1, 2, and 3, has seven address modes that can be used by a programmer, with the addressing mode a function of both the type of instruction and the coding within the instruction. They are as follows.

In accumulator addressing, either accumulator A or accumulator B is specified. These are one-byte instructions. In immediate addressing, the operand is contained in the second and third bytes of the instruction. No further addressing of memory is required. The microprocessor addresses this location when it fetches the immediate instruction for execution. These are two or three-byte instructions. In direct addressing, the address of the operand is contained in the second byte of the instruction. DIrect addressing allows the user to directly address the lowest 256 bytes in a machine. That part of the memory should be used for temporary data storage and intermediate results. These are two-byte instructions.

In extended addressing, the address contained in the second byte of the instruction is used as the higher eight-bits of the address of the operand. The third byte of the instruction is used as the lower eight-bits of the address for the operand. This is an absolute address in memory. These are three-byte instructions. In indexed addressing, the address contained in the second byte of the instruction is added to the index register's lowest eight-bits in the microprocessor. The carry is then added to the higher order eight-bits of the index register. This result has been used to address external RAM. The modified address is held in a temporary address register so there is no change to the index register. These are two-byte instructions. In the implied addressing mode the instruction gives the address. These are one-byte instructions. In relative addressing, the address contained in the second byte of the instruction is added to the program counter's lowest eight bits plus two. The carry or borrow is then added to the high eight bits. This allows the user to address data within a range of −125 to +129 bytes of the present instruction. These are two-byte instructions.

Returning to the description of FIG. 1, it is seen that the low order output bus 14 (A$\phi$ - A7) is driven by eight output bus low buffers 18 (OBL) and high order address bus 12 (A8 - A15) driven by eight output bus high (OBH) buffers 28. OBH buffers 28 and OBL buffers 18 are enabled by Three-State Control (TSC) conductor 20, as is Read/Write output buffer 28, which is connected to and drives R/W (Read/Write) conductor 22. R/W buffer 28 has an input connected to bus control logic circuitry 11. Output bus low buffers 18 are respectively driven by lower order address (ABL) conductors 32 and internal Data Bus (DB) conductors 30.

It will be noted that the pointed ends of the various buses in FIG. 1 indicate the deviations of the data flow.

OBH buffers 16 are driven by address bus high (ABH) conductors 34. INcrementer 36 (INCL) is connected between ABL Bus 32 and Data Bus 30. It should be understood that sections such as 46 and 50 which couple INCL to ABL and DB indicate the data transfer directions possible by means of coupling circuitry understood to be associated with the registers or counters such as INCL. It will be convenient to consider sections 46 and 50 as representing coupling circuitry and the arrow tips as indicating possible directions of data transfers through the specific coupling circuitry. The program counter PC includes program counter low (PCL), designated by reference numeral 58, and program counter high (PCH), indicated by reference numeral 66. PCL, reference numeral 58 is coupled between ABL, reference numeral 32, and DB, reference numeral 30, by coupling circuitry 60 and 62 and is coupled to INCL by coupling circuitry 48. Similarly, PCH is coupled between DB, reference numeral 30, and ABH, reference numeral 34, by coupling circuitry 64 and 68 and is coupled to INCL by coupling circuitry 56.

The program counter PC, including program counter low (PCL), reference numeral 58 and program counter high (PCH), reference numeral 66, is actually a program register. Its contents are updated by INC, which includes INCL, reference numeral 36 and INCH, reference numeral 40, and may be regarded as counter means. Counter means, generally speaking, may be an incrementer or a decrementer, or in the most general sense, an up counter or a down counter.

The stack pointer includes the stack pointer low (SPL) register 70 and stack pointer high (SPH) register 76. SPL is coupled between ABL and DB by coupling circuitry 72 and 74, respectively. SPH is coupled between DB and ABH by coupling circuitry 78 and 80, respectively. The index register includes index register low (IXL) register 65 and index register high (IXH) register 69. (Note that the terms high and low as used herein refer to registers coupled, respectively, to the high order and low order address buses, A$\phi$ - A7 and A8 - A15, respectively. IXH is coupled between DB and ABH by coupling circuits 71 and 73, respectively. IXL is coupled between ABL and DB by coupling circuitry 63 and 67. An additional address bus low ABL1, reference numeral 81, is connected to ABL by switching circuit (SW) 59. IXL is coupled to ABL1 by coupling circuit 61. IXH is coupled to ABL1 by circuitry 75. Accumulator A (ACCB), reference numeral 77, is connected between ABL1 and DB by coupling circuits 79 and 44, respectively. Accumulator A (ACCA), reference numeral 82, is connected between ABL1 and DB by coupling circuits 83 and 84, respectively. Condition code register 85, is connected to DB by coupling circuitry 86 and is connected to arithmetic logic unit (ALU) 88 by coupling circuitry 87. ALU is connected to ABL1 and to DB by coupling circuit 89 and also by coupling circuit 90. External data bus D$\phi$ - D7, reference numeral 57, is coupled to internal data bus DB, reference numeral 30, by data output buffers (DBO) 92, which are enabled by DBE (Data Bus Enable) input conductor 91.

Bus control circuitry 11 is connected to Read/Write output buffer 28 and generates the R/W signal, and also generates the valid memory address (VMA) signal on conductor 24 and the bus available (BA) signal on conductor 26. Bus control circuitry 11 is connected to Halt logic circuitry 13, which is driven by the input Halt/Go signal on conductor 15. Timing generator 21 generates control signals on conductor 19 which control bus control circuitry 11.

Timing generator 21 has clock signals $\phi 1$, reference numeral 31, and $\phi 2$, conductor 29, connected thereto. Timing generator 21 also generates timing signals on conductors 25 which are connected to instruction decode and control circuitry 41 and interrupt logic 45 which is also connected to instruction decode and control circuitry 41. Interrupt logic circuitry 45 generates an interrupt response signal on conductor 47'. Instruction register (IR) 53 is coupled between external data bus 57 and instruction decode and control circuitry 41 by coupling circuits 96 and 55, respectively. Instruction decode and control circuitry 41 generates a plurality of control signals on conductors 43 which are understood to be dispersed throughout the registers and buses and arithmetic logic unit circuitry and the various coupling circuits associated therewith to control in proper sequence the necessary data transfers during execution of the various instructions. These connections are shown in FIG. 3, but not in FIG. 1. Temporary register 38, designated also by letter T, is coupled to DB and ABH by coupling circuits 42 and 38, respectively.

The functions of the registers in FIG. 1, each of which is eight bits (i.e., one byte) in length in the presently preferred embodiment of the invention, are as follows. The program counter contains two eight-bit registers PCH and PCL which point to the current program address. The stack pointer includes two eight-bit registers SPH and SPL and points to the stack in memory. The index register contains two registers IXH and IXL which may address any location in the system. Two eight-bit counters which are actually updown counters INCH and INCL are used for incrementing and decrementing the stack pointer, the index register and program counter and itself. INCH and INCL may also be used as a temporary address register. Temporary storage register T is used to store the higher order address bits. The two accumulators, ACCA and ACCB, are used to hold operands and results from the arithmetic logic unit (ALU) 88. The condition code register 85 is connected to the ALU and indicates Negative number, Zero, Overflow, Carry from bit seven Carry from bit three, and Interrupt Mask Flags.

The data buffer input register (DBI) and the eight-bit instruction register (IR) latch up and hold information applied to external data bus 57. The bus switch SW, when activated, connects the buses ABL and ABL1 to each other, and is bidirectional and can transmit data in either direction. The data bus output buffer, DBO, the output address high, buffers OBH, and the output address low buffers OBL, contain three-state output buffers, which are known in the art. One type is described in the copending patent application Ser. No. 519,150.

Figure 7:
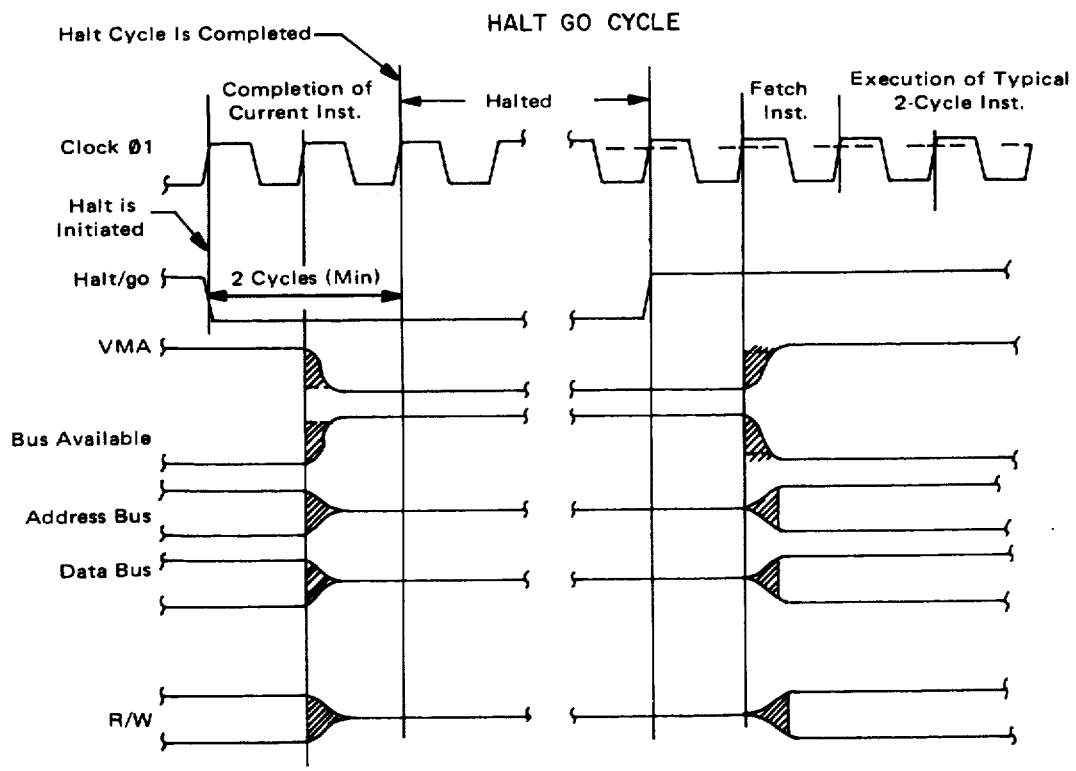
FIG. 7 is a timing diagram descriptive of a Halt cycle for the microprocessor of FIGS. 1–4.

The basic read cycle of the microprocessor of FIGS. 1–3 is shown in FIG. 7. The address output signals $A\phi$ – A15 and the valid memory address (VMA) signal are generated as outputs at the beginning of $\phi1$ and become stable at times A and B. It should be noted that the letters or alpha numeric designation for certain conductors herein may also be used to designate a signal on that conductor. The Read/Write (R/W) output signal is stable sometime later, designated by reference letter C. Points A, B, and C may be typically 300 nanoseconds later than point D, which is the leading edge of $\phi1$. The Memory Enable signal E may be equal to the logical product of VMA and $\phi2$ or an address bus, for example. Data must be stable at the external Data Bus inputs 57 to the microprocessor 10 at least a minimum time, which may be approximately 100 nanoseconds, before the trailing edge of $\phi2$. The data signal is simply the output signal of the accessed external memory.

Figure 6:
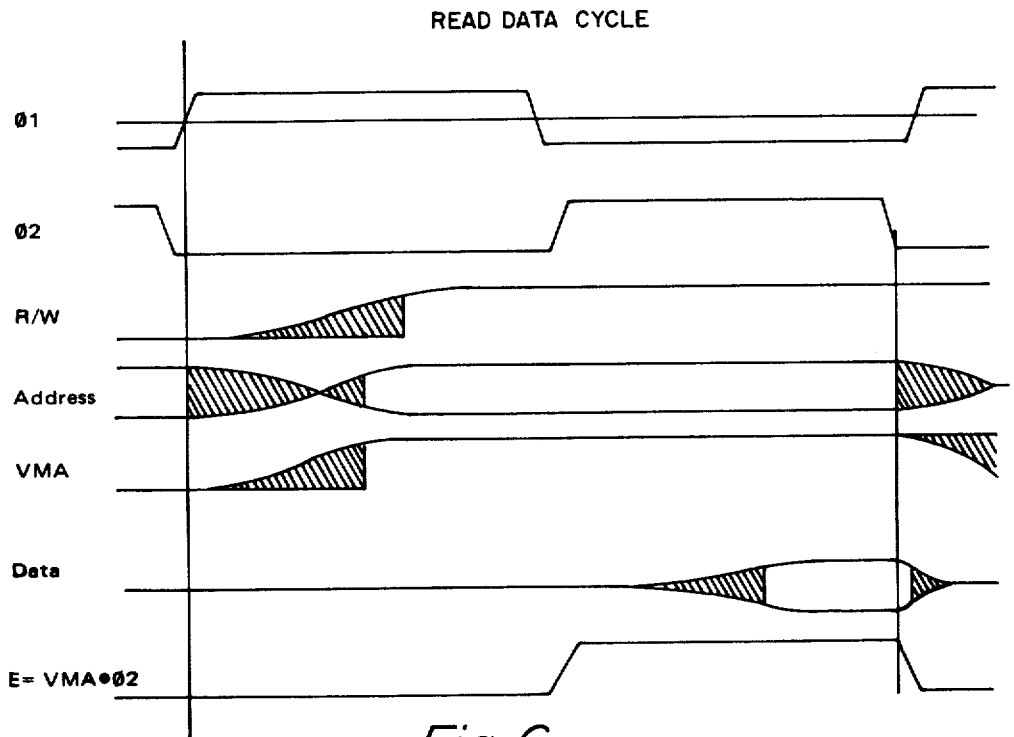
FIG. 6 is a timing diagram descriptive of a Read Memory operation of the microprocessor of FIG. 1–4.

The write data sequence for the micro-processor is illustrated in FIG. 6. The address and VMA are generated as outputs at the beginning of $\phi1$ and are stable approximately 300 nanoseconds later as in the Read cycle described above. The R/W line is also generated as an output at the beginnning of $\phi1$ and is stable in approximately 350 nanoseconds. The microprocessor Data Bus Enable (DBE) signal is enabled during $\phi2$. Data is generated at the microprocessor chip data output buses approximately 200 nanoseconds after the beginning of $\phi2$.

The instruction flow chart of FIG. 2 is a graphic representation of the instruction execution sequence which describes the exectuion of each instruction of the instruction set of the microprocessor of FIG. 1 and FIG. 4. by setting forth the data transfers between registers and busses during $\phi1$ of each machine cycle of the microprocessor. In FIG. 2 each block represents a $\phi1$ time frame and further represents the data transfers which occur during part of the execution of one particular instruction during $\phi1$ time frame. A line connecting two blocks representing data transfers during two consecutive $\phi1$ time frames represents the $\phi2$ time slot of the particular machine cycle. During $\phi2$ the incrementer contents may be updated, either by incrementing or decrementing the contents by unity, or may be altered by some other number. Also, during each $\phi2$ time frame the external memory location, addressed during $\phi1$ of the subject machine cycle, is enabled during $\phi2$ and the data read out from external memory is outputed therefrom onto the data bus, ie., is "jammed" into the data input register DBI.

In FIG. 2 the arrows (→) indicate a transfer of data from the bus or register or logic indicated on the left side of the arrow to the register or bus indicated on the right side of the arrow. For example, the data transfer designated DBI DB OBL, INCL means that the data in input buffer DBI is transferred to internal data bus DB (see FIG. 1) and from there to the outputs of OBL, which are address low conductors $A\phi$ – A7, and is also transferred to INCL.

Note that each block in FIG. 2 has in its lower right hand corner a smaller block with a number therein, which is for example, TSL$\phi$, or GP 51, etc. These alpha-numeric symbols represent names of time frames at which the data transfers designated in the larger block occur. Pulse signals which are given a corresponding alpha-numeric designation are generated by the control logic of the microprocessor chip and provide enabling signals to gating circutry which expedites the data transfers actually occurring in the $\phi1$ time immediately following the present time frame. Note that the alpha-numeric designation of the time frame data transfer enable signals of FIG. 2 also correspond to signals in FIG. 3 which are generated by the timing generator in FIG. 3.

The instruction list for the micro-processor of FIGS. 1 and 4 is shown in the table in FIG. 2N. The instruction set listed therein is established on the basis of average anticipated programming requirements for the projected microcomputer market.

Since execution of many of the instructions require many of the same data transfers, the amount of logic circuitry required to execute the entire set of instructions may be optimized by grouping instructions which require a substantial number of common data transfers and using enable signals generated by the same logic circuitry to effect the common data transfers. The bus and register structure of FIG. 1 also reflects the grouping of instructions in groups I–VI in FIG. 2. The grouping of the instructions was also done to optimize the timing of the various data transfer enable signals generated by the control circuitry of the micro-processor, and identify instructions of similar addressing modes.

Each group of instruction requires a particular subset of timing sequence data transfers. The groups were chose in order to minimize the amount of logic circuitry required to generate these timing sequences.

Figure 2A:
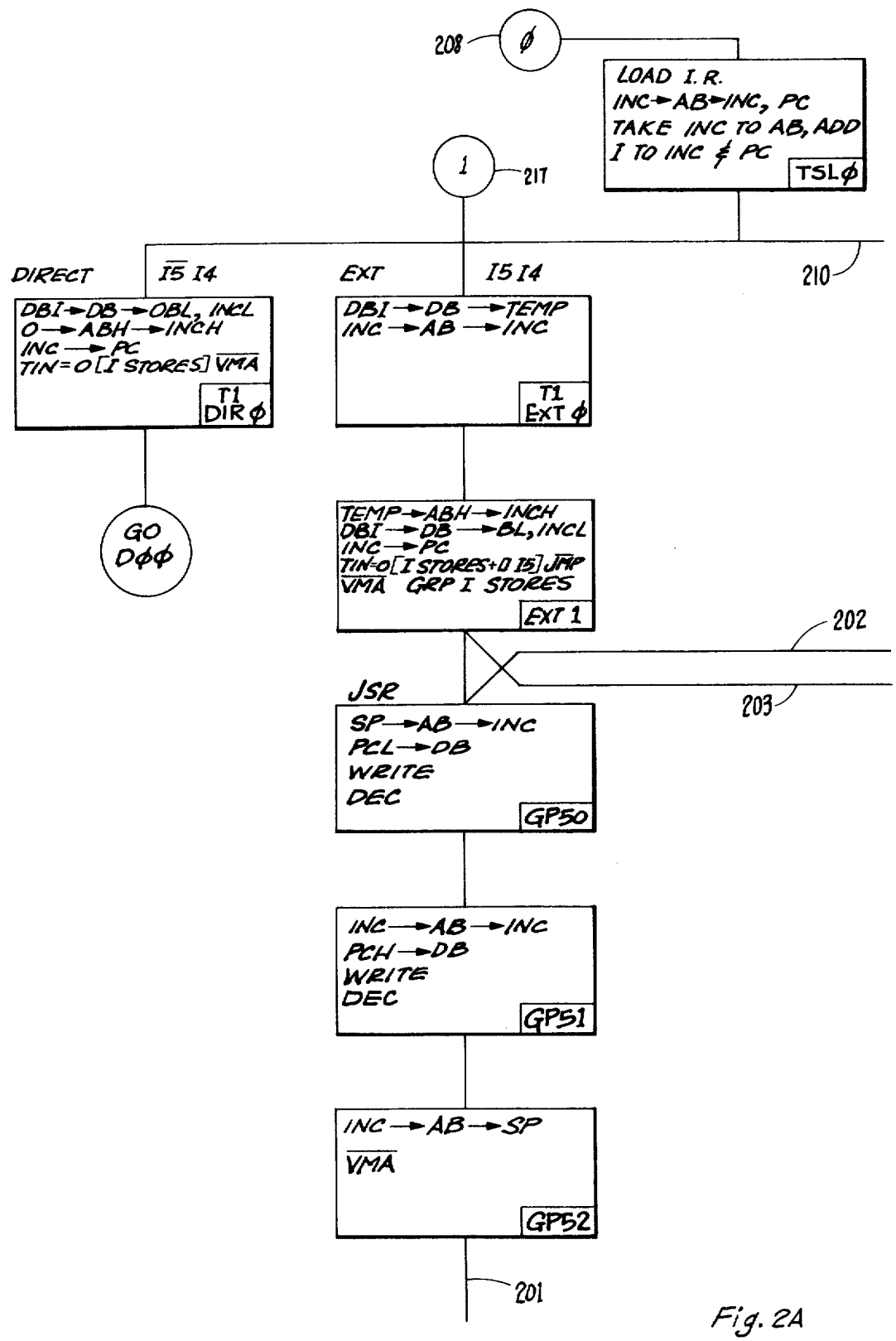
FIG. 2A–2N constitute an instruction flow chart for the microprocessor of FIG. 1 and FIGS. 3 and 4. Each of the sections in FIGS. 2A–2M is a section of the entire instruction flow chart, and the various sections fit together to form the whole as indicated by reference numerals 201–219, each of which represents a common line.
Figure 2B:
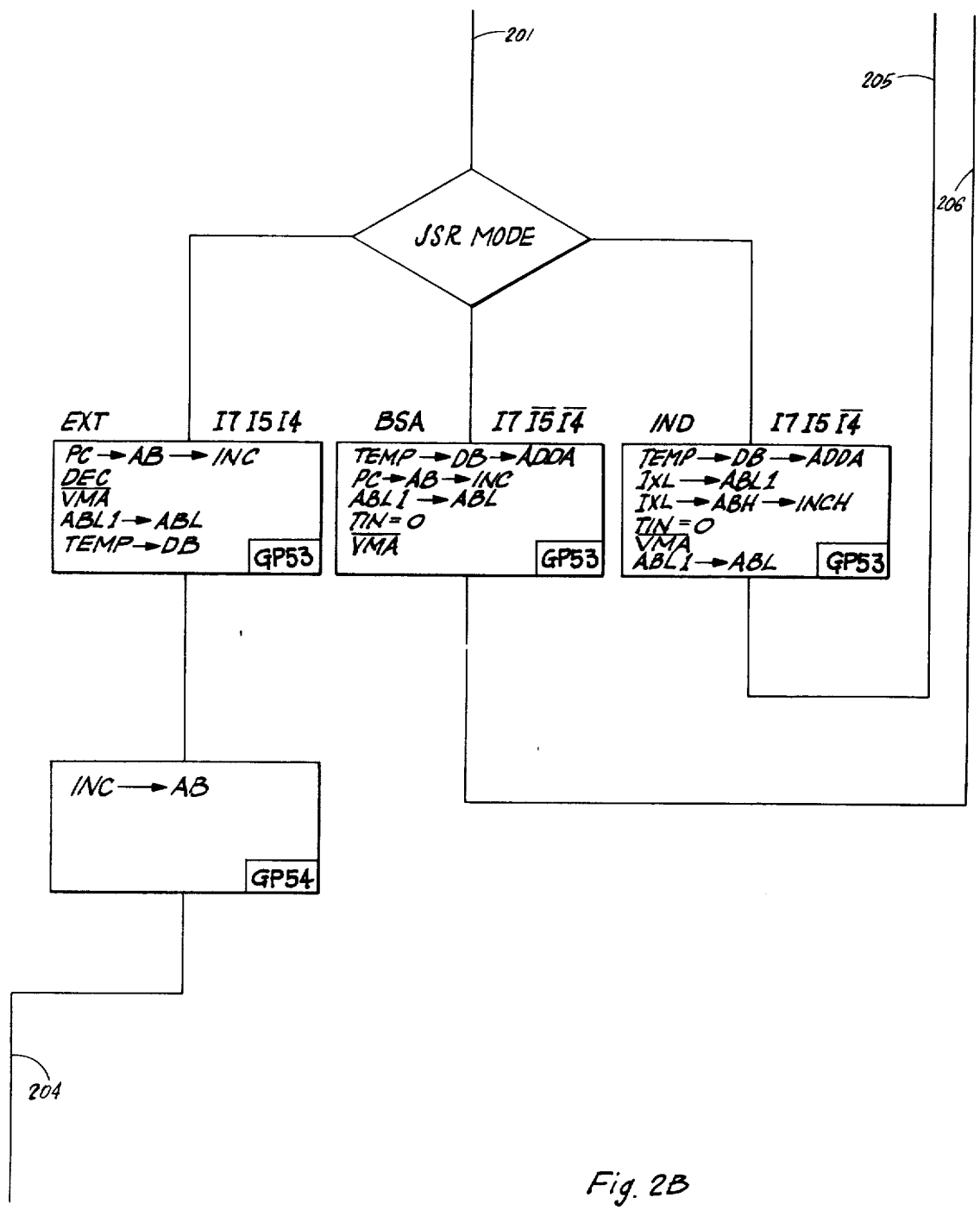
Figure 2C:
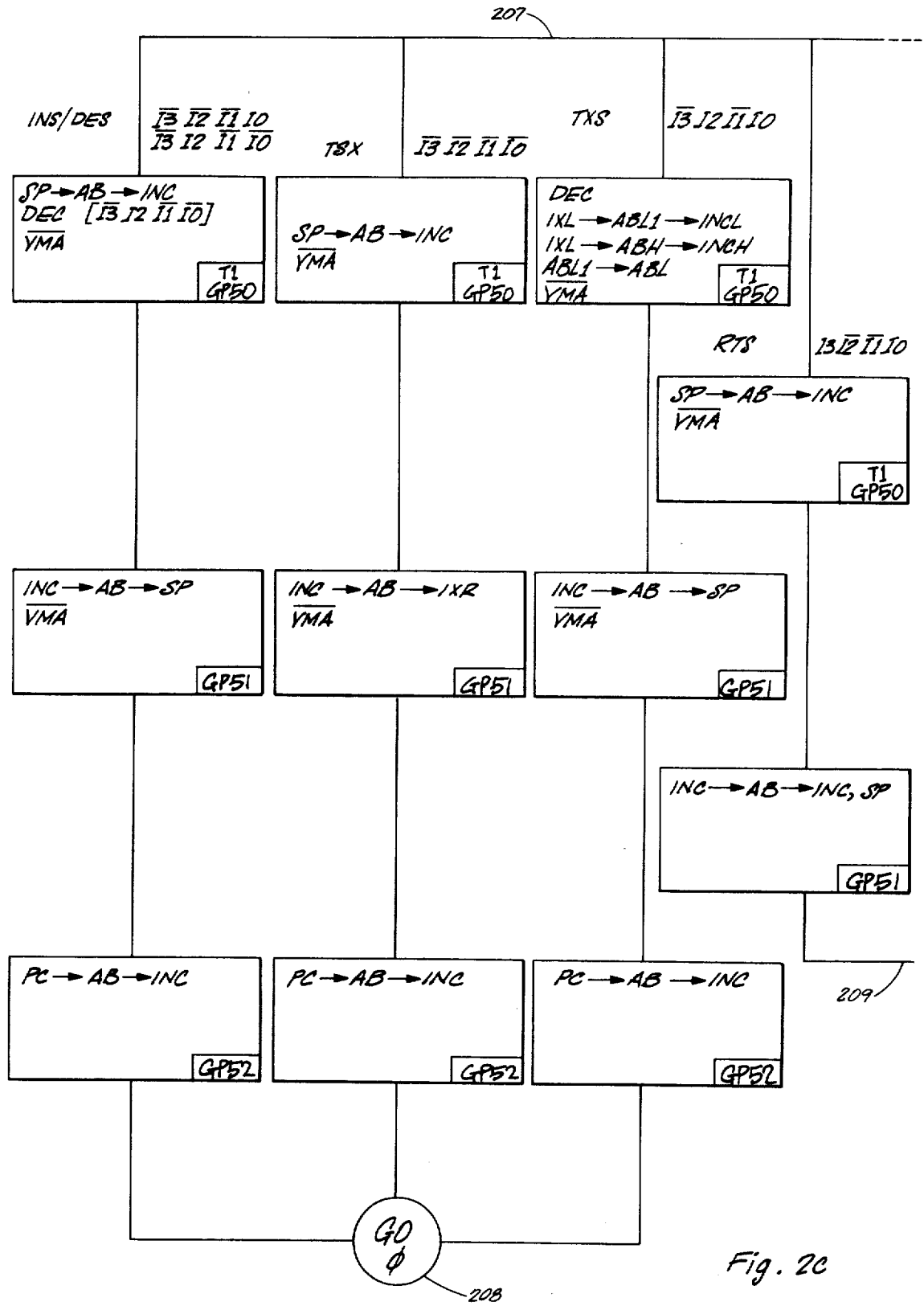
Figure 2D:
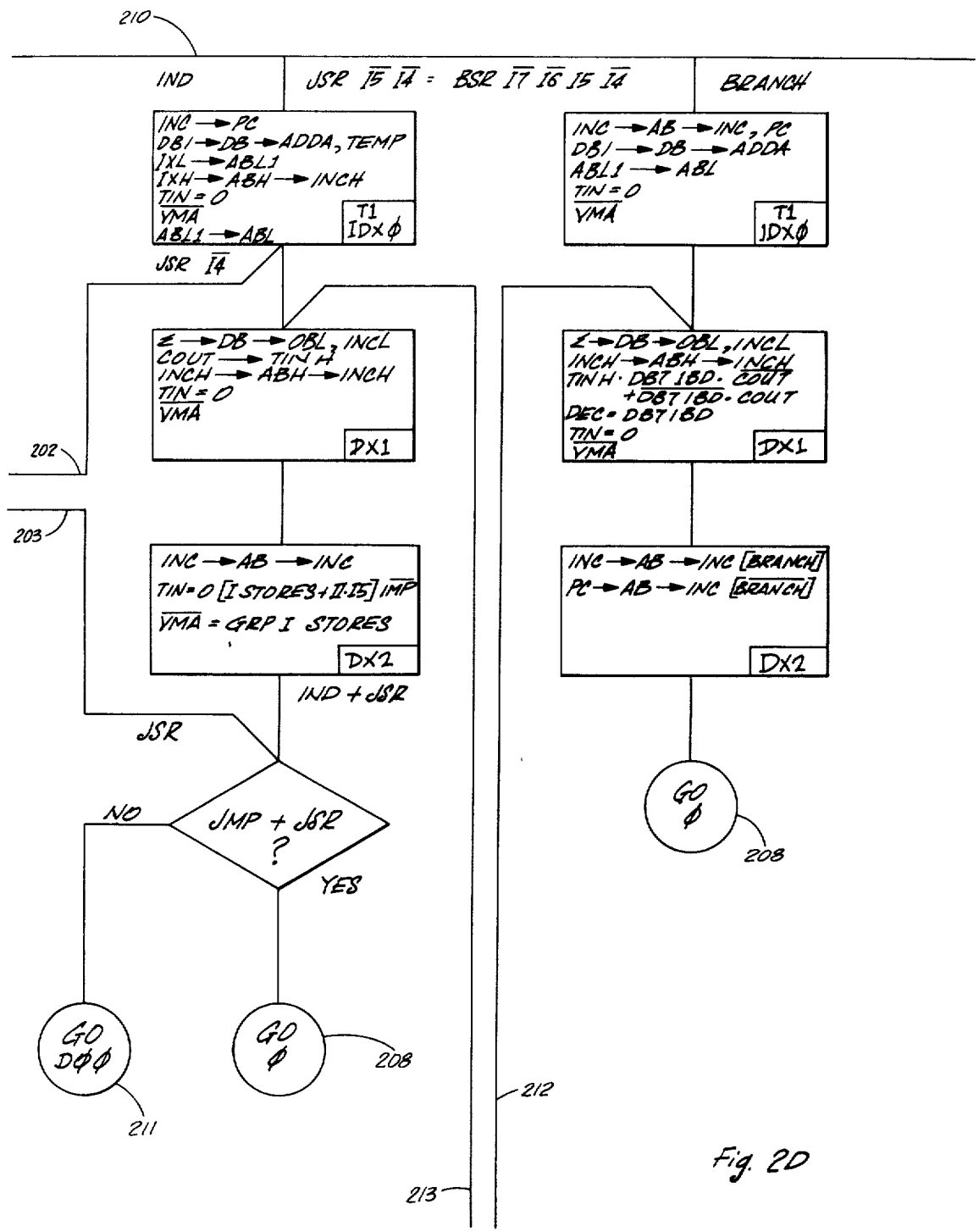
Figure 2E:
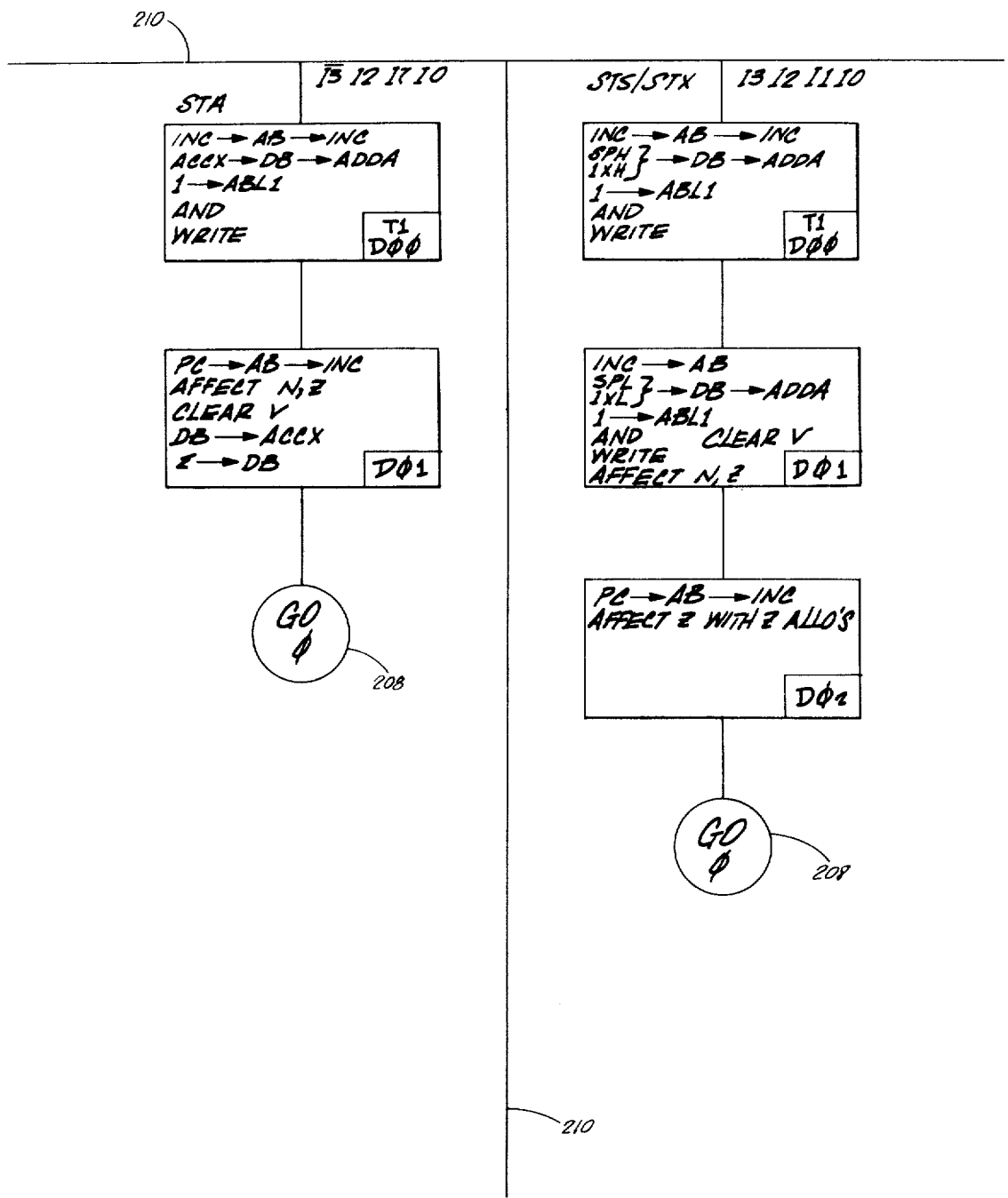
Figure 2F:
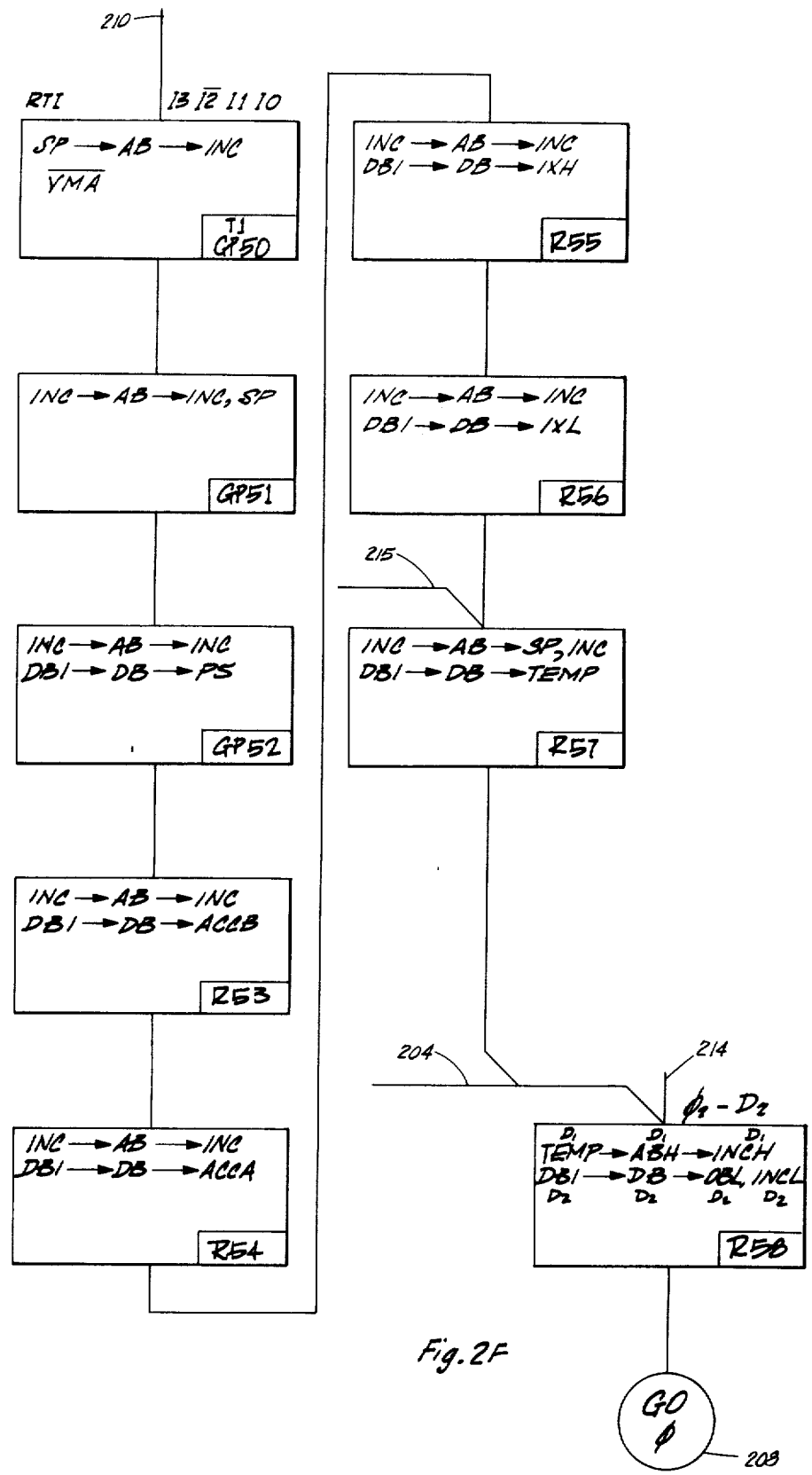
Figure 2G:
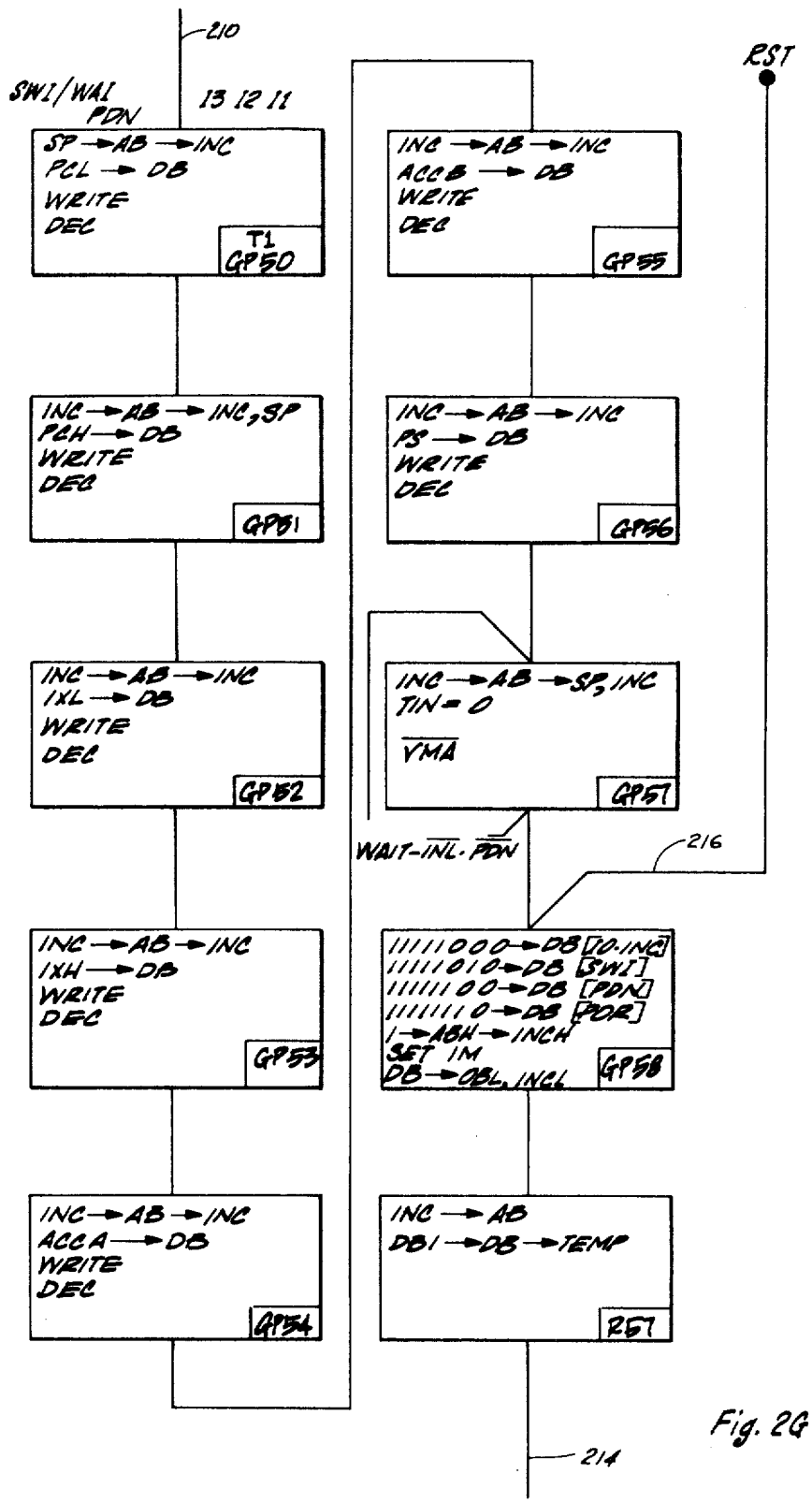
Figure 2H:
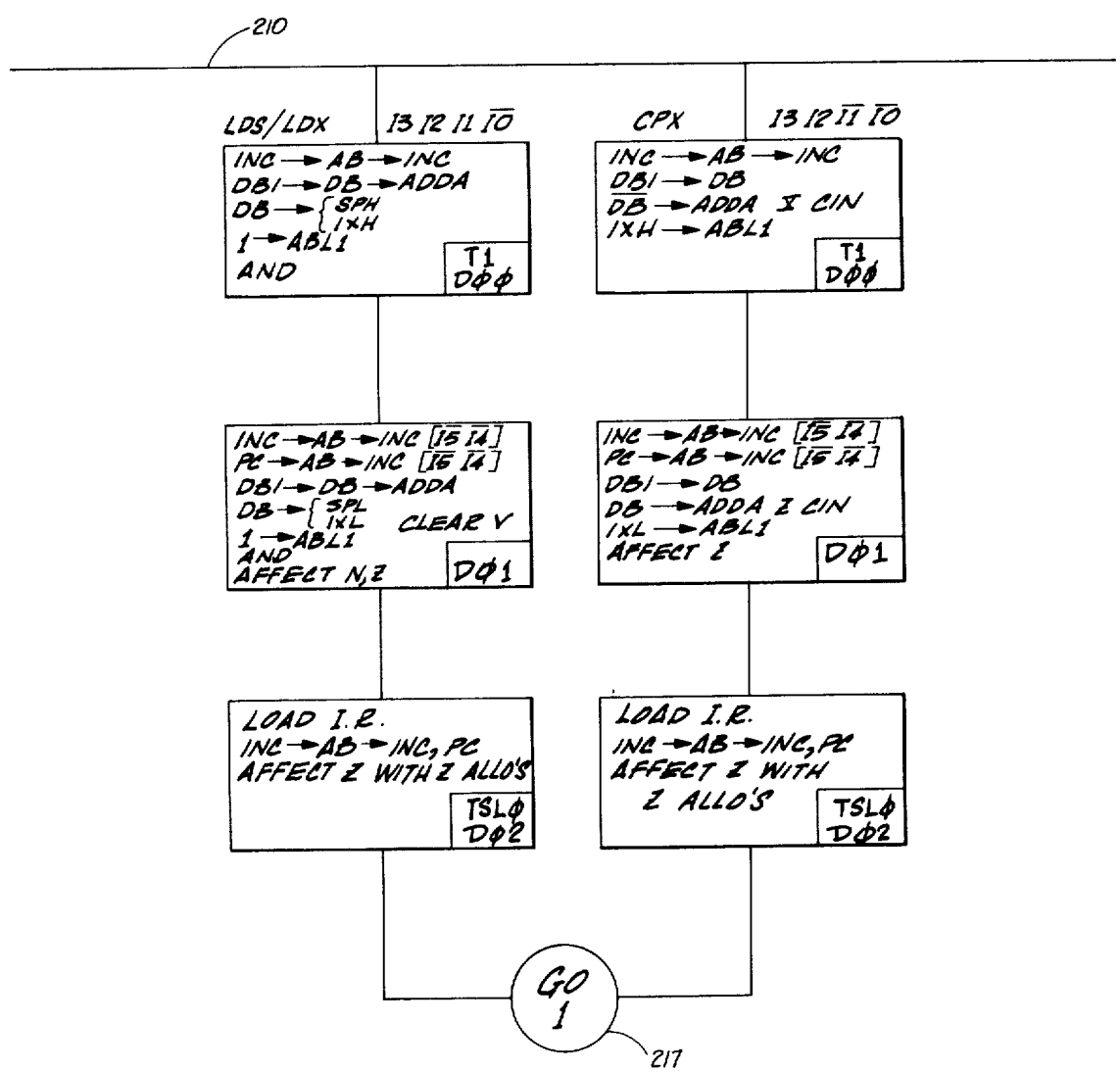
Figure 21:
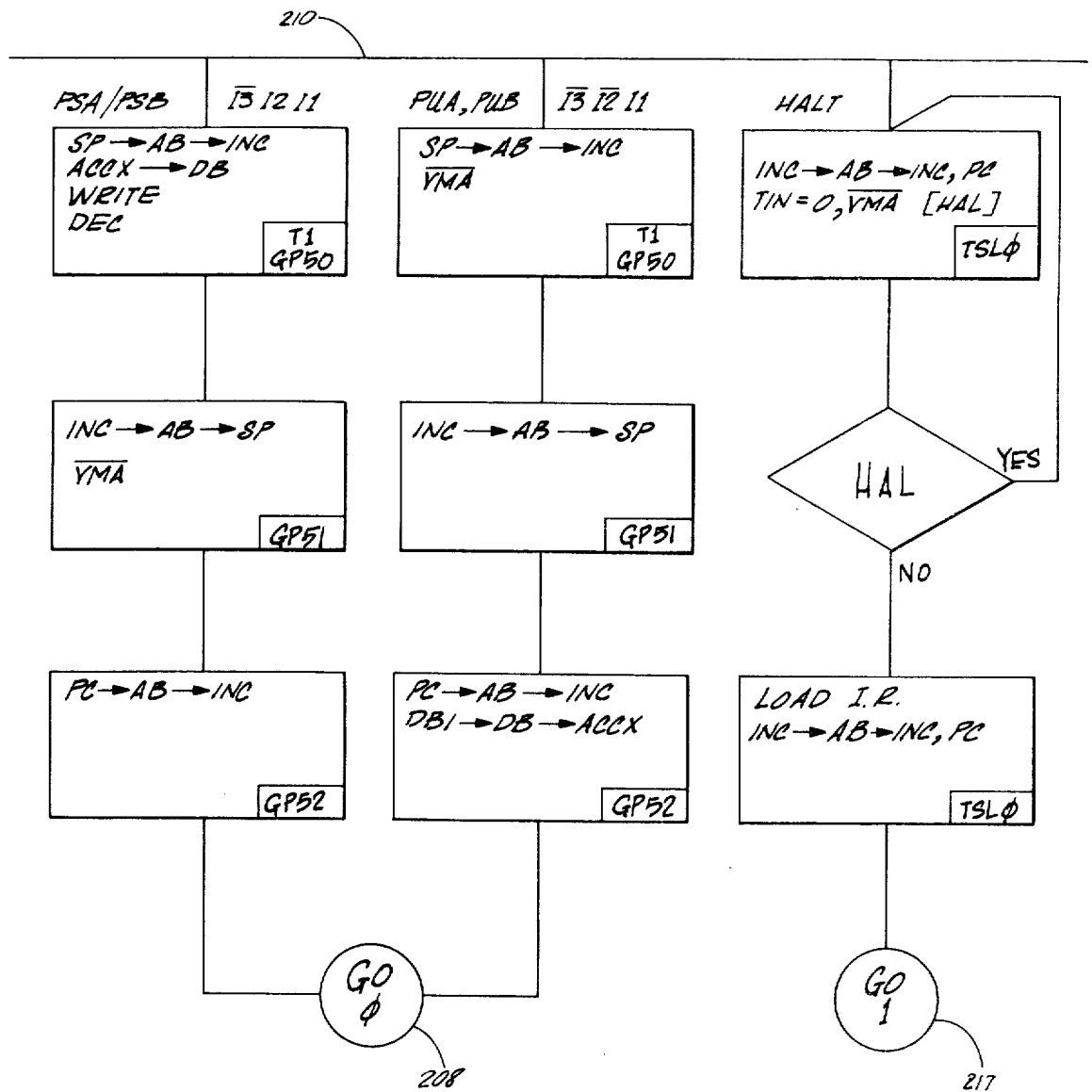
Figure 2J:
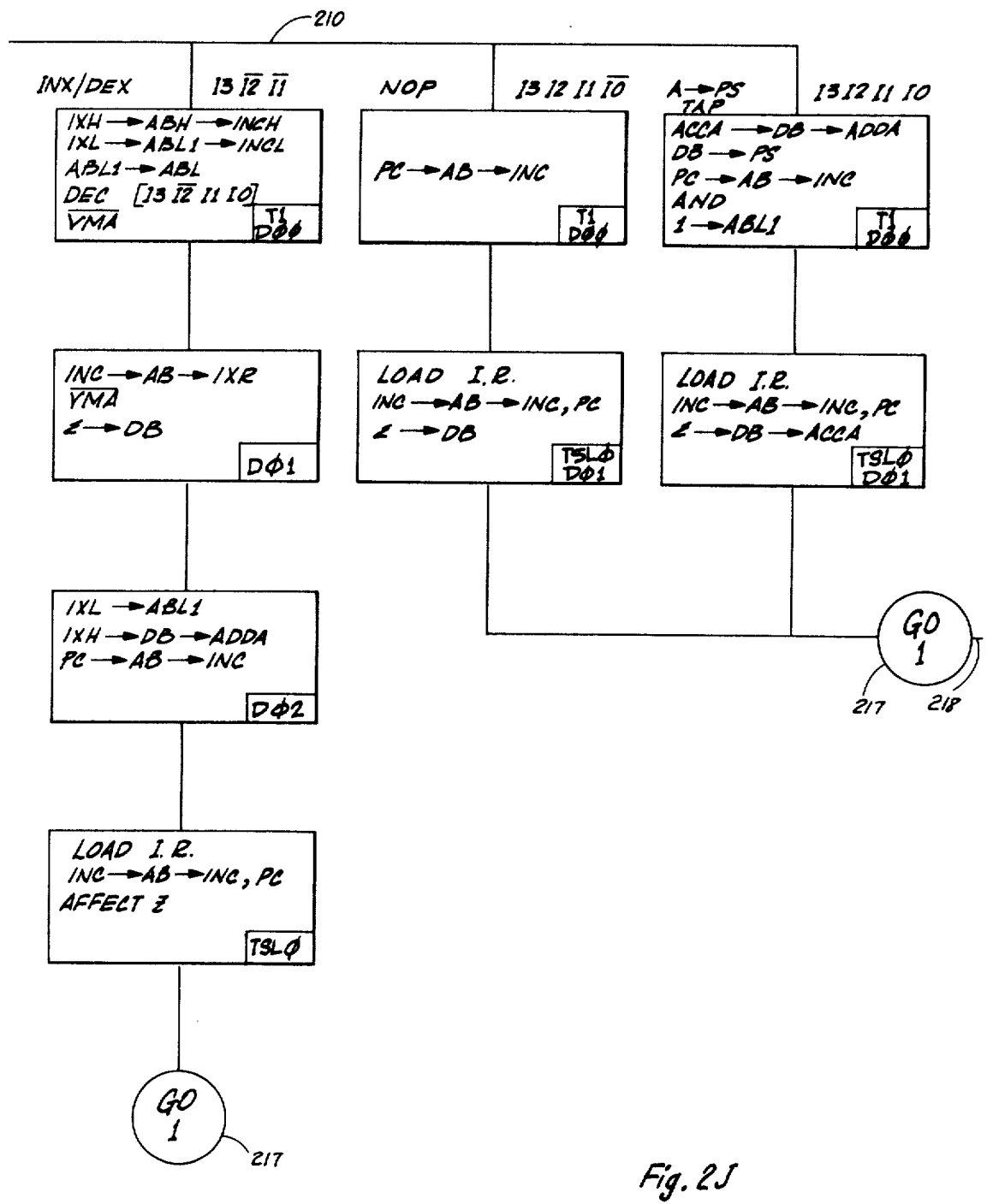
Figure 2L:
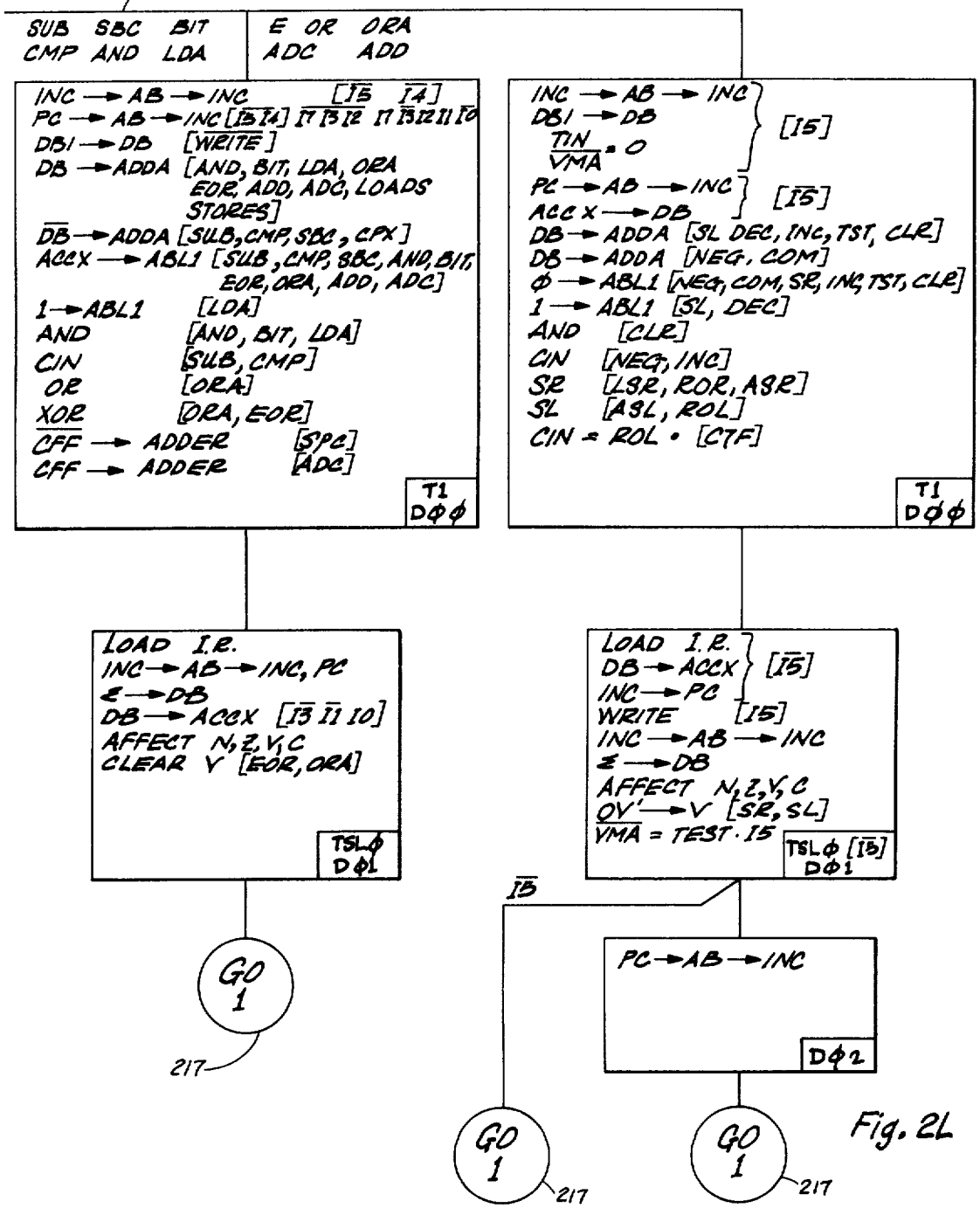
Figure 2M:
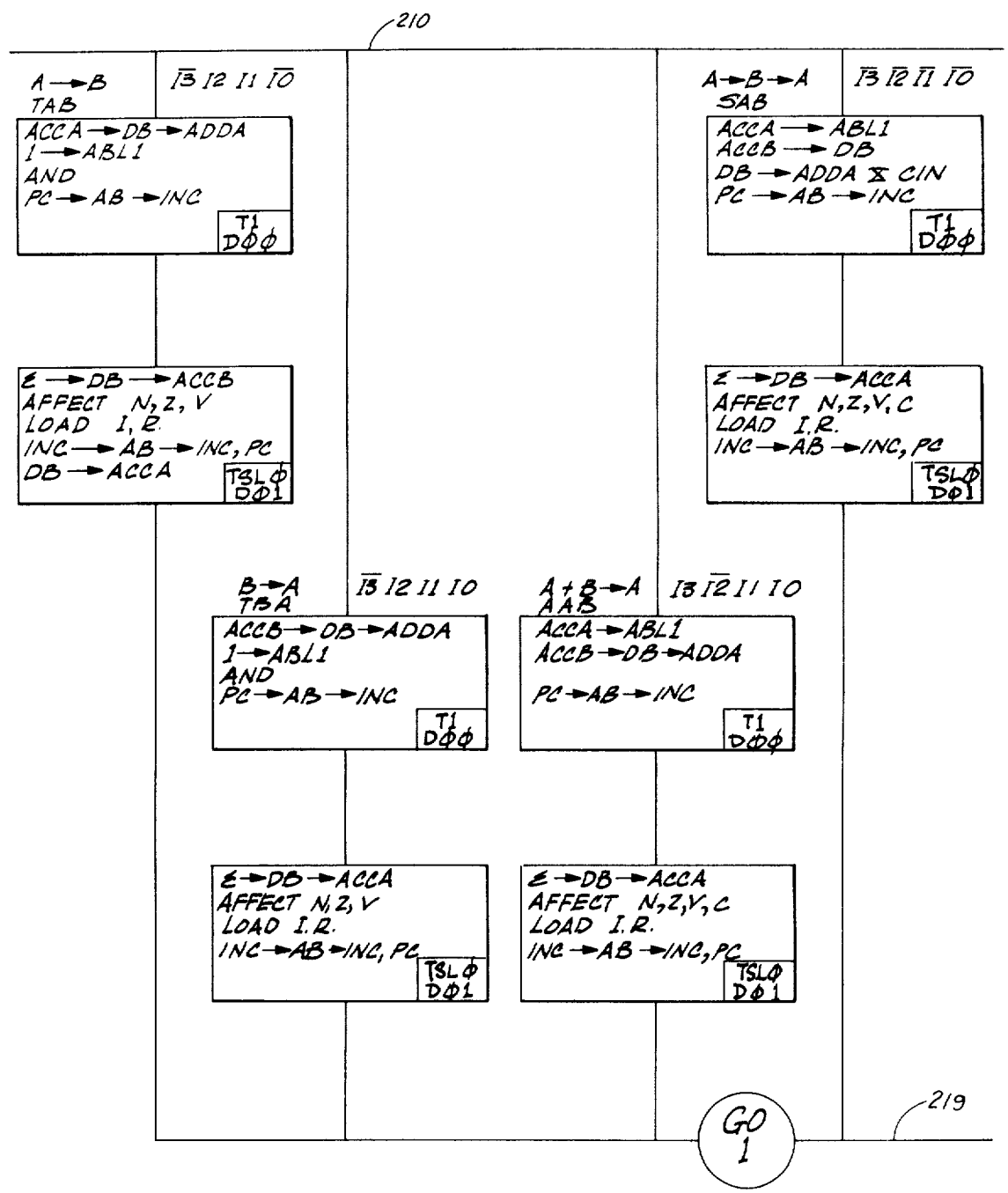

The following discussion describes, with reference to the flow chart of FIGS. 2A –2N, the data transfers associated with starting the microprocessor up and execution of a first instruction, which in this case is assumed to be LDA (load accumulator A) in the extended addressing mode. Referring to FIGS. 2A – 2N, it is assumed that an internal start-up routine is executed by the signal RST going from the low state during which resetting occurs, to a high state, which initiates the start up subroutine. It is seen that time frame GP58, which is the time frame identifier in the lower right hand corner of block in FIG. 2G, is established when restart signal RST is in the resetting mode. The following data transfers occur during time frame GP58:

1. 11111110 → DB
2. 1 → ABH → INCH
3. DB → OBL, INCL

It should be noted that all of the data transfers and the register contents during this example are listed in FIG. 8 for convenience.

The first data transfer (1) is the data bus conductors D$\phi$ – D7 are set to the state 11111110, respectively, by preconditioning circuitry in the microprocessor, which circuitry is activated when RST goes low. The second data transfer (2) is that the eight ABH conductors are all set to 1 s, and that these logical levels are then loaded into INCH (See FIG. 1). The third data transfer is that the levels thereby established on the DB conductors appear at external address output conductors A$\phi$ – A7, delayed by the delay inherent in address output buffers OBL. These levels are also transferred to INCL.

The 1 s on ABH also appear at the address conductors A8 – A15, delayed by the OBH buffers. The levels established on OBL and OBH then remain valid for an entire machine cycle. Note that any time frame of the flow chart of FIG. 2 is established within the chip by a pulse generated one machine cycle earlier having the same alpha-numeric designation in FIG. 3. Time frames on the flowchart of FIG. 2 may be referred to as execution time frames, whereas those generated one machine cycle earlier on a chip may be referred to as machine time frames.

It should be noted that the block GP58 of the instruction flow chart, FIG. 26, represents the data transfers during $\phi1$ of the particular machine cycle under consideration. During time period GP58, the address 1111 1111 1111 1110 is generated by the microprocessor V and appears on the address bus A$\phi$ - A15. The contents of 1111 1111 1111 1110, C(1111 1111 1111 1110) is the address of the first data Byte D1. C(1111 1111 1111 1111) is the address of the second data byte D2. The letter C followed by a binary address enclosed in the parenthises designates the contents of that location. D1 will appear at the following bit time on OBH and D2 will appear on OBL and the combination D1, D2 is the address of the first instruction byte.

For purposes of explanation, it is assumed that the first instruction is LDA, as mentioned above is, in the extended addressing mode previously described. As was explained with respect to the "Read Memory" operation, external memory is enabled during $\phi2$. For the restart sequence, the above address is in external ROM wherein the address of the first instruction is "hard-wired" into external memory.

The line between the blocks describing time frame GP58 and time frame R57 represents the $\phi2$ time frame following GP58, so that by the end of $\phi2$, D1 appears at the external data bus inputs DBI, i.e., D1 is "jammed" into DBI, the data input buffer of the microprocessor.

During the execution of each instruction, each incrementer (INCL and INCH) updates the contents of the corresponding program counter during a C1 time slot thereof. Generally, the address of the next instruction is held in the program counter which program counter is loaded by the incrementer during execution of the previous instruction.

Therefore, by the end of $\phi2$, the contents of INC are 1111 1111 1111 1111.

During execution time frame R57 the following data transfers occur:

5. INC → AB
6. DBI → DB → TEMP

Data Transfer (5) is that the contents of INC, 1111 1111 1111 1111, are transferred to the corresponding address buses ABH and ABL. This location contains D2, which is half of the lower order address of the data byte of the first instruction Data transfer (6) is the transfer of the address D1 of the instruction byte of the first instruction accessed during the previous machine cycle from DBI to internal data bus DB and from there to TEMP. During the subsequent $\phi2$ pulse INC is updated by adding 1 to its contents. Also during $\phi2$, D2 is jammed into DBI from the external ROM.

During R58, the following data transfers occur:

7. TEMP → ABH → INCH
8. DBI → DB → OBL, INCL

In data Transfer (7) the contents of TEMP, C (TEMP), i.e., D1 (one-half of the address of the instruction byte), is transferred from TEMP to ABH and from there to INCH. Since D1 appears on ABH, it also appears on OBH, delayed by the delay inherent therein. During data transfer (8), D2, one-half of the address of the data byte, is transferred from DBI to DB and from there to OBL and INCL. Thus, during R58 execution time, the entire address D1 D2 of the instruction byte of the first instruction LDA is on address buses A$\phi$ – A15. During the $\phi2$ pulse following time frame R58, the contents D1D2 of the incrementer are incremented by unity to give D1D2+1; also the digital code representation of the instruction LDA is jammed into DBI.

The next time frame is TSL$\phi$, FIG. 2A, during which the following data transfers occur:

9. Load IR
10. INC → AB → INC, PC

Note that the mnemonic PC is used to designate the entire program counter, including PCL and PCH; a similar connection is used herein for INC, SP, IX, and AB.

Data transfer (9) means that the code representation of LDA is transferred from the input buffer DBI into the instruction register IR. Data transfer (10) means that the contents of INC, D1D2 1, are transferred to ABL and ABH, thereby initiating the fetching of the data byte, and are also transferred to PC. During $\phi2$, the data byte is jammed into DBI, and INC is updated to D1D2+2.

Since the first instruction is in the extended addressing mode, as dictated by the contents of instruction register bits I5 – 14, the next time frame is EXT$\phi$.

During time frame EXT$\phi$, the following data tranfers occur:

11. DBI → DB → TEMP
12. INC → AB → INC

Data transfer (11) means that the contents of DBI, the data byte, are transferred to DB and from there to TEMP. Data transfer (12) means that the contents of INC, D1D2+2, are transferred to ABH and ABL and from there back to INC and, therefore, the contents of INC appear at the outputs of output buffer driver OBH and OBL, thereby initiating fetching of the next byte, which is a second data byte, since this instruction is in the extended addressing mode. The first and second data bytes in this extended addressing mode from an absolute address in memory, which address contains the data with which accumulator A is to be loaded. During the following $\phi2$ pulse, the contents of location D1D2+2, the second data byte, are jammed into DBI and INC is updated to D1D2+3.

During the next time frame EXT1 (FIG. 2A) the following data transfers occur:

13. TEMP → ABH → INCH
14. DBI → DB → OBL, INCL
15. INC → PC

Data transfer (13) means that the contents of TEMP, the first data byte, are transferred to ABH and from there to INCH. Data transfer (14) means that the contents of DBI, the second data byte, are transferred to DB and from there to OBL and INCL. Data transfer (15) means that INCH and INCL are transferred to PC. Whatever is located in the input of the incrementor, does not appear at the output, since there is a $\phi2$ coupler, during $\phi1$. During the subsequent $\phi2$ time, the data corresponding to the combination of data bytes (D1D2+1) (D1D2+2) is jammed into DBI and now the PC contains the address of the next instruction which is D1D2+3.

Since the instruction is neither JMP or JSR, the next time frame is D$\phi\phi$, FIG. 26. For time frame D$\phi\phi$, instruction LDA, the data transfers are as follows:

16. DBl → DB → ADDA
17. 1 → ABL1, ADDB
18. AND
19. PC → AB → INC (address of next instruction = D1D2+3)

The next time frame is TSL$\phi$ again, and includes the following data transfers:

20. Load IR
21. INC → AB → INC, PC
22. DB → ACCX (ACCX means either ACCA or ACCB)
23. AFFECT N,Z,V,C It should be recognized that processors, controllers and computers of the prior art after the advent of large scale integrated circuit microprocessors used to implement computing and processing systems characteristically had a large number of accessable connection points in the system. The large number of connection points accessable allowed use of large numbers of data conductors in the data bus and a large number of address conductors in the address bus. In general, the number of available pins for connection by data and address buses was not nearly as seriously limited as it is in the case wherein microprocessor is provided on a single integrated circuit chip, in which the number of pins that are available is greatly limited by semiconductor package technology and is presently at an upper limit of about 40 pins for an economical semiconductor package. This puts a great constraint on the number of conductors which can be used for the address bus and the data bus and for the number of pins available for other control signals.

For example, in the microprocessor of FIGS. 1 – 4 and 8 bit-wide data bus is utilized. However, in order to have a sufficiently large number of memory locations, a 16 bit-wide address bus is required consisting of two bytes. The split internal data bus arrangement and the associated split registers were invented to allow parallel processing of bytes of data to increase the rate at which certain instructions could be executed. This invention therefore, solves a problem which did not exist in the prior art, since in the prior art a two byte data bus could easily be used, since there was no serious limitation on the number of pins that could be dedicated for the data bus.

Similarly, the use of the control register concept as described in copending U.S. Pat. application. Ser. No. 519,138, in the peripheral interface adaptor circuit is also necessitated by the basic pin limitations of an integrated circuit microprocessor and a computer system implemented therewith and also with integrated circuit peripheral interface devices. FIGS. 3A–3TT constitute sections of a circuit schematic which substantially describe a preferred embodiment of the invention. The schematic sections in the FIGS. 3A – 3TT may be pieced together in the manner indicated by the reference numerals to form a large, substantially complete, circuit schematic of the entire microprocessor chip according to a presently preferred embodiment of the invention. However, repetitive sections of circuitry, such as the register bits and the arithmetic logic unit bits, of which there are eight each, have not been repeated. One skilled in the art can easily fill in the missing portions of the complete schematic by duplicating each of the register bits and other repetitive parts and piecing all of the circuit sections together to obtain a complete schematic diagram of a presently preferred embodiment of the microprocessor chip according to the invention. It should be noted that to obtain FIGS. 3A –3TT the drawings were obtained by cutting up a large schematic of the microprocessor chip into appropriately sized sections and tracing each at the drawings. One skilled in the art can reproduce the microprocessor chip of the invention by using conventional circuit design techniques to establish appropriate MOSFET geometry ratios. Standard MOS logic circuitry may be used for the various inverters, combinational AND/NOR gates and Exclusive Or gates shown in FIG. 3A–3TT. It should be noted that many of the reference numerals in FIGS. 3A–3TT have been assigned primarily for the purpose of clarifying how they fit together to provide a complete schematic diagram of a microprocessor chip. However, not all lines and nodes in FIGs. 3A –3TT have been identified by reference numerals. The drawings are made so that lines which should connect together will match up properly. A detailed recitation of circuit structure is given hereinafter only for that circuitry to which claims are drawn. The rest of the schematic drawings are provided to teach one skilled in the art to practice the invention.

During the following recitation of circuit structure of the register bits and the arithmetic logic unit bit of the microprocessor 10, it should be recognized that a MOSFET (metal-oxide-semiconductor field effect transistor) is a bilateral active circuit element having two main electrodes, a source, and a drain which are functionally interchangeable, depending on the relative voltages therebetween, and a gate electrode and a bulk (or substrate) electrode. For a more complete description of MOSFETs see "Physics and Technology of Semiconductor Devices", A. S. Grove, John Wiley & Sons, Inc., New York, 1967.

Referring to FIG. 3A, a temporary register (TEMP) corresponding to register 38 in FIG. 1, includes first MOSFET 10A which has its gate electrode connected to a first control conductor 251, its drain connected to a data bus conductor 250 and its source connected to a drain of a second MOSFET 11A, which in turn has its gate connected to the $\phi$1 clock conductor. It is noted that herein and in the appended claims the terms "drain" and "source" as related to a MOSFET are used interchangeably merely to distinguish one main current carrying electrode of the MOSFET under discussion from the other main current carrying electrode of that MOSFET, since one electrode of a MOSFET may function as a source during part of the circuit operation and as a drain during the other part of the circuit operation. MOSFET 14A in FIG. 3A has its source electrode connected to an input of a first inverter 13A which has its output connected to an input of a second inverter 14A. Inverter 14A has its output connected to a drain of a third MOSFET 12A which has its gate connected to the $\phi$2 clock conductor. MOSFET 12A has its source connected to the input of first inverter 13A, which has its output connected to the gate electrode of fourth MOSFET 15A, which has its source connected to a execution of an instruction. It should be noted that the control conductors referred to in the description of FIG. 3 are connected to the output of the appropriate bootstrap drivers illustrated in FIG. 3.

Figure 3E:
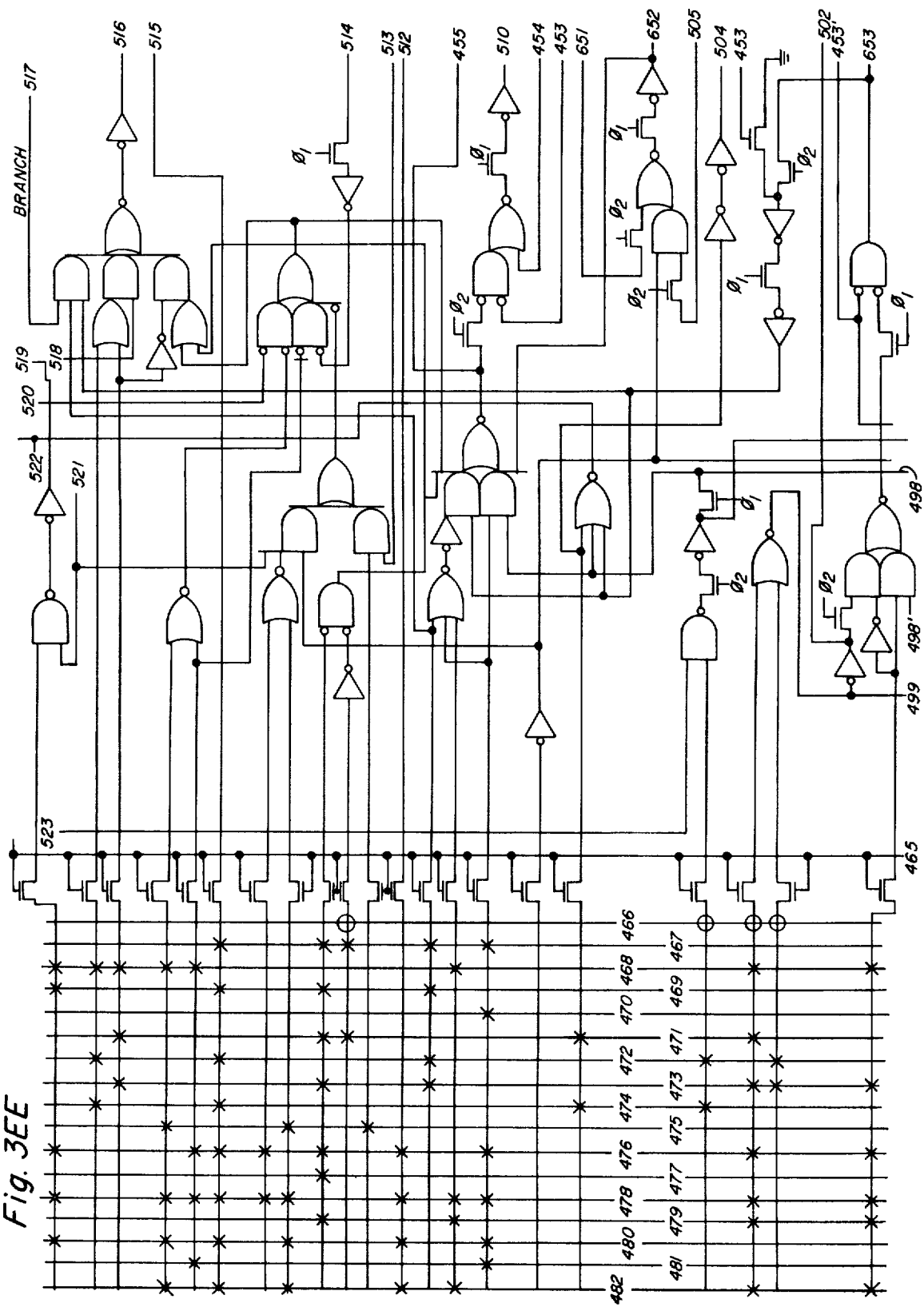
Figure 3F:
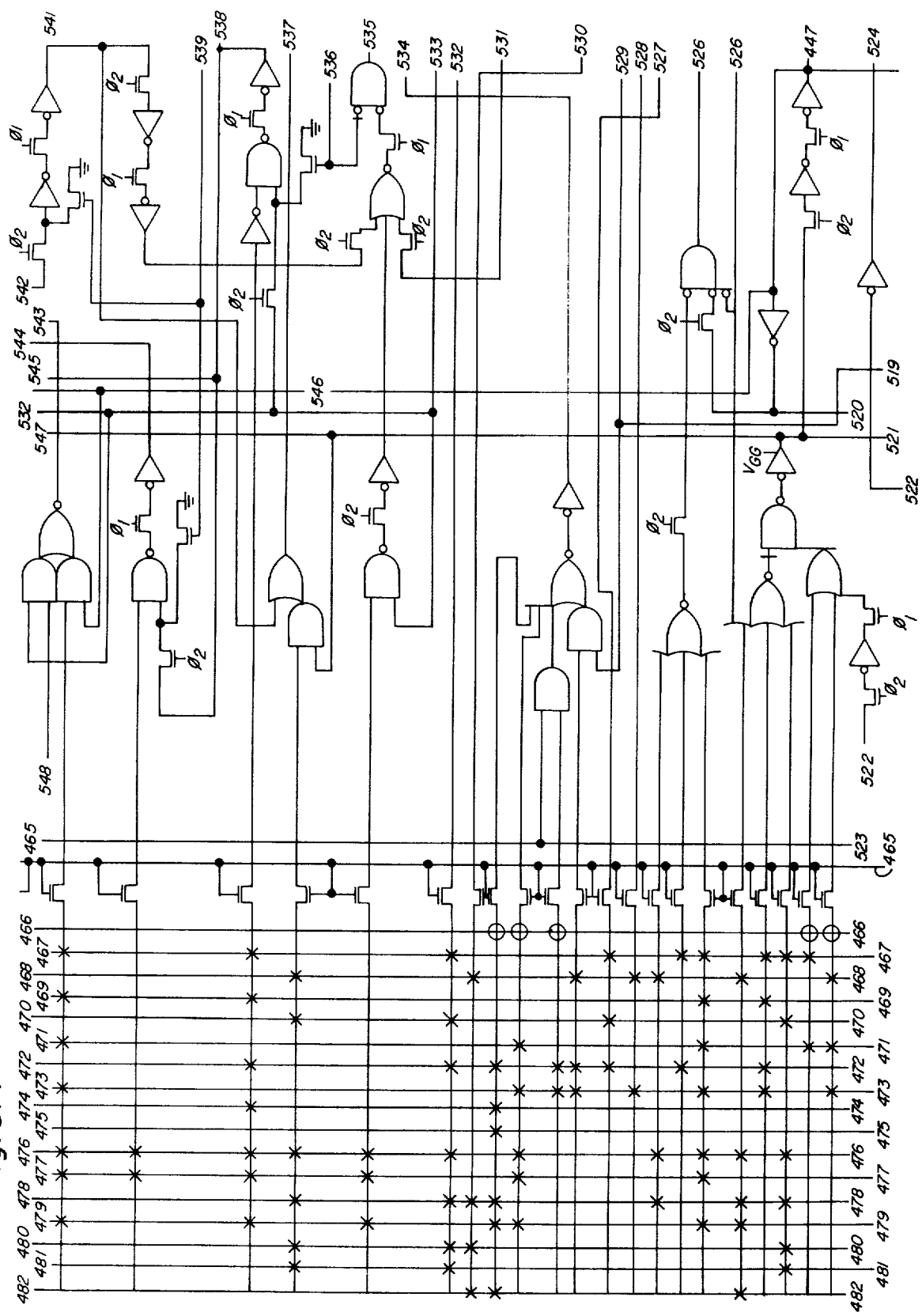
Figure 3G:
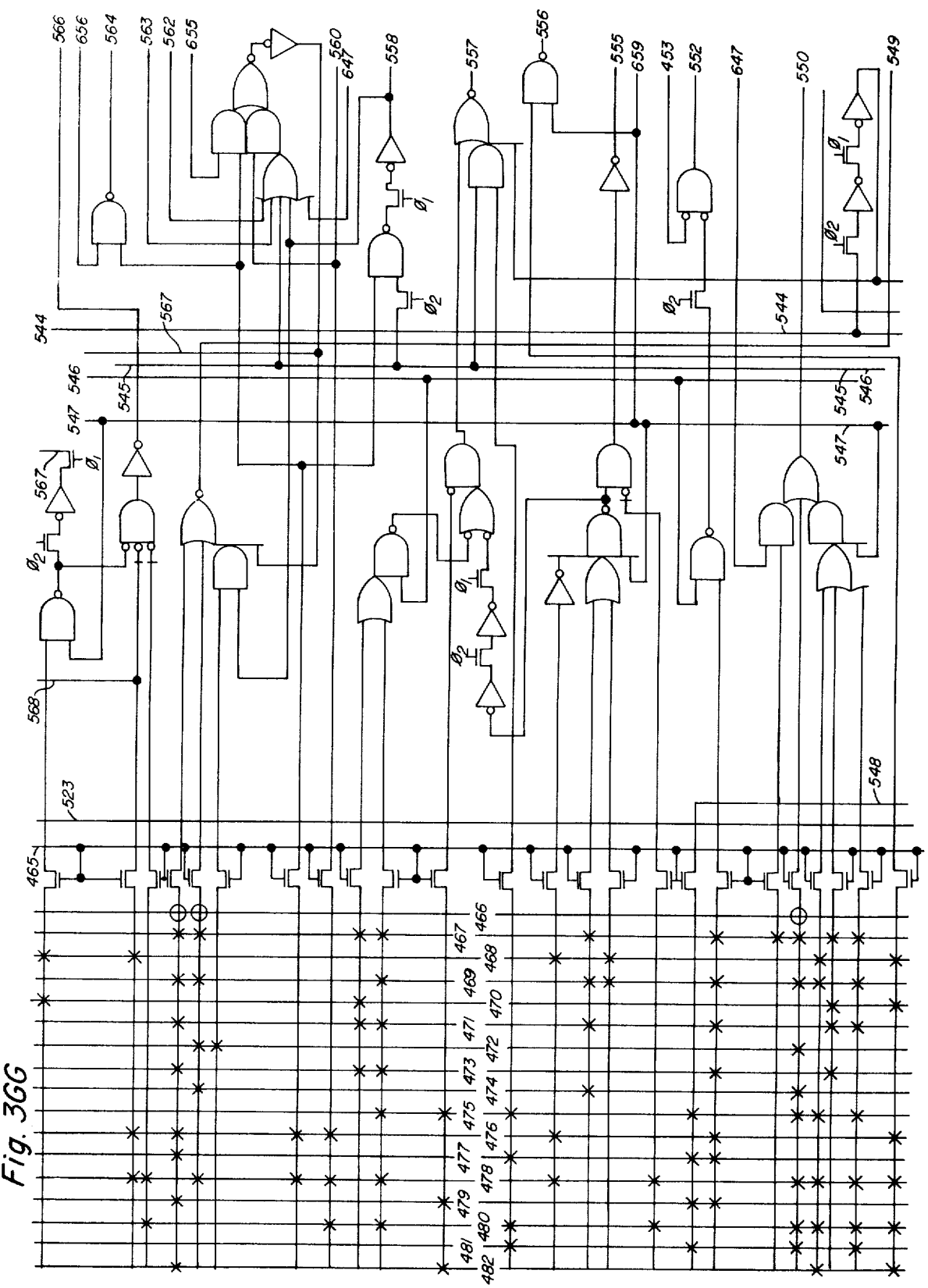
Figure 3H:
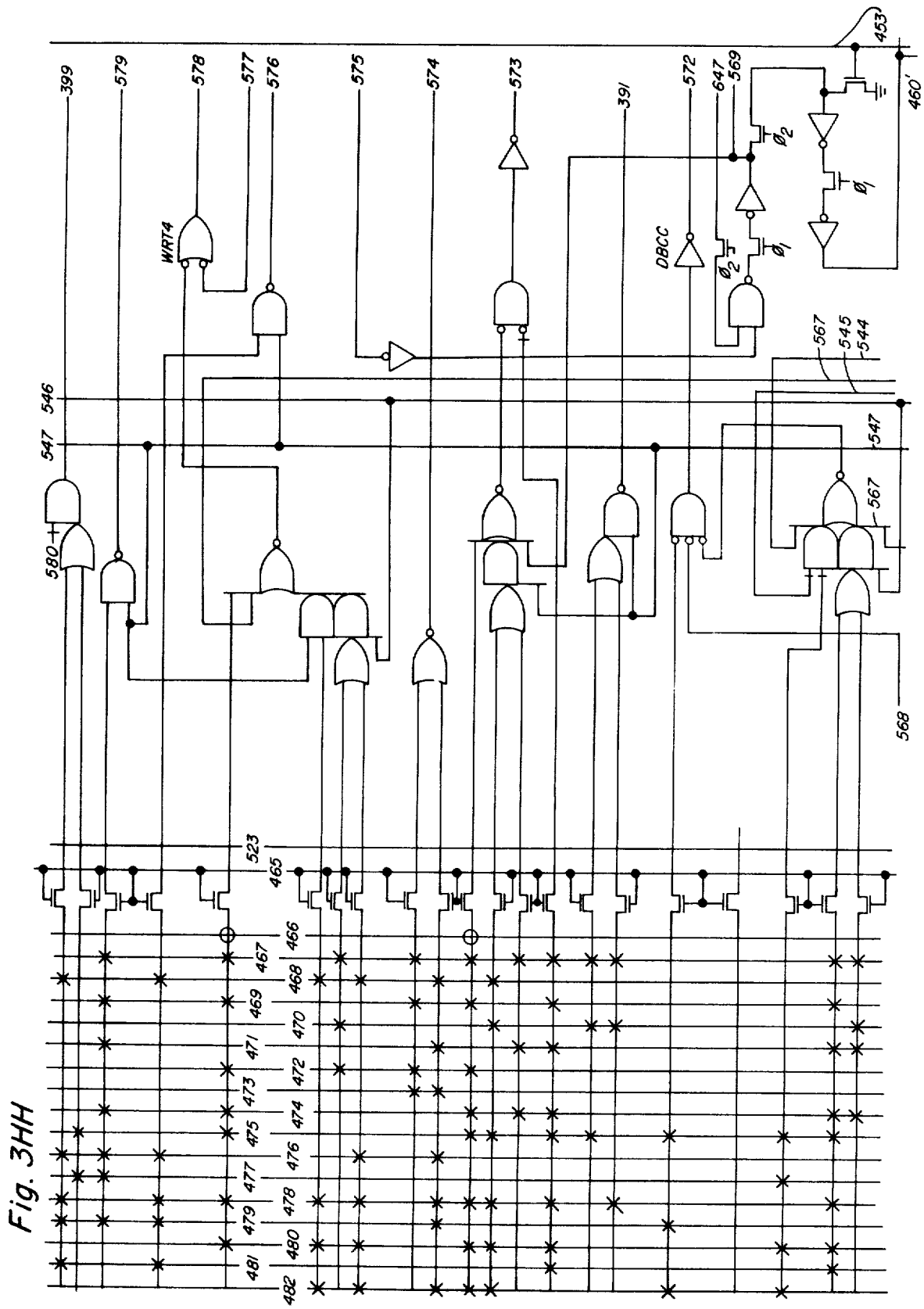
Figure 3I:
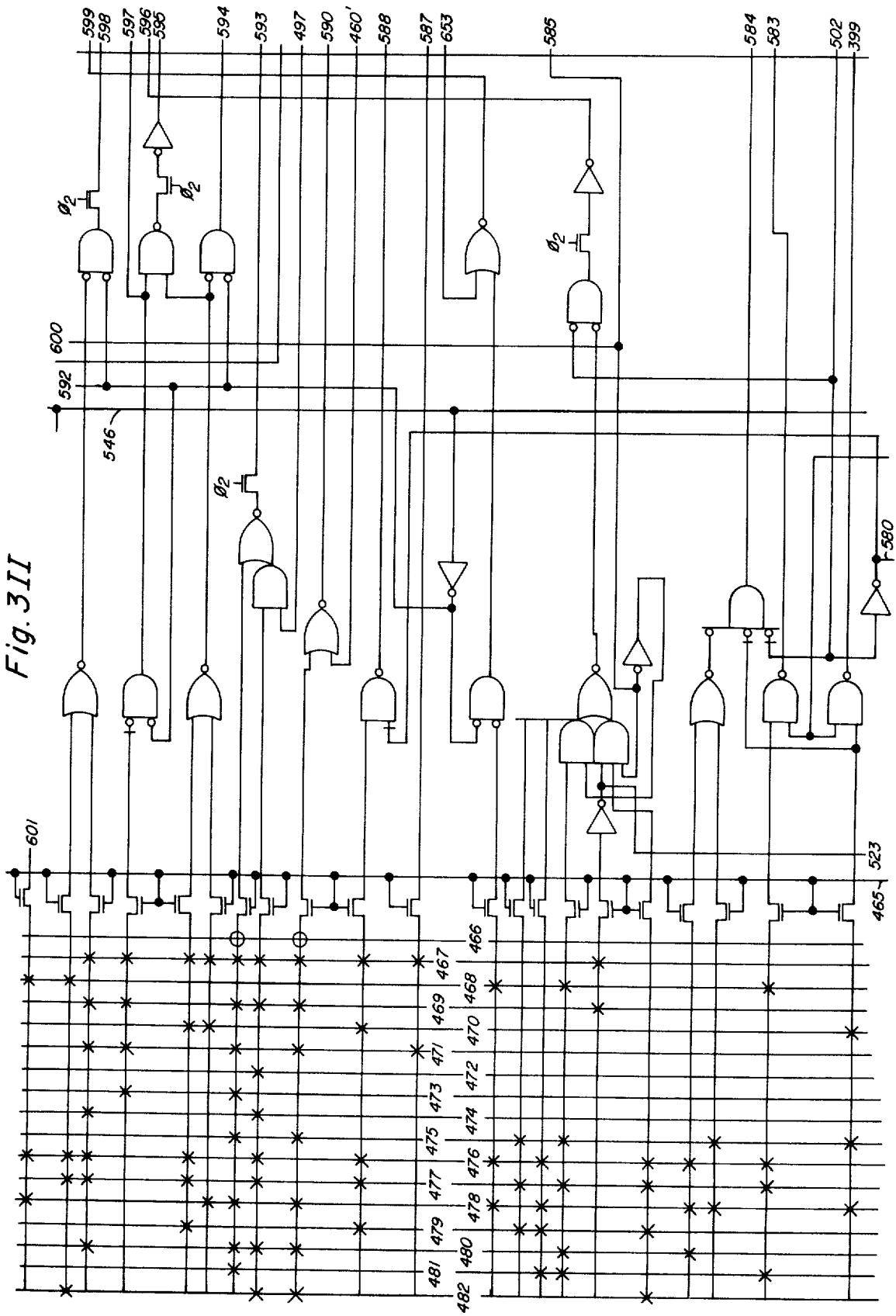

The circuit schematic of incrementer (counter) INCL and the associated coupling circuitry represented in FIG. 1 by reference numerals 36, 46, 50, and 48 is schematically depicted in FIG. 3E. Correspondingly, the high order incrementer (counter) INCH and its coupling circuitry represented in FIG. 1 by reference numerals 40, 54, and 56 is schematically represented in FIG. 3F. In FIG. 3E, incrementer INCL includes first MOSFET 20A, which has its drain connected to first control conductor 21A and its gate electrode connected to an output of first Exclusive OR circuit 23A. MOSFET 20A has its drain connected to second conductor 271. First inverter 27A has an input connected to an output of first Exclusive OR circuit 23A and an output connected to a gate electrode of MOSFET 31A. MOSFET 31A has a source connected to a ground conductor and a drain connected to a second conductor 5. Third MOSFET 23A has its drain connected to $V_{DD}$, its gate connected to $\phi 2$, and its source connected to first control conductor 21A and to an input of inverter 25A. Second inverter 25A has its output connected to an input of second Exclusive OR gate 24A. Exclusive OR gate 24A has an output connected to coupling conductor 32A for transferring information from INCL to program register PCL in FIG. 3D. Fourth MOSFET 26A has its drain connected to the input of Exclusive OR gate 23A and to an input of second Exclusive OR gate 24 A. Fourth MOSFET 26A has its gate electrode connected to clock conductor $\phi 1$ and it source connected to a source of fourth MOSFET 29A and to a drain of MOSFET 30A. MOSFET 29A has its source connected to internal data bus conductor 250 and its gate connected to second control conductor 273. Fifth MOSFET 30A has its source connected to address bus conductor 265 and its gate connected to third control conductor 74. Index register IXL and the corresponding coupling circuitry represented in FIG. 1 by referernce numerals 65, 51, 63, and 67 is schematically depicted in FIG. 3H. Index Register IXH and the associated coupling circuitry represented by reference numeral 69, 71, 73, and 75 in FIG. 1 is schematically depicted in FIG. 3I. Referring to FIG. 3I, low order index register IXL includes first MOSFET 40A having its drain connected to data bus conductor 250, its gate connected to first control conductor 292 and its source connected to a source of second MOSFET 42A. MOSFET 42A has its gate electrode connected to clock conductor $\phi 1$ and its source connected to an input of a first inverter 43A. Inverter 43A has its ouput connected to an input of a second inverter 46A. Inverter 46A has its output connected to a source of third MOSFET 34A, which has its gate connected to clock conductor $\phi 2$ and its drain connected to the input of first inverter 43A. Fourth MOSFET 41A has its drain connected to the source of first MOSFET 40A and its gate connected to second control conductor 293 and its source connected to a ground conductor. Fifth MOSFET 45A has it source connected to the ground conductor, its gate connected to the output of inverter 43A and its drain connected to a source of sixth MOSFET 47A and to the drain of seventh MOSFET 48A. MOSFET 47A has its drain connected to data bus conductor 250 and its gate connected to the third control conductor 195. Seventh MOSFET connected to the third control conductor 295. Seventh MOSFET 48A has its source connected to ABL1 conductor 291 and its gate connected to fourth control conductor 294.

Figure 3J:
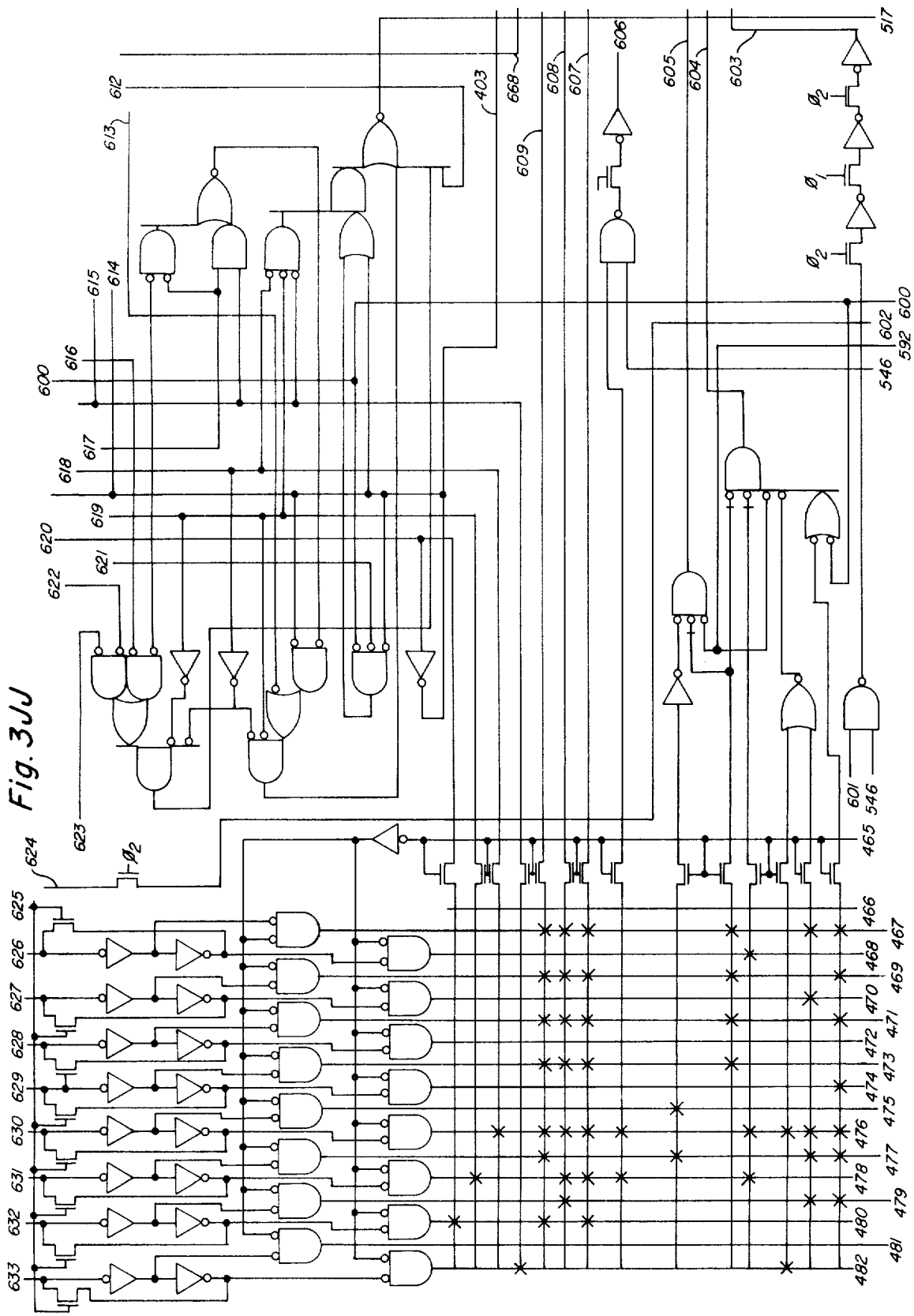
Figure 3P:
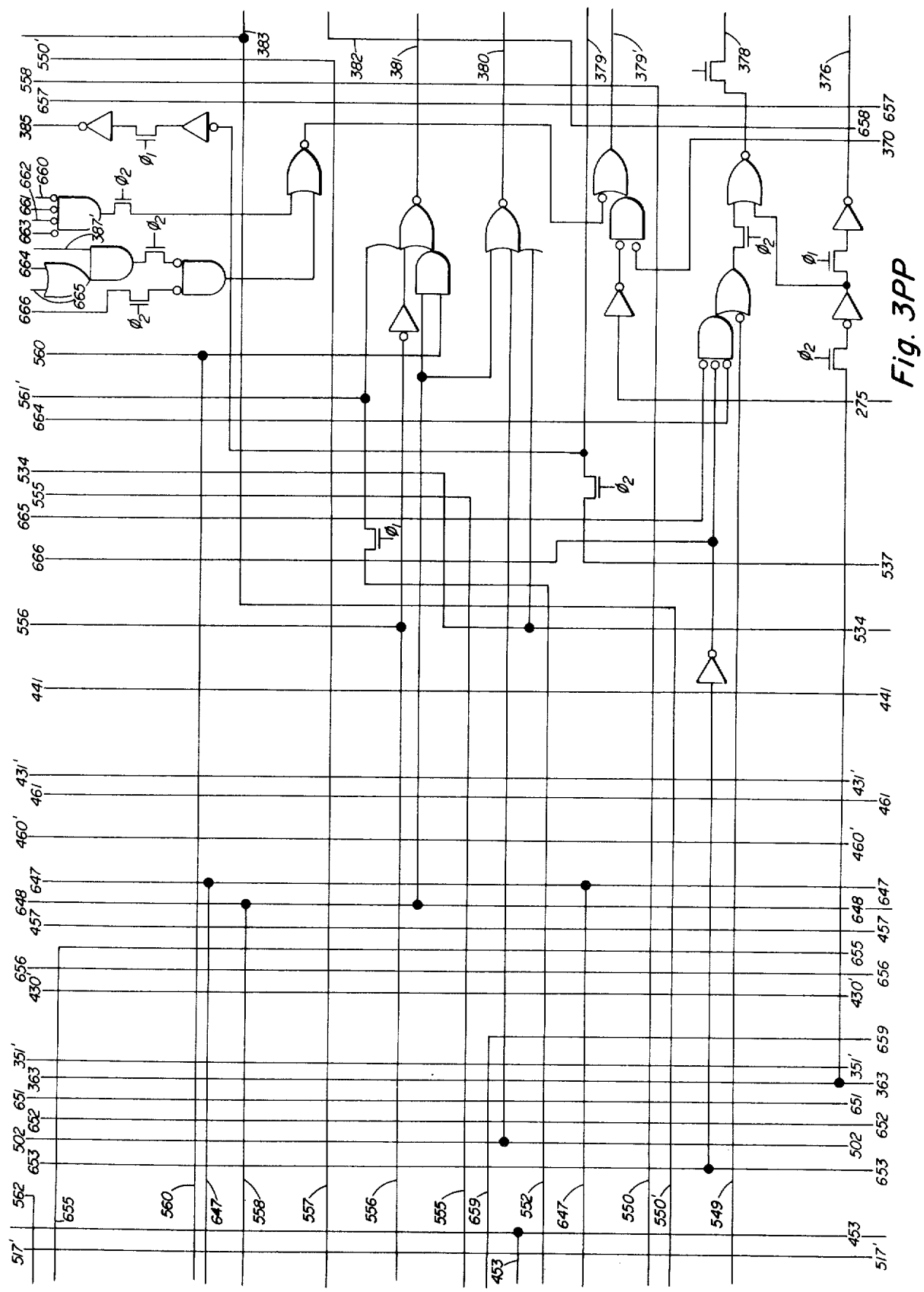

The accumulator register ACCA and associated coupling circuitry designated in FIG. 1 by reference numerals 82, 83, and 84 are represented schematically in FIG. 3K. Accumulator register ACCB and associated coupling circuitry represented in FIG. 1 by reference numerals 77, 79, and 44 are schematically depicted in FIG. 3J. The circuit schematics in FIGS. 3J and 3K are substantially similar to the circuit schematic of index register IXL in FIG. 3I, except that neither ACCA or ACCB has a MOSFET corresponding to MOSFET 41A of FIG. 3I.

In FIG. 3K, preconditioning MOSFET 41B has its source connected to a ground conductor and its drain connected to ABL1 conductor 291 and its gate connected to control conductor 299 and acts to precondition ABL1 conductor 291 under program control in execution of certain instruction.

A bit of the arithmetic logic unit (ALU) designated by reference numeral 88 in FIG. 1 is schematically represented in FIG. 3KI.

Referring to FIG. 3KI, the ALU bit includes first MOSFET 60A having its gate connected to first control conductor 301', its source connected to the ground conductor and its drain connected to a source of second MOSFET 64A. Second MOSFET 64A has its gate connected to $\phi 1$ and its drain connected to an input of first NOR gate 66A and to an input of first AND gate 67A. It should be noted that first AND gate 67A is really a part of a combinational AND/NOR gate including second NOR gate 68A in an MOS circuit implementation (not shown). Those skilled in the art will recognize that in an MOS implementation, AND gate 67A is not truly distinguishable as a separate logic gate, but is represented by three series connected MOSFETs which in combination as one input of NOR gate 68A. The drain of second MOSFET 64A is also connected to an input of second AND gate 69A. MOSFET 64A has its gate electrode connected to $\phi 1$ and has its source connected to a source of third MOSFET 61A. MOSFET 61A has its gate connected to second control conductor 304 and its drain connected to data bus conductor 250. Fourth MOSFET 63A has its source connected to the drain of MOSFET 60A, and has its gate connected to fourth control conductor 303 and its drain connected to an output of first inverter 62A. Inverter 62A has its input connected to data bus conductor 250. First NOR gate 66A has an output connected to an input of second NOR gate 68A. The output of first AND gate 57A is connected to another input of second NOR gate 68A. NOR gate 68A has its output connected to a gate of fifth MOSFET 76A. Second AND gate 69A has its output connected to an input of third NOR gate 71A, which has its output connected to an input of second inverter 72A. Inverter 72A has its output connected to an input of third inverter 74A. Third inverter 74A has its output connected to a source of fifth MOSFET 76A, which has its drain connected to an input of fourth inverter 77A. Fourth inverter 77A has its output connected to an input of Exclusive OR gate 78A which has another input connected the output of second NOR gate 68A. Exclusive OR gate 78A has an output connected to an input of fifth inverter 79A which has its output connected to a source of sixth MOSFET 80A, which its gate connected to $\phi 2$ and its drain connected to an input of sixth inverter 81A. Inverter 81A has an output connected to a source of seventh MOSFET 83A which has its gate connected to fifth control conductor 313 and its drain connected to data bus conductor 250. Inverter 81A has its output also connected to a gate of eight MOSFET 82A which has its source connected to the ground conductor and its drain connected to first conductor 314. Tenth MOSFET 70A has its source connected to second conductor 291, which is a conductor of ABL1 (FIG. 1). MOSFET 70A has its gate connected to φ1 and its drain connected to another input of AND gate 69A.

While the invention has been described mainly in relation to a presently preferred embodiment thereof, those skilled in the art will recognize that many variations in arrangement and placement of parts may be made to suit varying requirements in the scope of the present invention.

What is claimed is:

1. A microprocessor unit including an internal data bus N bits wide, N being an interger, coupled to a data output circuit comprising:

parallel internal address bus means including first address bus means N bits wide coupled to first register means for transferring data representative of low order address bits, and second address bus means independent of said first address bus means N bits wide coupled to second register means for transferring data representative of high order address bus bits, said parallel internal bus means being coupled to data output circuit means;

said first register means including first program register means coupled to said first address bus means for storing low order address bits of a current instruction and transferring said low order address bits to said first address bus means if said current instruction is of a first type or to said data bus if said current instruction is of a second type;

said second register means including second program register means coupled between said second address bus means and said data bus for storing high order address bits of said current instruction and transferring said high order address bits to said second address bus if said current instruction is of said first type or to said data bus if said current instruction is of said second type;

counter means coupled to said first and second register means for updating said low and high order address bits in said first and second program register means by incrementing or decrementing, under program control, an address stored in said first and second register means wherein said counter means includes a first counter coupled between said first address bus means and said data bus and also coupled to said first program register means for updating contents of said program register means;

said counter means including a second counter coupled to said address bus means and said second program register means for updating contents of said second program register means independently of said second address means;

said microprocessor unit also including arithmetic logic unit means coupled to said low order address bus and said data bus and control means coupled to said arithmetic logic unit means, said first and second register means, and said counter means for controlling transfers of data thereat.

2. A microprocessor as recited in Claim 1 wherein said first register means includes a first stack pointer register coupled between said first address bus means and said data bus for pointing to an address of a next available location in an external memory, and said second register means includes a second stack pointer register coupled between said data bus and said second address bus means for pointing to said address of said next available location in said external memory.

3. A microprocessor as recited in claim 1 wherein said first register means includes an index register coupled between said first address bus means and said data bus for storing an address to be utilized in an indexed mode of addressing of said microprocessor and said second register means includes a second index register coupled between said data bus and said second address bus means for storing said address to be used in said indexed mode of addressing.

4. A microprocessor as recited in claim 1 wherein said first address bus means is split into a first section and a second section, said second section being connected to said first section by an address bus.

5. A microprocessor as recited in claim 4 wherein said second section of said first address bus means is coupled to said first index register and further including first accumulator register means coupled between said second section and said data bus for storing operands and intermediate computational data results for said arithmetic logic unit, said second index register being coupled to said second section, and wherein said arithmetic logic unit is coupled between said second section and said data bus.

6. A microprocessor as recited in claim 5 further including second accumulator register means coupled between said second section and said data bus.

7. A microprocessor as recited in claim 1 further including temporary register means coupled between said second address bus means and said data bus for temporarily storing N bits of data.

8. A microprocessor as recited in claim 7 wherein said temporary register includes a first MOSFET having its gate connected to a first control conductor, its drain connected to a data bus conductor and its source connected to a drain of a second MOSFET having its gate connected a phase one clock conductor and its source connected to an input of a first inverter having its output connected to an input of a second inverter, said second inverter having its output connected to a drain of a third MOSFET having its gate connected to a phase two clock conductor and its source connected to said input of said first inverter, said output of said first inverter being connected to a gate electrode of a fourth MOSFET having its source connected to a ground conductor and its drain connected to a source of a fifth MOSFET and a drain of a sixth MOSFET, said fifth MOSFET having it drain connected to said data bus conductor and its gate connected to a second control conductor, said sixth MOSFET having its gate connected to a third control conductor and its source connected to an address bus conductor.

9. A microprocessor integrated circuit chip comprising:

an external data bus;
    an internal data bus;
    a data bus input buffer coupled between said external data bus and said internal data bus;
    a data bus output buffer having an input coupled to said internal data bus and an output coupled to said external data bus;
    a low order address bus;
    low order address output buffer circuit means having inputs coupled to said low order address bus and said internal data bus and having outputs coupled to external low order address bus means;

an accumulator register coupled between said low order address bus and said internal data bus;

an arithmetic logic unit having inputs coupled to a second low order address bus and said internal data bus and having an output coupled to said data bus;

a program register coupled between said low order address bus and said internal address bus;

coupling means coupling said program register to said low order address bus and internal data bus for transferring data from said program register to said low order address bus and said internal data bus; and control means coupled to said arithmetic logic unit, said data bus input buffer, said data bus output buffer, said low order address output buffer circuit means, said accumulator register, said arithmetic logic unit, and said program register for controlling transfers of data thereat.

10. A microprocessor integrated circuit chip as recited in claim 9 further including incrementer means coupled to said low order address bus and to said internal data bus for incrementing the contents of said program register and having coupling means coupling said incrementer means to said program register.

11. A microprocessor integrated circuit dip as recited in claim 10 further including a stack pointer register coupled between said low address bus and said internal data bus.

12. A microprocessor integrated circuit chip as recited in claim 10 further including a high order address bus, a high order program register coupled between said internal data bus and said high order address bus, and a high order incrementer coupled between said internal data bus and said high order address bus and also having second coupling means independent of said high order address bus coupling said high order incrementer to said high order program register.

13. A microprocessor integrated circuit chip as recited in claim 12 further incuding a high order stack pointer register coupled between said internal data bus and said high order address bus and further including a high order index register coupled between said internal data bus and said high order address bus and including third coupling means for coupling said high order index register to said second low order address bus.

14. A microprocessor integrated circuit chip as recited in claim 10 further including instruction decode and control circuitry and control bus means coupled to said decode and control circuitry, said instruction decode and control circuitry being for generating signals on a plurality conductors of said control bus for controlling data transfers between said internal data bus, said low order address bus and said second low order address bus and said accumulator register and said arithmetic logic unit and said program register and said incrementer means and said coupling means, said control bus being coupled to all of said coupling means.

15. A microprocessor integrated circuit chip as recited in claim 14 including a timing generator in said instruction decode and control circuitry for generating a timing sequence controlling signals on said conductors of said control bus.

16. A microprocessor integrated circuit chip as recited in claim 15 wherein said microprocessor is an N-channel MOS semiconductor chip.

17. A microprocessor integrated circuit chip as recited in claim 15 wherein said internal data bus, said low order address bus, said second low order address bus, and said coupling means each include, respectively, eight conductors, and each of said program register, said accumulator register, and said incrementer means contain eight bit positions.

18. A microprocessor integrated circuit chip as recited in claim 17 where each of said data bus conductors is coupled, respectively, to a bit of said accumulator register, said arithmetic logic unit, said program register, and said incrementer, and each of said conductors of said low order address bus is connnected, respectively, to a bit of said program register, and said incrementer and each of said conductors of said second low address bus is connected, respectively, to a bit of said accumulator register and a bit of said arithmetic logic unit.

19. A microprocessor integrated circuit chip comprising:

a data bus;

a first order address bus;

a second order address bus;

a plurality of registers of storing data coupled between said data bus and said first order address bus;

a plurality of other registers for storing data coupled between said data bus and said second order address bus;

an arithmetic logic unit for performing digital computations coupled between said first order address bus and said data bus; and control circuit means coupled to said arithmetic logic unit and said registers and said other registers for controlling transfers of data within said microprocessor chip.

20. A microprocessor integrated circuit comprising:

a data bus;

address bus;

a plurality of registers for storing data coupled between said data bus and said address bus;

an arithmetic logic unit for performing computations on data coupled between said address bus and said data bus;

control circuit means coupled to said arithmetic logic unit and said registers for controlling transfers of data thereat;

said address bus including first and second seriescoupled sections;

said arithmetic logic circuit being coupled between said second section and said data bus, and said control circuit means being coupled to bus switch coupling means for coupling said first and second sections under control of said control circuit means.

21. A microprocessor integrated circuit comprising:

an arithmetic logic unit;

an internal data bus;

a high order address bus;

a plurality of register storage means coupled between said internal data bus and said high order address bus;

a low order address bus;

a plurality of other register storage means coupled between said internal data bus and said low order address bus;

control circuit menas coupled to said arithmetic logic unit and said register storage means for controlling transfers of data within said microprocessor chip.

22. A microprocessor unit including a data bus, an arithmetic logic unit, a plurality of registers, and control circuitry coupled to said arithmetic logic unit and said plurality of registers for controlling data transfers thereat comprising a high order address bus and a low order address bus wherein one of said registers is coupled between said high order address bus and said data bus and another of said registers is coupled between said low order address bus and said data bus.

* * * * *